US010755613B2

(12) United States Patent
Brubaker

(10) Patent No.: US 10,755,613 B2
(45) Date of Patent: Aug. 25, 2020

(54) SYSTEM AND APPARATUS FOR MAKING, MOUNTING AND USING EXTERNALLY-MOUNTED DIGITAL DISPLAYS ON MOVING OBJECTS

(71) Applicant: BCAT, LLC, Monarch Bay, CA (US)

(72) Inventor: Curtis M. Brubaker, Monarch Bay, CA (US)

(73) Assignee: BCAT, LLC, Monarch Bay, CA (US)

( * ) Notice: Subject to any disclaimer, the term of this patent is extended or adjusted under 35 U.S.C. 154(b) by 0 days.

(21) Appl. No.: 16/093,354

(22) PCT Filed: Apr. 13, 2017

(86) PCT No.: PCT/US2017/027464
§ 371 (c)(1),
(2) Date: Oct. 12, 2018

(87) PCT Pub. No.: WO2017/180900
PCT Pub. Date: Oct. 19, 2017

(65) Prior Publication Data
US 2019/0213931 A1    Jul. 11, 2019

Related U.S. Application Data

(60) Provisional application No. 62/322,720, filed on Apr. 14, 2016.

(51) Int. Cl.
*G09F 21/04* (2006.01)
*B60R 13/10* (2006.01)
(Continued)

(52) U.S. Cl.
CPC .......... *G09F 21/048* (2013.01); *B60Q 1/2607* (2013.01); *B60Q 1/44* (2013.01);
(Continued)

(58) Field of Classification Search
CPC .......... G09F 21/048; G09F 9/30; G09F 21/04; G09F 27/005; G09F 9/301;
(Continued)

(56) References Cited

U.S. PATENT DOCUMENTS

D246,772 S    12/1977 Brubaker
D246,775 S    12/1977 Brubaker
(Continued)

FOREIGN PATENT DOCUMENTS

CN    1325100    12/2001
CN    2573322    9/2003
(Continued)

OTHER PUBLICATIONS

Official Communication received in Chinese Patent Application No. 201580052015.5 dated Dec. 26, 2018 in 8 pages.
(Continued)

*Primary Examiner* — Tracy Y. Li
(74) *Attorney, Agent, or Firm* — Knobbe, Martens, Olson & Bear, LLP

(57) ABSTRACT

A hyper relevant digital surface (HDS) may be designed, fitted, formed and attached to conform closely to a target vehicle's body surfaces. Certain embodiments may use Thin Film Transistor (TFT) flexible (or rigid) display products to enhance or disguise their presence by displaying imagery to visually or aesthetically replicate in real-time the original vehicle's surface or to alter or morph any vehicle body surfaces (shape, color, lighting, reflections, details, features or components, etc.) underneath. Embodiments designed to utilize license plate recess for integration, mechanical and electrical connection, temperature control, and display of license plate information are disclosed.

20 Claims, 36 Drawing Sheets

(51) Int. Cl.
| | |
|---|---|
| *B60Q 1/44* | (2006.01) |
| *B60R 13/04* | (2006.01) |
| *G06Q 30/02* | (2012.01) |
| *G09F 9/30* | (2006.01) |
| *B60Q 1/26* | (2006.01) |
| *G09F 27/00* | (2006.01) |
| *B60R 11/02* | (2006.01) |
| *G09G 5/12* | (2006.01) |
| *H04N 7/18* | (2006.01) |
| *B60R 11/00* | (2006.01) |
| *G02B 5/30* | (2006.01) |

(52) U.S. Cl.
CPC .......... *B60R 11/0235* (2013.01); *B60R 13/04* (2013.01); *B60R 13/10* (2013.01); *G06Q 30/0266* (2013.01); *G09F 9/30* (2013.01); *G09F 9/301* (2013.01); *G09F 21/04* (2013.01); *G09F 27/005* (2013.01); *G09G 5/12* (2013.01); *H04N 7/181* (2013.01); *B60Q 2900/30* (2013.01); *B60R 2011/004* (2013.01); *G02B 5/3025* (2013.01); *G09G 2320/10* (2013.01); *G09G 2380/10* (2013.01)

(58) Field of Classification Search
CPC .. G06Q 30/0266; G09G 5/12; G09G 2320/10; G09G 2380/10; H04N 7/181; B60R 13/10; B60R 2011/004; B60R 13/04; B60R 11/0235; B60Q 2900/30; B60Q 1/44; B60Q 1/2607; G02B 5/3025

See application file for complete search history.

(56) References Cited

U.S. PATENT DOCUMENTS

| | | |
|---|---|---|
| 4,080,922 A | 3/1978 | Brubaker |
| 5,150,116 A | 9/1992 | West |
| 5,481,257 A | 1/1996 | Brubaker et al. |
| 6,150,930 A | 11/2000 | Cooper |
| 6,484,148 B1 | 11/2002 | Boyd |
| 6,545,596 B1 | 4/2003 | Moon |
| 6,587,755 B1 | 7/2003 | Smith et al. |
| 6,812,851 B1 | 11/2004 | Dukach et al. |
| 7,659,808 B1 | 2/2010 | Cooper et al. |
| 9,147,192 B2 | 9/2015 | Dawson et al. |
| 9,183,572 B2 | 11/2015 | Brubaker |
| 9,293,042 B1 | 3/2016 | Wasserman |
| 9,299,077 B2 | 3/2016 | Brubaker |
| 9,607,510 B1 | 3/2017 | DeLorean |
| 9,759,420 B1 | 9/2017 | Baloga |
| 9,878,666 B2 | 1/2018 | Brubaker |
| 10,293,750 B2 | 5/2019 | Brubaker |
| 2001/0013016 A1 | 8/2001 | Hunter |
| 2002/0009978 A1 | 1/2002 | Dukach et al. |
| 2002/0084891 A1 | 7/2002 | Mankins et al. |
| 2002/0135515 A1 | 9/2002 | Rankin et al. |
| 2002/0164962 A1 | 11/2002 | Mankins et al. |
| 2002/0167416 A1 | 11/2002 | Polyakov |
| 2003/0006911 A1 | 1/2003 | Smith et al. |
| 2003/0050744 A1 | 3/2003 | Saraiva |
| 2003/0195670 A1 | 10/2003 | Smith et al. |
| 2004/0008157 A1 | 1/2004 | Brubaker et al. |
| 2004/0036622 A1 | 2/2004 | Dukach et al. |
| 2004/0226204 A1 | 11/2004 | Green |
| 2005/0012598 A1 | 1/2005 | Berquist |
| 2005/0024189 A1 | 2/2005 | Weber |
| 2005/0091890 A1 | 5/2005 | Snyder |
| 2005/0231385 A1 | 10/2005 | Haase |
| 2005/0253699 A1* | 11/2005 | Madonia ................ B60K 35/00 340/463 |
| 2006/0213100 A1 | 9/2006 | McCann |
| 2007/0030212 A1 | 2/2007 | Shibata |
| 2007/0079331 A1 | 4/2007 | Datta et al. |
| 2007/0112762 A1 | 5/2007 | Brubaker |
| 2007/0115138 A1 | 5/2007 | Arakawa |
| 2007/0132664 A1 | 6/2007 | Weissman |
| 2008/0030427 A1 | 2/2008 | Lanham |
| 2008/0068455 A1 | 3/2008 | Pratt |
| 2008/0085985 A1 | 4/2008 | Nakamura et al. |
| 2008/0231067 A1 | 9/2008 | Nagle |
| 2009/0208109 A1 | 8/2009 | Kakinami et al. |
| 2010/0036717 A1 | 2/2010 | Trest |
| 2011/0066324 A1 | 3/2011 | Odland et al. |
| 2011/0295697 A1 | 12/2011 | Boston et al. |
| 2012/0044429 A1 | 2/2012 | Guerra |
| 2013/0231828 A1 | 9/2013 | Seal |
| 2013/0265414 A1 | 10/2013 | Yoon |
| 2013/0325629 A1 | 12/2013 | Harrison |
| 2014/0078407 A1 | 3/2014 | Green |
| 2014/0098229 A1* | 4/2014 | Lu .......................... H04N 7/181 348/148 |
| 2014/0247160 A1 | 9/2014 | Glascock |
| 2014/0316900 A1 | 10/2014 | Amla et al. |
| 2014/0379475 A1* | 12/2014 | Sarangi ............. G06Q 30/0266 705/14.56 |
| 2015/0194082 A1 | 7/2015 | McEwan |
| 2015/0282346 A1 | 10/2015 | Ganim et al. |
| 2015/0317687 A1 | 11/2015 | Ramesh et al. |
| 2015/0365306 A1 | 12/2015 | Chaudhri et al. |
| 2016/0110759 A1 | 4/2016 | Polehn et al. |
| 2016/0140614 A1 | 5/2016 | Brubaker |
| 2017/0200197 A1 | 7/2017 | Brubaker |
| 2018/0304810 A1 | 10/2018 | Brubaker |
| 2019/0061318 A1* | 2/2019 | Jung ..................... G02F 1/1333 |

FOREIGN PATENT DOCUMENTS

| | | |
|---|---|---|
| CN | 101689340 | 3/2010 |
| CN | 202029737 | 11/2011 |
| CN | 103886482 | 6/2014 |
| JP | 02-093147 | 7/1990 |
| JP | 03-290689 | 12/1991 |
| JP | 3020426 U | 1/1996 |
| JP | 10-207413 | 8/1998 |
| JP | 11-065434 | 3/1999 |
| JP | 2000-071895 | 3/2000 |
| JP | 2002-006293 | 1/2002 |
| JP | 2003-125379 | 4/2003 |
| JP | 2003-131604 | 5/2003 |
| JP | 2003-186777 | 7/2003 |
| JP | 2003-252153 | 9/2003 |
| JP | 2004-029572 | 1/2004 |
| JP | 2004-070181 | 3/2004 |
| JP | 2004-072475 | 3/2004 |
| JP | 2004-271738 | 9/2004 |
| JP | 2004-272007 | 9/2004 |
| JP | 2004-279509 | 10/2004 |
| JP | 2005-164858 | 6/2005 |
| JP | 2005-173836 | 6/2005 |
| JP | 2006-285225 | 10/2006 |
| JP | 2007-526165 | 9/2007 |
| JP | 2013-209697 | 10/2013 |
| KR | 10-2000-0062502 | 10/2000 |
| KR | 10-2001-0081864 | 8/2001 |
| KR | 10-2002-0025393 | 4/2002 |
| KR | 10-2005-0008281 | 1/2005 |
| KR | 10-2005-0043353 | 5/2005 |
| KR | 10-2005-0072369 | 7/2005 |
| RU | 145277 | 9/2014 |
| WO | WO 2006/136847 | 12/2006 |
| WO | WO 2007/109541 | 9/2007 |
| WO | WO 2008/019105 | 2/2008 |
| WO | WO 2011/080715 | 7/2011 |
| WO | WO 2016/014966 | 1/2016 |
| WO | WO 2017/180900 | 10/2017 |

OTHER PUBLICATIONS

Official Communication received in European Patent Application No. 07758697.2 dated Apr. 13, 2017 in 7 pages.

(56) References Cited

OTHER PUBLICATIONS

Roderick, Leonie, "Renault Tries 'Not to be Creepy' as it uses Vehicle-Scanning Tech to Personalise Outdoor Ads", Jul. 13, 2016, https://www.marketingweek.com/renault-on-trying-not-to-be-creepy-as-it-uses-vehicle-recognition-tech-for-campaign/.
U.S. Appl. No. 13/847,925, filed Mar. 20, 2013, Brubaker.
U.S. Appl. No. 13/860,891, filed Apr. 11, 2013, Brubaker.
U.S. Appl. No. 61/613,898, filed Mar. 21, 2012, Brubaker.
Adroady, "Adroady #1st mobile digital out-of-home media", Including Screenshot, https://www.youtube.com/watch?v=4WsQ_3odMbc, accessed on Nov. 19, 2018, pp. 4.
Adroady, Digital Mobile OOH Network, http://adroady.com/, accessed on Nov. 19, 2018, pp. 7.
Evans, Scott, "German Firm EDAG Previews 'Light Car' Concept Ahead of Geneva Debut", published Jan. 20, 2009, pp. 3.
Felton, Ryan, "The Fully-Autonomous Electric Smart ForTwo Concept Car Has A Grille That Will Greet You With 'Hey'", https://web.archive.org/web/20170913205308/http://jalopnik.com/the-fully-autonomous-electric-smart-fortwo-concept-car-1798631981, accessed on Aug. 30, 2017, pp. 5.
Misener, Dan, "Billboards Deliver Targeted Ads by Identifying Your Car", CBC News, https://www.cbc.ca/news/technology/vehicle-recognition-1.3695631 Posted Jul. 26, 2016, pp. 5.
Orlove, Raphael, "The Secrets of the Rig That Can Transform Into Any Car", http://jalopnik.com/the-secrets-of-the-righ-that-can-transform-into-any-car-1786339083, published Sep. 7, 2016, pp. 5.
Paukert, Chris, "Geneva 2009: Clever EDAG "Light Car Open-Source" is like safety television for tailgaters", http://www.autoblog.com/2009/03/03/geneva-2009-clever-edag-light-car-open-source-is-life-safety/, published Mar. 2009, pp. 2.
Reid, Rory, "Light Car—Open Source: Bringing OLED TVs to the Streets", http://www.cnet.com/roadshow/pictures/light-car-open-source-bringing-oled-tvs-to-the-streets/, published Mar. 4, 2009, pp. 7.
Torchinsky, Jason, "The Mercedes-Benz Concept EQA Shows How Mercedes Can Phone in an Electric Hatch With a TV for a Grille", https://web.archive.org/web/20170913210224/http://jalopnik.com/the-mercedes-benz-concept-ega-shows-how-mercedes-can-ph-1803775986, accessed on Sep. 12, 2017, pp. 5.
Toyota Usa, "Fun Vii Concept Car", https://www.youtube.com/watch?v=ZOAC_sPCWME, Published on Dec. 20, 2012, pp. 3.
Official Communication received in Chinese Patent Application No. 200780017509.5 dated Mar. 1, 2012 in 3 pages.
Official Communication received in Chinese Patent Application No. 201310310267.6 dated Dec. 15, 2015 in 12 pages.
Official Communication received in Chinese Patent Application No. 201310310267.6 dated Oct. 31, 2016 in 3 pages.
Official Communication received in European Patent Application No. 07758697.2 dated Apr. 25, 2014 in 4 pages.
Official Communication received in European Patent Application No. 07758697.2 dated Apr. 13, 2017 in 4 pages.
Official Communication received in Indian Patent Application No. 8686/DELNP/2008 dated Jun. 24, 2016 in 8 pages.
Official Communication received in Japanese Patent Application No. 2009-500627 dated Apr. 2, 2013 in 5 pages.
Official Communication received in Japanese Patent Application No. 2009-500627 dated Oct. 28, 2014 in 7 pages.
Official Communication received in Japanese Patent Application No. 2013-207242 dated Oct. 7, 2014 in 4 pages.
Official Communication received in Japanese Patent Application No. 2013-207242 dated Sep. 6, 2016 in 10 pages.
Official Communication received in Japanese Patent Application No. 2015-214596 dated Jan. 10, 2017 in 4 pages.
Official Communication received in Japanese Patent Application No. 2015-214596 dated Nov. 28, 2017 in 3 pages.
Official Communication received in Japanese Patent Application No. 2015-214596 dated Jun. 5, 2018 in 5 pages.
Official Communication received in Korean Patent Application No. 10-2008-7025185 dated May 25, 2012 in 5 pages.
Official Communication received in Korean Patent Application No. 10-2008-7025185 dated Dec. 28, 2012 in 5 pages.
Official Communication received in Korean Patent Application No. 10-2008-7025185 dated Nov. 26, 2013 in 4 pages.
Official Communication received in Korean Patent Application No. 10-2008-7025185 dated Jun. 3, 2014 in 6 pages.
Official Communication received in Korean Patent Application No. 10-2008-7025185 dated Apr. 29, 2015 in 2 pages.
Official Communication received in Korean Patent Application No. 10-2013-7017232 dated Dec. 22, 2014 in 2 pages.
Official Communication received in Korean Patent Application No. 10-2014-7033391 dated May 21, 2015 in 3 pages.
Official Communication received in Korean Patent Application No. 10-2014-7033391 dated Mar. 30, 2016 in 6 pages.
Official Communication received in Korean Patent Application No. 10-2017-7006678 dated Jul. 3, 2017 in 4 pages.
Official Communication received in Korean Patent Application No. 10-2017-7006678 dated May 28, 2018 in 5 pages.
International Search Report and Written Opinion received in PCT Application No. PCT/US2007/064175 dated Oct. 12, 2007 in 8 pages.
International Preliminary Report on Patentability and Written Opinion received in PCT Application No. PCT/US2007/064175 dated Sep. 16, 2008 in 8 pages.
Official Communication received in European Patent Application No. 15824646.2 dated Oct. 18, 2018 in 11 pages.
International Search Report and Written Opinion received in PCT Application No. PCT/US2015/042040 dated Apr. 22, 2016 in 13 pages.
International Preliminary Report on Patentability and Written Opinion received in PCT Application No. PCT/US2015/042040 dated Feb. 2, 2017 in 10 pages.
International Search Report and Written Opinion received in PCT Application No. PCT/US2017/027464 dated Aug. 17, 2017 in 6 pages.
International Preliminary Report on Patentability and Written Opinion received in PCT Application No. PCT/US2017/027464 dated Oct. 25, 2018 in 6 pages.
Firefly, https://www.fireflyon.com/ as captured via Page-Vault.com Sep. 20, 2019 in 7 pages.
Firefly—Agencies, https://www.fireflyon.com/agencies as captured via Page-Vault.com Sep. 20, 2019 in 3 pages.
Firefly—Blog, https://www.fireflyon.com/blog as captured via Page-Vault.com Sep. 20, 2019 in 1 page.
Firefly—Blog, https://www.fireflyon.com/blog with contact tab shown as captured via Page-Vault.com Sep. 20, 2019 in 1 page.
Firefly—Brands, https://www.fireflyon.com/brands with contact tab shown as captured via Page-Vault.com Sep. 20, 2019 in 3 pages.
Firefly—Jobs, https://jobs.lever.co/fireflyon/ as captured via Page-Vault.com Sep. 20, 2019 in 4 pages.
Firefly—Measurable Outdoor Advertising, https://www.fireflyon.com/measurable-outdoor as captured via Page-Vault.com Sep. 20, 2019 in 3 pages.
Firefly—Press, https://www.fireflyon.com/press as captured via Page-Vault.com Sep. 20, 2019 in 2 pages.
Geopath, https://www.geopath.org/ as captured via Page-Vault.com Sep. 20, 2019 in 8 pages.
Geopath—GeekOUT, https://www.geopath.org/geekout as captured via Page-Vault.com Sep. 20, 2019 in 5 pages.
Geopath—News, https://www.geopath.org/news as captured via Page-Vault.com Sep. 20, 2019 in 3 pages.
Geopath—Our Organization, https://www.geopath.org/our-org as captured via Page-Vault.com Sep. 20, 2019 in 4 pages.
Geopath—Tools, https://www.geopath.org/tools as captured via Page-Vaul.com Sep. 20, 2019 in 2 pages.
Lightout, https://www.lightout.com/ as captured via Page-Vault.com Sep. 20, 2019 in 4 pages.
Lightout—About Us, https://www.lightout.com/about-us as captured via Page-Vault.com Sep. 20, 2019 in 4 pages.
Lightout Biog, https://www.lightout.com/blog as captured via Page-Vault.com Sep. 20, 2019 in 4 pages.
Lightout—Careers, https://www.lightout.com/careers as captured via Page-Vault.com Sep. 20, 2019 in 2 pages.

(56) References Cited

OTHER PUBLICATIONS

Lightout—Cities, https://www.lightout.com/cities as captured via Page-Vault.com Sep. 20, 2019 in 2 pages.
Lightout—Drivers, https://www.lightout.com/drivers, as captured via Page-Vault.com Sep. 20, 2019 in 3 pages.
Lightout—Frequently Asked Questions, https://www.lightout.com/faq as captured via Page-Vault.com Sep. 20, 2019 in 2 pages.
Lightout—Nonprofits, https://www.lightout.com/nonprofits as captured via Page-Vault.com Sep. 20, 2019 in 2 pages.
Lightout—The Fin, https://www.lightout.com/fin as captured via Page-Vault.com Sep. 20, 2019 in 4 pages.
Lightout—The Portal, https://www.lightout.com/portal as captured via Page-Vault.com Sep. 20, 2019 in 4 pages.
Official Communication received in European Patent Application No. 07758697.2 dated Dec. 20, 2018 in 7 pages.
Official Communication received in European Patent Application No. 07758697.2 dated Nov. 5, 2019 in 20 pages.
Official Communication received in Chinese Patent Application No. 201580052015.5 dated Nov. 4, 2019 in 5 pages.
Official Communication received in Japanese Patent Application No. 2017-503091 dated Apr. 16, 2019 in 5 pages.
Official Communication received in European Patent Application No. 17783153.4 dated Oct. 24, 2019 in 9 pages.

\* cited by examiner ated upon the application of a foreign object will cause that flat
SYSTEM AND APPARATUS FOR MAKING, MOUNTING AND USING EXTERNALLY-MOUNTED DIGITAL DISPLAYS ON MOVING OBJECTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This invention relates to mounting and integrating displays on a moving object, such as a motor vehicle.

Background

It has been common practice to paint or attach signs and messages on moving objects. Today it is increasingly common to see electronic signage installed on fixed or moving objects and motor vehicles. A common purpose is advertising. Electric or electronic signage ranges from backlit translucent panels to full, high-resolution digital video displays. Video signage is easy to purchase in various forms and sizes and packaging flat LED or video panels in weather resistant cases for exterior mounting on vehicles has become commonplace, more in some countries than others.

SUMMARY

Traditionally, very little thought is given to the aesthetics of the electronic sign, its housing or the resulting impacts to the appearance of the vehicle to which it is attached—particularly in commercial applications such as taxis. Indeed, those who've attempted to physically add a flat panel video display to the professionally designed compound surfaces of a contemporary vehicle do little more than create a box-like housing between these two components to keep the weather out. There has been virtually no effort, thought or attention given to the professional integration of these displays or their housings with respect to the inherent design of a base vehicle. Change in this may promote wider acceptance and broadly marketable parts of future vehicles.

When the surfaces of both the display and the moving object are essentially flat (for example with a large flat video display on the side of a bus or a flat-sided truck) appearance may not be the biggest issue. However, when a moving object is a contemporary vehicle sculpted with aesthetics, aerodynamics and marketing appeal in mind, the vehicle is composed of a multiplicity of attractively blended compound surfaces (curved in two or more directions). The addition of a traditional flat foreign object will cause that flat part to stand out like the proverbial sore thumb.

Therefore, an opportunity exists for innovative technologies to improve upon current state of technology and address certain widely felt needs of these markets by inventing unique ways to package, mount, service, sell and use today's mobile displays to achieve the fully-integrated look, feel and character we imagine and expect from tomorrow's motor vehicles.

In accordance with the above, disclosed herein are various technical solutions to problems associated with the mounting, integration, and use of digital/electronic displays on vehicles. In some embodiments, improvements are provided for a new automotive (mobile) and fixed base outdoor/out-of-home digital display technology titled Hyper-Relevant Digital Surfaces (HDS). The present disclosure not only refines and evolves any currently existing mobile advertising systems, but also introduces new structures, new features, and new methods of design, manufacture, and complete integration. The new systems might be called a "transitional product" which can be developed for the easy(ier) adoption to current motor vehicles since it can be attached to, rather than be solely built-into or produced with original, basic or OEM auto production. Any of the various aspects of various HDSs discussed herein may be applied to either the "transitional product" and the basic or OEM auto production.

One objective of Hyper-Relevant Digital Surfaces (HDS) on vehicles is the safe viewing of content between paired vehicles (where "vehicle" is broadly used herein to describe any type of vehicle, such as an vehicle, bicycle, semi-truck, delivery vehicle, train, airplane, etc.) and/or between a vehicle paired with another device, such as a walking pedestrians cell phone. Some embodiments, more than two vehicles may be "paired" to provide interactive content that is relevant to multiple users and/or that may be divided across multiple vehicles.

A fundamental requirement for display of content on moving vehicles and/or displays that are viewable by drivers of vehicles, is to be safe and to not cause distractions. To meet this objective, content presentations should be carefully controlled for when vehicles are stopped or paused within defined criteria and timed to accommodate surrounding conditions such as traffic flows, traffic lights, pedestrian movements, et cetera. However, content should be presented in the best possible format for optimum results. In HDS context, format can include not only the displayed content-related elements, but also when, where, and how an HDS is seen.

Accordingly, one element governing mobile presentations is the placement of the display relative to the sightline of a viewer, where the viewer is often a seated driver and any front seat passengers in a vehicle to the immediate rear of a presenting (or publishing) vehicle. The optimum sightline of a viewer from most vehicles is forward and few degrees down below the horizon, and just off the hood or nose of the viewing vehicle. Therefore, for average vehicle-to-vehicle tandem-paused viewing, the best location for a display to achieve optimum sightlines is just above the bumper impact area and just below the lower edge of a vehicle's backlite (e.g., rear window). Unfortunately, this is the location most manufacturers today choose to create a stylish recess for mounting a vehicle's license plate and its illumination. The location is also favored for special trims, branding and often handles or latches for access. It is also the place many manufacturers install their rear window washer/wiper systems. But it is the license plate itself which often presents the greatest problem, which nearly all state laws require to be visible at all times. Various features and configurations of HDS display systems are provided in U.S. Pat. No. 9,183,572, titled "System And Method For Obtaining Revenue Through The Display Of Hyper-Relevant Advertising On Moving Objects," issued Oct. 10, 2015 and U.S. Publication No. 20150266421, titled "Digital Display System With A Front-Facing Camera And Rear Digital Display System With A Front-Facing Camera And Rear Digital Display," filed Mar. 19, 2015, each of which are hereby incorporated by reference in their entireties and for all purposes. Accordingly, any description or drawing of an HDS system, component, process, etc. disclosed in any of these matters may be implemented in conjunction with the HDS systems, components, processes, etc. discuss herein.

As used herein, the terms "smart display", "HDS", "Hyper-Relevant Digital Surface", "HDS Assembly" and other similar terminology may be used interchangeably herein in reference to any portion or all of a HDS system.

In some embodiments, a license plate recess (or other license plates attachment surface or area) could be moved to a different portion of the vehicle. For example, a license plate display attachment may be relocated from the center of a vehicle hatch or rear decks to a location in the bumper with an illumination bar atop the plate. This type of quick workaround may require new wiring and fasteners as well as a special frame for the license plates. However, such designs may affect nearly all original aesthetics while leaving the plate and associated lighting vulnerable upon bumper impacts, effectively taking away some of the bumper's original functionality. In certain of the embodiments discussed herein, an improved system and method for mounting electronic displays on vehicles in optimum positions enhancing the ability, safety, etc., and additionally without loss of license plate information, are described. Further, certain embodiments which improve upon prior display attachments by providing critical functionalities, such as heating and cooling, shock mounting, insulation, expansion/contraction resistance, et cetera, are disclosed.

In some embodiments, the HDS display is attractive, functional, serviceable, safe, and secure. Further, it provides for installation of the display on any make or model of a vehicle while preserving the vehicle's original design integrity. Some aspects disclose methods of designing and manufacturing HDS displays as a part of the original, OEM, vehicle, thus incorporating the disclosed technology in newly purchased vehicles, for example. Also disclosed are embodiments for retrofitting existing vehicles, such as consumer vehicles, with HDS displays of various configurations that provide similar advantages as noted above, in which may be easily mounted on existing vehicles while providing minimal interference, if at all, with the original vehicle design.

In some embodiments, the HDS display is superimposed on or over a vehicle's rear license plate without losing the license plate information. Where an actual license plate is required, the display may selectively control transparency to provide visibility to the license plate. In some embodiments, such an HDS display is said to be operating in "transparency mode," where transparency of portions (or all of) the display surface may be selectively adjusted. Such transparent viewing may function with power on or off, be actively controlled, called-up or enhanced with a variety of external sensors, means or signals, or made visible in the event of a total vehicle power failure.

In some embodiments, the HDS display may be made sufficiently transparent such that the superimposition does not alter the vehicle's original aesthetics when display is turned off. Alternatively, a predefined image of the original vehicle surface may be presented on the display to sufficiently imitate the original surface such that a bystander may not be able to distinguish the HDS display with a cursory view. An image of a license plate may be stored (transitionally for display and/or more permanently) in the form of "image data," such as a commonly available image format, e.g., JPG, PNG, PDF, etc., and available for display on the HDS display and/or elsewhere.

In some embodiments, the HDS display provides license plate information with controlled reproduction of a digital facsimile of license plate.

In some embodiments, 3-D scans may be used to generate the displayed digital content and manufacturing tooling.

In some embodiments, the HDS display utilizes the host vehicle's license plate recess as mechanical and/or electrical connection medium. Further, the recess volume may house essential electronics.

In some embodiments, the host vehicle's surfaces provide the HDS display with functionality and structural support. The host vehicle's surface may also assist functionalities such as heating and cooling, shock mounting, insulation, expansion/contraction resistance, et cetera.

In some embodiments, the display may be programmed to show real-time digital effects, including 3-D effects. In some embodiments, the displays may have photochromic glass or polarization that may visually change the vehicle's surface.

BRIEF DESCRIPTION OF THE DRAWINGS

These and other features, aspects, and advantages of the disclosed apparatus, systems, and methods will now be described in connection with embodiments shown in the accompanying drawings, which are schematic and not necessarily to scale. The illustrated embodiments are merely examples and are not intended to limit the apparatus, systems, and methods. The drawings include the following figures, which can be briefly described as follows.

DETAILED DESCRIPTION

Figure 1:
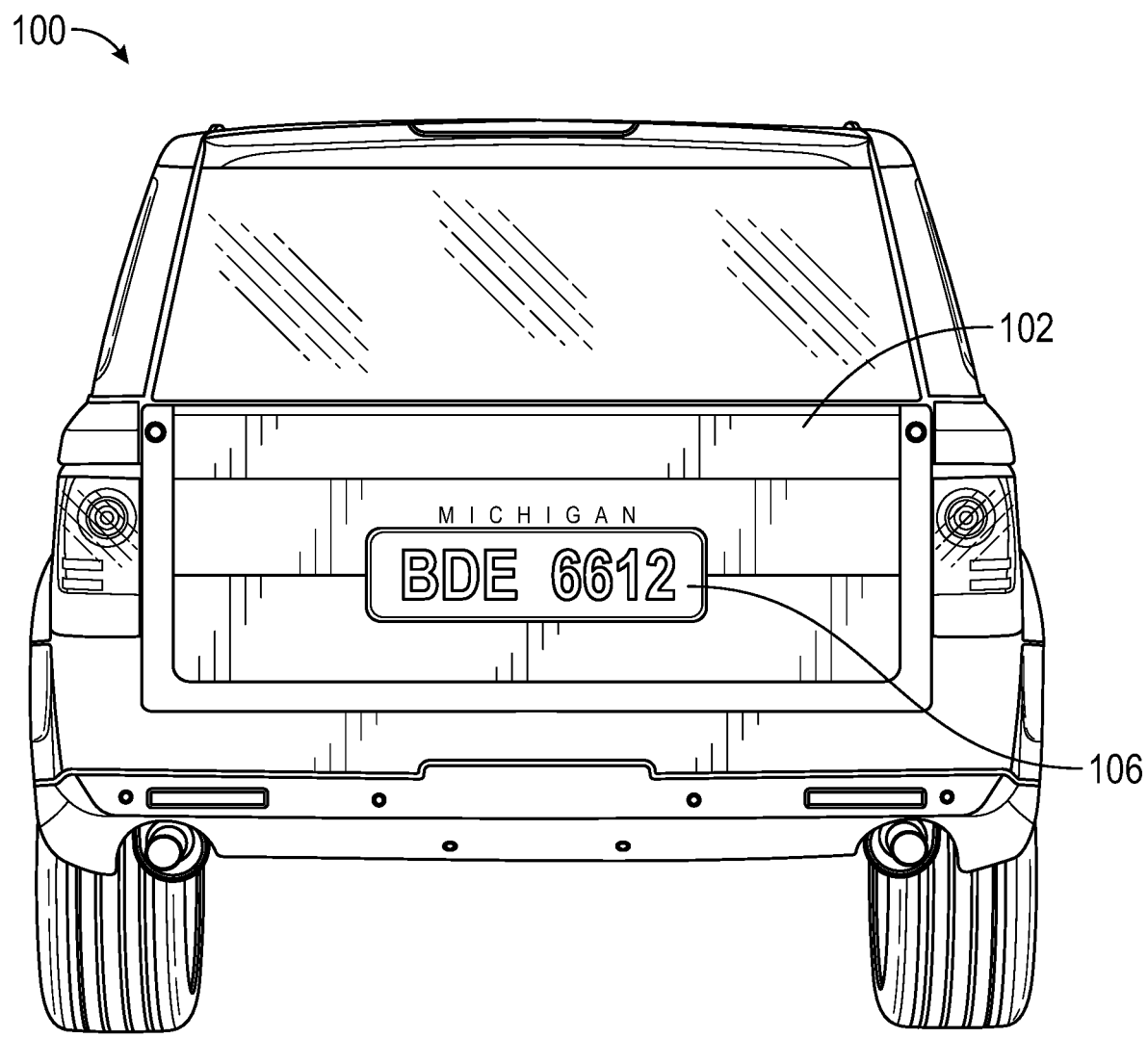
FIG. 1 illustrates one embodiment of a rear view of a vehicle with an HDS display.

HDS Display Technology can be integrated nearly anywhere. One location where such HDS have not been utilized before is on vehicles. More specifically, there has not been a utilization of HDS on vehicles in traffic, where a vehicle is stalled in front of another vehicle, creating a physical viewing relationship we call "tandem-paused"—when an HDS-mounting motor vehicle in a lane of traffic can either stop or slow to the point it can safely present a static or dynamic video image to the occupants of a second motor vehicle paused (or following) immediately behind in a tandem configuration. Once vehicles have entered a tandem-pause pairing (defined by vehicle proximity, speed, relative movement, daylight, time of day, weather conditions, traffic signals and a variety of other sensed conditions compared in real-time to established HDS presentation standards and operational criteria), the paired vehicles are permitted to complete one or more display transactions. In these display transactions, there is a presenting vehicle (or a "publishing") vehicle delivering content to a viewing vehicle. This disclosure shall call the systems and related methods to mount HDS on vehicles simply "HDS displays" throughout the disclosure for brevity. It should be noted that while "mounting" is liberally used in describing various aspects of the invention, the inventive idea in this disclosure is not limited by the concept of mounting and various inventive aspects of the disclosure should be considered in isolation from "mounting." For example, an HDS display may be accommodated into a vehicle where a vehicle is designed with the HDS display in mind. In this disclosure, such design and/or integration process may be referred to as "mounting" the display while the final product on a vehicle may be referred to as having a "mounted" HDS display.

Installs on Any Make/Model of Vehicles

The embodiments discussed herein add a physically-compatible digital surface to any vehicle which are preferably thin, mounted close-to-the surface, and have physical dimensions conforming to the original appearances. However, each vehicle has distinct physical dimensions for its HDS-mounting surfaces based on its make, model, or year. One innovative aspect described herein is overcoming the challenge presented by the distinct dimensions with novel and reliable systems and methods to adapt HDS displays to any vehicle. Throughout the current application, Applicant will disclose various embodiments that detail how the HDS display may be adapted in its various forms to be accommodated into any make, model, and year of vehicles.

Preserves Original Design Integrity

Embodiments of the HDS displays will preserve a target vehicle's original design integrity by replicating its appearance to the greatest extent possible. As will be detailed in other sections below, each display will be designed based on 3-D digitized scan data and replicates or closely approximates target vehicle's apparent or actual surface dimensions including size, trim, and curvatures. The outer protective cover will be made of transparent glass or plastic with some embodiments using transparent display OLED/TFT diaphragms. Further, the embodiments disclose methods to minimize trims and conceal functional elements (detailed in other sections). With approximately 95% of the visible product essentially transparent, finished HDS display is largely or often invisible floating on top of the surface of the target vehicle when attached. Additionally, some embodiments of the HDS display translates the original 3-D surface scans of a host vehicle into a same-size, full-scale, true-color, rendered video image and present the digital image onto the HDS display thereby preserving the original design integrity. External cameras and sensors may provide real-time data of a host vehicle's immediate surroundings so that the projection of the original surface may be adjusted to reflect real-time conditions (detailed in Real-Time Effects section).

FIG. 1 shows a rear view of a vehicle (e.g., an SUV or any other vehicle) with an HDS display. The illustration shows the HDS display 102 displaying a digitized license plate 106 showing a stylized version of the information typically present on traditional license plates. Generally, a contemporary pickup truck or an SUV with a wide, relatively flat (or flat in certain embodiments), and rectangular rear surface provides a nearly perfect accommodation site for an HDS display 102. The HDS display 102, unlike prior clunky commercial display attachments, is integrated into the host pickup truck vehicle mostly preserving the host vehicle's original appearance. To have such successful integration, various physical dimensional parameters are considered, including, size, aspect ratio, and/or elevation above the highway surface. While attachment to a mostly rectilinear area, such as on a rear end of a pickup truck or SUV, may allow easier attachment of a HDS display, disclosed herein are improvements to attachment mechanisms and methods that allow HDS displays to be just as easily, or nearly as easily, attached to any vehicle curvatures.

Figure 2A:
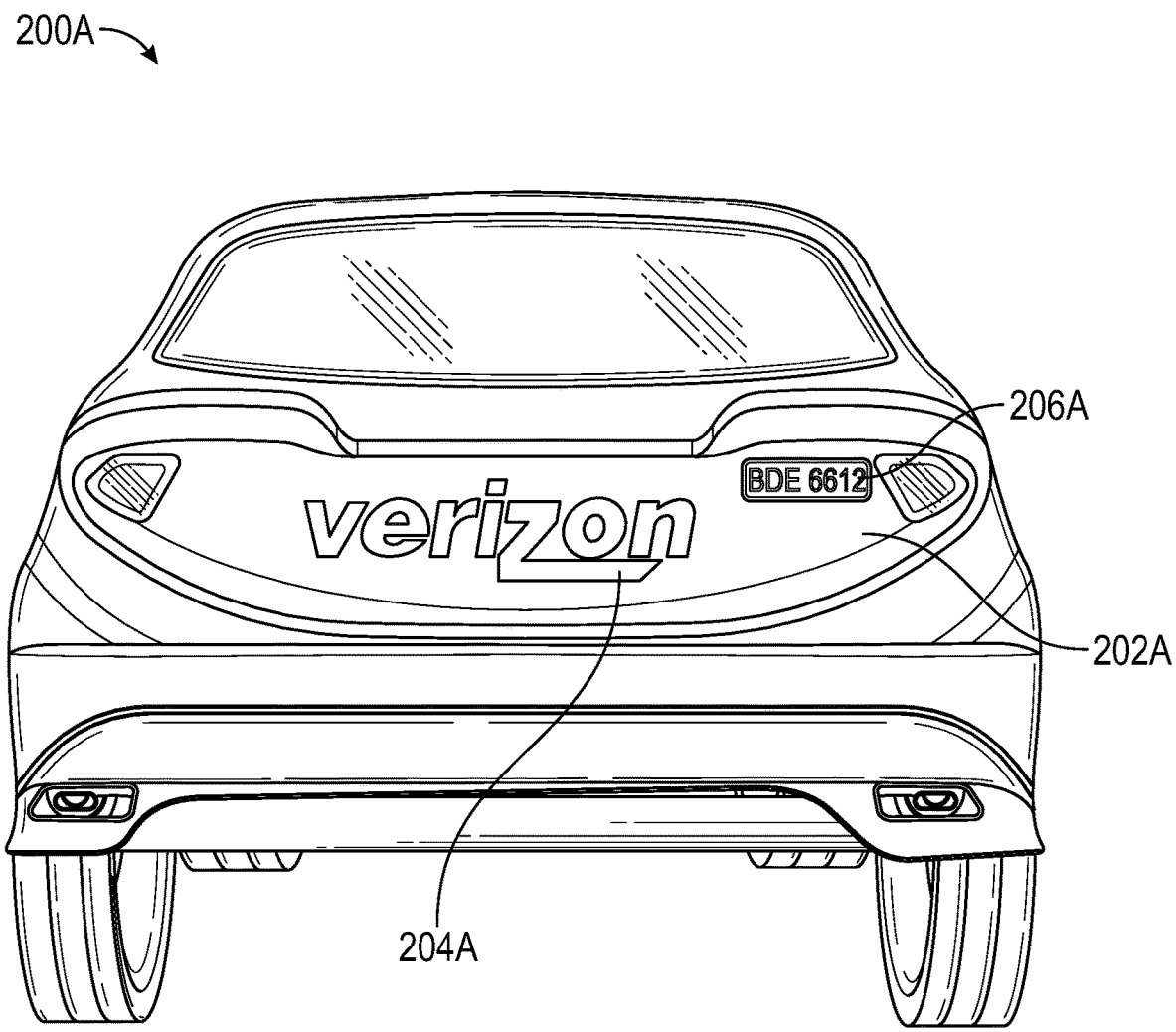
FIG. 2A illustrates one embodiment of a rear view of a vehicle with an HDS display designed for a non-rectilinear shape and curvature.

FIG. 2A shows a rear view of a vehicle which has a more non-rectilinear shape and curvature than the example of FIG. 1. In this embodiment, the HDS display 202A is customized to match the host vehicle's relatively flat top portion and a bowl-like curved bottom portion and convex curvature popping out from the illustration. The HDS display 202A is publishing a commercial image 204A and a digitized license plate 206A. The license plate information 206A is moved to the right taillight area to make room for the commercial image 204A in a central portion of the display. In this example, the display 202A is moderately tinted and semi-transparent such that the commercial image 204A is readily recognizable but the original tail lights and the license plate recess are visible. The illustration is an example of a more customized HDS display with nonstandard dimensions.

Figure 2B:
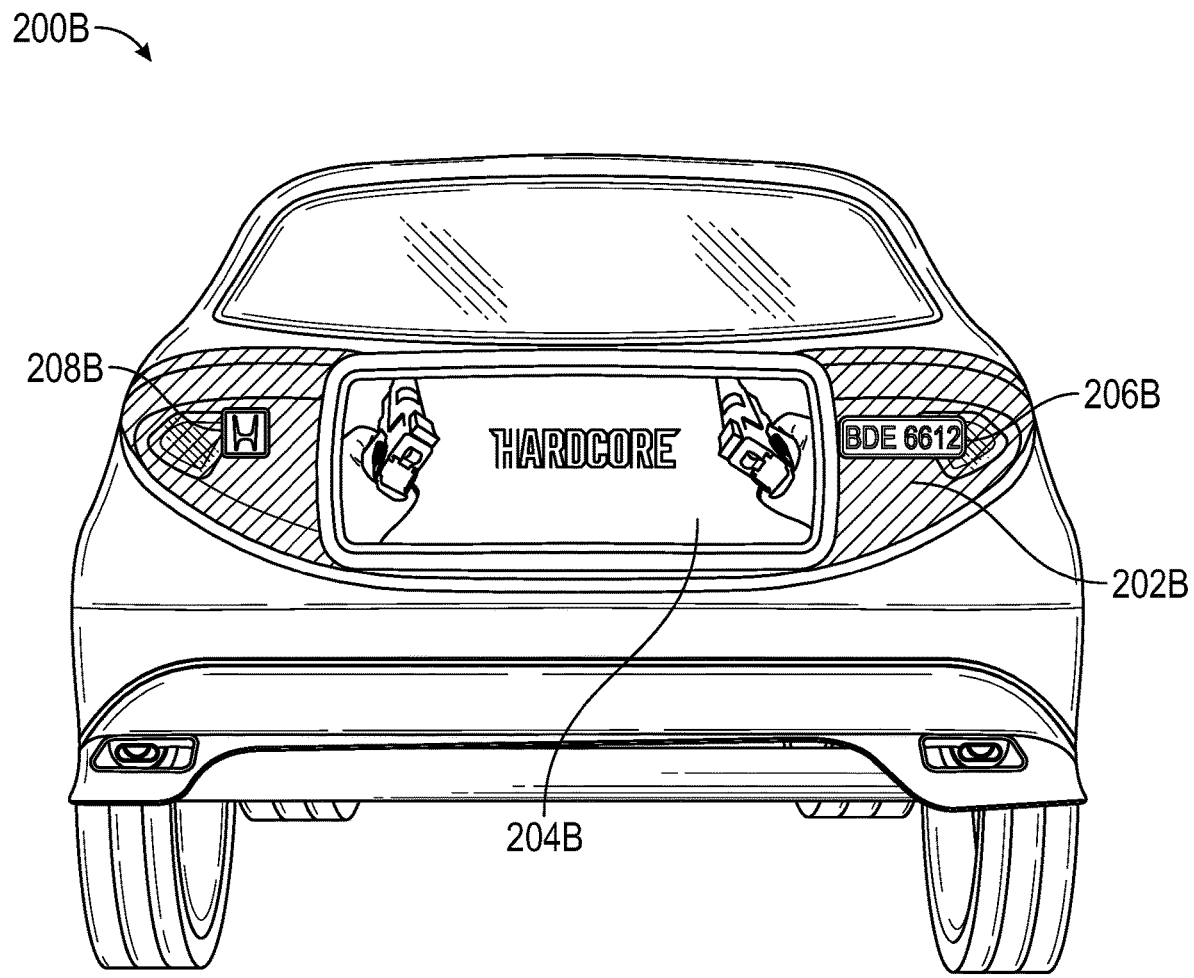
FIG. 2B illustrates one embodiment of a rear view of a vehicle with an HDS display publishing commercials.

FIG. 2B shows the same vehicle with an HDS display 202B publishing a larger commercial image 204B. In contrast with FIG. 2A, the display 202B is almost completely tinted and non-transparent to provide greater visibility to the commercial image 204B. Also, in addition to the digital license plate 206B on the right taillight, a brand logo 208B is displayed on the left taillight. Advantageously, in various embodiments discussed herein, the displayed features, such as the license plate, commercial imagery, vehicle manufacturer logo, etc., may be customized and/or updated at any time, such as at the time of purchase of the vehicle, or even in real time according to a consumer's preferences.

Figure 2C:
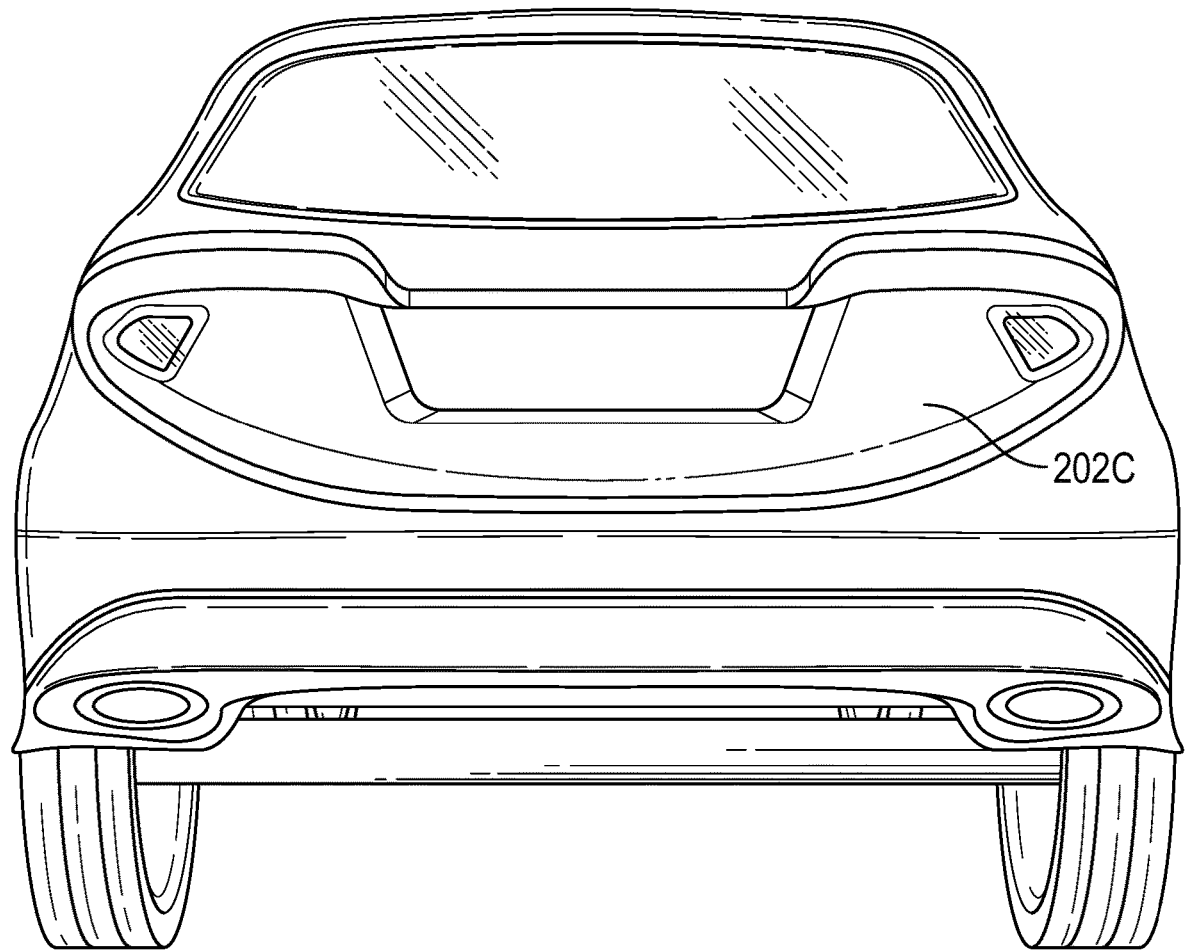
FIG. 2C illustrates one embodiment of a rear view of a vehicle with an HDS display publishing no content, making it appear as if it does not exist.

FIG. 2C shows a rear view of a vehicle with the same HDS display. However, the HDS display 202C is not publishing any content. Additionally, the display 202C is configured with complete transparency and no tint. Despite the fact that there is an HDS display 202C installed, a passerby would not easily notice that there is any externally attached device on the host vehicle. In some embodiments, the completion transparency allows the original license plate mounted on the vehicle (not shown in this figure) to be viewed through the HDS display.

It should be noted that in present disclosure, for the lack of better words, "customization" will additionally have the meaning of giving an HDS display product a greater degree of conformity to any desired physical dimensions, such as where the desired physical dimension is objectively preferred for greater unobtrusiveness or aesthetic quality. On contrary, "standardization" will additionally have the meaning of compromising some degree of objectively desired physical dimensions but providing an easier access to finished HDS display products. While customization generally carries implications of prolonged adjustments and higher costs whereas standardization generally carries implications of quicker production and lower costs, customization and standardization in certain embodiments discussed here are not necessarily inversely related. For example, a fully customized HDS display product offering greater conformance to the desired physical dimensions for its aesthetic quality may not necessarily take longer to produce or be more expensive than a standard HDS display product. For example, a quick-to-manufacture HDS display that is highly desirable because of its perfect resemblance to an original form factor does not necessarily become a "standard" HDS display simply because the design allows for a cheap mass production. It remains a perfectly "customized" HDS display.

Sliding Scale of Customization

Vehicles come with various original designs. As discussed herein, HDS displays may be customized and configured on an individual vehicle level, or for a particular make, model, and year of a vehicle, for example. In one embodiment, a target vehicle is individually analyzed so that a specific HDS display that is fully-customized to perfectly match its surface may be produced.

Figure 14:
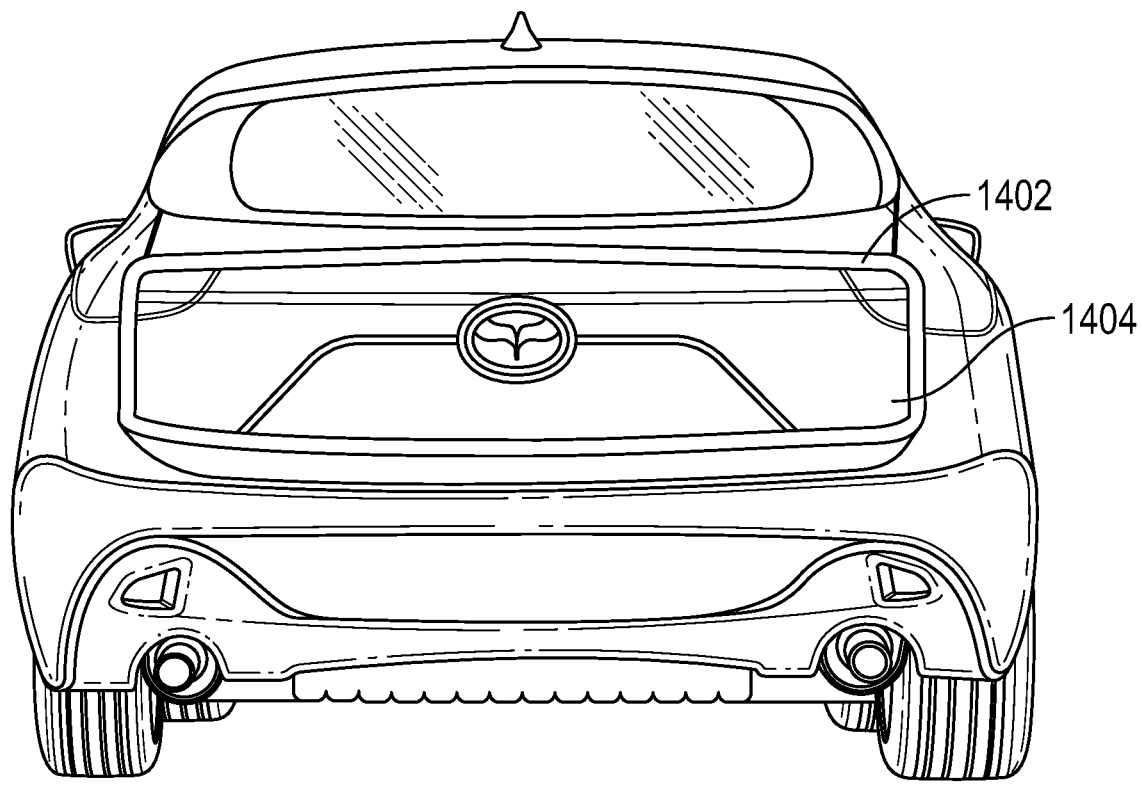
FIG. 14 illustrates an example embodiment of a vehicle with a standard HDS display configuration.

In practice, there are thousands of vehicles with different brand, make, and model and, thus, HDS display customizations may be targeted to more or less suit similar vehicles types (e.g., pickup trucks of different makes where the vehicles may differ in overall designs but may share similar attachment site surface design). Accordingly, it is quite possible to consolidate HDS display designs to few families or categories where one design may satisfy the safety, aesthetic, and functional requirements. An HDS display from an associated family or class may not necessarily provide a perfect match with a particular target vehicle's original surface, but it may be adapted with little effort to safely and functionally match the surface (for example, by using structural standoffs detailed in Tooling section). In some embodiments, such as where there are a limited quantity of designs available wherein at least one of the designs a good match to any particular vehicle, these HDS displays may be pre-manufactured and selected at an auto service station and installed by a display adoption technician, for example. The more standard the design, the more it is likely to stand as being something added to a vehicle as a second thought. These standard designs will be ready to meet broad, more common market requirements, such as a relatively flat/mildly crowned yet pleasing display with a practical, if not nearly invisible edge trim and a relatively universal mounting for say, mid-range SUVs, vans, trucks or busses, with fleet or economy pricing. These HDS displays would not interfere with most of the host vehicle's original design, but may alter the appearance slightly (e.g., FIG. 1, 102 HDS display could be one such standardized HDS display). As another example, FIG. 14 shows a vehicle with a more customized, but still largely standard HDS display system (that may be usable across multiple makes, models, years of vehicles, for example). This HDS display 1404 has a generally rectangular shape with a reasonably larger trim 1402.

Then there may be a moderately-customized design tied to one specific make, model, and year of a vehicle. The HDS displays in FIGS. 2A-C are such HDS displays customized to a specific model and make. The HDS display matches exact size, trim, aspect ratio, curvature, and other physical dimensions to preserve original design (See FIG. 2C with the HDS display publishing no content). These HDS displays, because they are specific to a make and model, may publish more enhanced and accurate real-time effects.

Even more discriminating buyers for such brands as Mercedes, Cadillac, Range Rover, etc. may appreciate fully-customized HDS displays which are built with the target vehicle. These HDS display products may be designed completely in concert with the in-house design studios of those automakers and may incorporate the current logos surfaces and finishes established and recognized as part of those brands into the HDS display. In other embodiments, design software may be provided directly to the consumer, for example, that allows the consumer to customize their HDS display, such as when ordering a new vehicle or as a customized add-on to an existing vehicle.

Figure 3A:
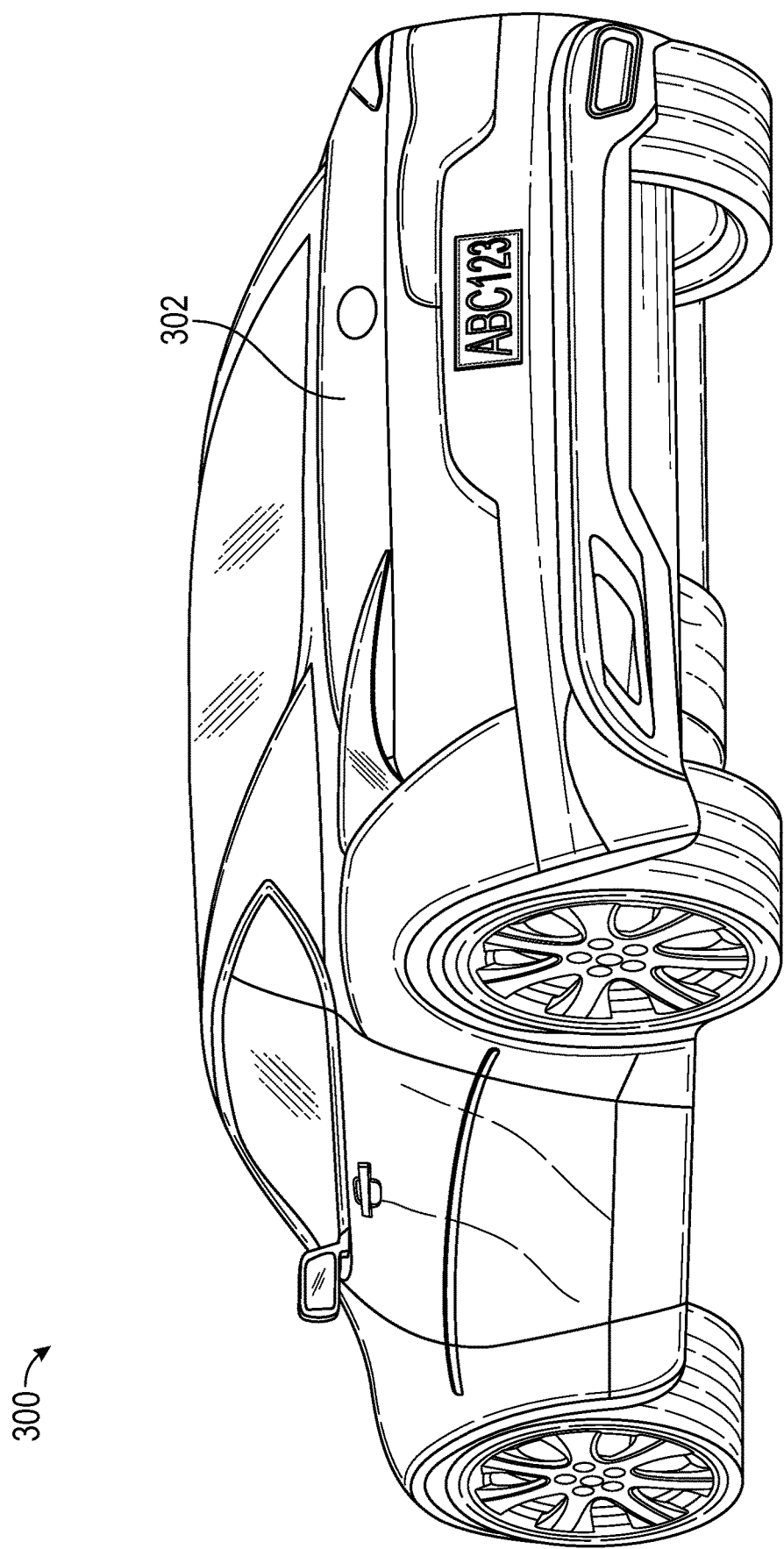
FIG. 3A s illustrates one embodiment of a luxury brand vehicle without an HDS display.
Figure 3B:
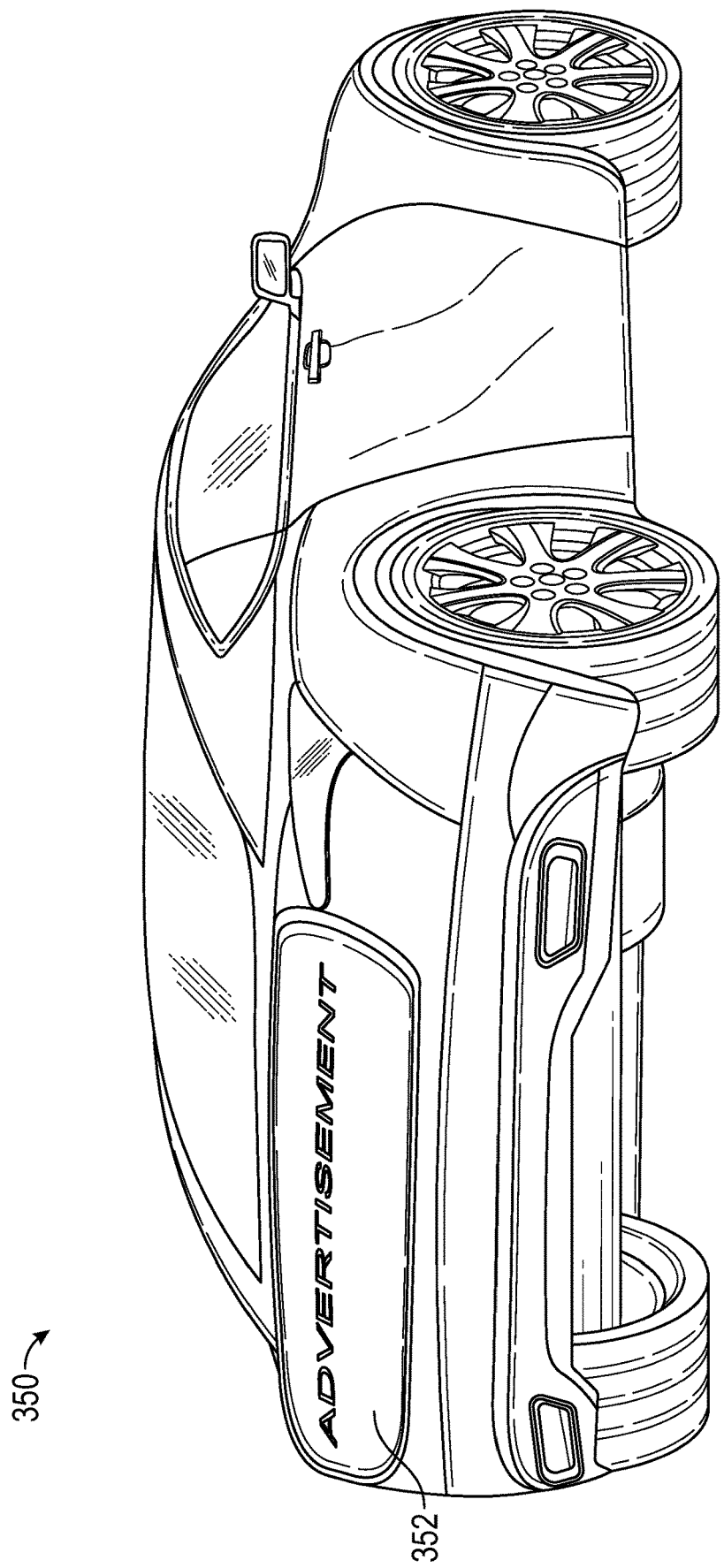
FIG. 3B s illustrates one embodiment of a luxury brand vehicle with a fully-customized HDS display.

FIG. 3A shows a base vehicle 300 having an unaltered rear surface 302 without the HDS display and FIG. 3B illustrates same vehicle 350 with an HDS display 352. As discussed elsewhere herein, an HDS display maybe customized and attached post-production of a vehicle four may be part of the OEM vehicle that is originally manufactured and delivered to the customer. Thus, if the vehicle is designed with an HDS display in mind, the HDS display may open choices to new designs. The integrated HDS display will be recognized as part of the original brand with curves and edges that blend in.

Accordingly, the degree of customization is on a sliding scale. Many embodiments are likely to have about 80% standard form factors and 20% custom form factors with the custom form factors primarily in those areas which have to fit perfectly (seal against) the surfaces of a particular vehicle, while other embodiments have various levels of customization, such as 50%, 80%, or 100%.

Customizing HDS Displays

HDS displays can include a number of parts which are shared between varieties of different vehicle brands, models and classes. The primary HDS display case designed to house the display itself may be produced in two or three basic sizes and aspect ratios and may be molded and stocked in a similar number of curvatures to best match the general range of vehicle classes (see FIG. 4A, 402, 404, and 406). Typically, the straight-on end view of the display face determines the useful display area for a standard integration. Other relevant considerations in a standard integration with the design of a target vehicle may include balancing of multiple elements: curvature, aspect ratio, size, trim, and/or standoff/closeout to optimize the X,Y,Z positioning of a closely-matched surface to an existing vehicular surface, then filling in any remaining space as needed to further seal the coupling. Some embodiments may use 3-D digital scans to facilitate the design process.

Generally, an HDS display installation/integration may take steps of (1) measuring a baseline vehicle, (2) defining perimeter mount and center recess, (3) selecting correct size, elevation, and aspect ratio, (4) locking-in display curvatures, stations and stand-offs, and (5) modelling final interface, each of which are discussed in further detail below.

Defining Perimeter Mount

Figure 5:
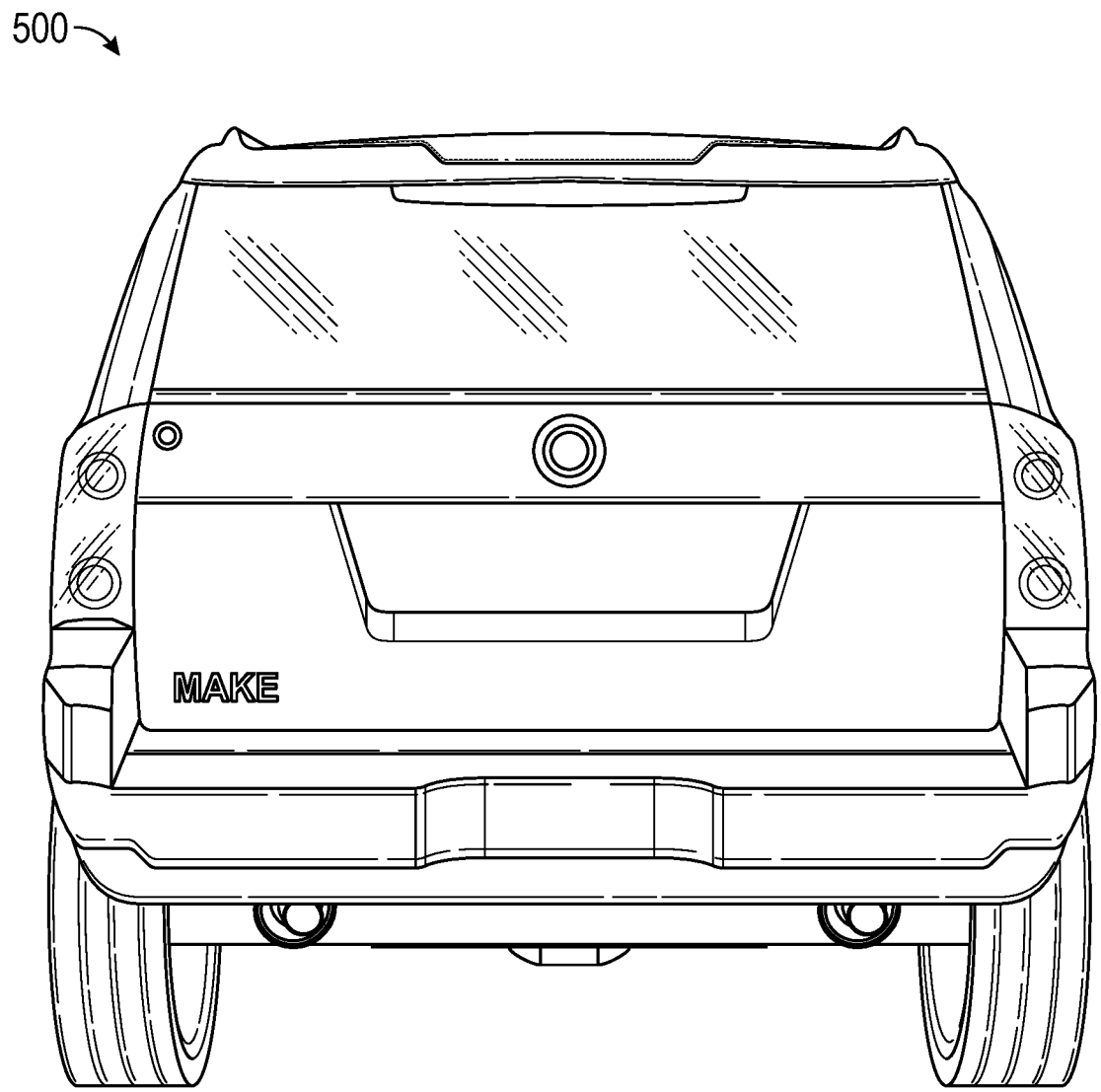
FIG. 5 illustrates an example embodiment of a rear view of a vehicle with an HDS display without an actual license plate.

FIG. 5 shows a modified vehicle that may be placed in a 3-D (or alternatively, XYZ-axes) scanning fixture and referenced to horizontal, vertical, longitudinal and centerline baseline data. For the 3-D scanning, any type of 3-D scanner, as long as it is functionally satisfactory in regards to resolution and accommodates scanning subjects larger or equal to the scanned surface, may be used. Some embodiments may use laser-scanners, which generally execute software (or an embedded system) that controls a process to convert received vector data into movement information that is sent to a scanhead. A scanhead may include two (or more) mirrors that are able to deflect a laser beam in one level (X and Y axes), and/or a third dimension may be included using optics that move the laser's focal point in the depth-direction (Z axis). Scanning the laser focus in the third spatial dimension advantageously allows detection of curved surfaces, such as those of vehicles. In some embodiments, multiple scanheads may be used. In other embodiments, other types of imaging may be used, such as photographs of a vehicle taken from multiple angles and positions that are combined programmatically (e.g. by software) to determine a three-dimensional shape of a surface (e.g., the rear end of a vehicle to which a HDS display is to be mounted). In other embodiments, contact type scanners may be used as well.

Once a target vehicle is scanned, a digitized XYZ scan (e.g., a three dimensional or 3D representation of the attachment surface) is generated, which may include complex curvatures, trim, chrome, attached jewelry, glazing, lighting, character and cut lines, themes, queues, panel perimeters, parting lines, body penetrations (e.g., latches, locks, rear wiper systems), and/or any other surface feature of the scanned surface. In some embodiments utilizing the license plate recess for HDS display attachment, the 3D scan excludes license plate and plate mounting brackets. This digitized XYZ scan may be analyzed by software algorithms to identify a part of the surface that will occupy and seal the space between an optimally positioned rear-facing display and the surface of the scanned vehicle (e.g., a "gap" between the display and the vehicle surface), which may generally be referred to herein as standoffs. In some embodiments, one or more sealed attachment standoffs are positioned in the space between the back surface of the display and the rear (mounting) surface of the vehicle by essentially filling that area with a standoff structure that is weather sealed to the vehicle attachment surface.

In some embodiments, the digitized XYZ scan data is also used to render digital versions of the original surfaces of the vehicle in factory colors, finishes and trims. The rendered version is then uploaded to that vehicle's onboard database where it may later be projected on HDS display mimicking the original surface. This first step thus provides the basis for tooling a unique mating component, and for executing a variety of special digital effects in the field to enhance HDS display product and its unique content display experience.

Figure 6:
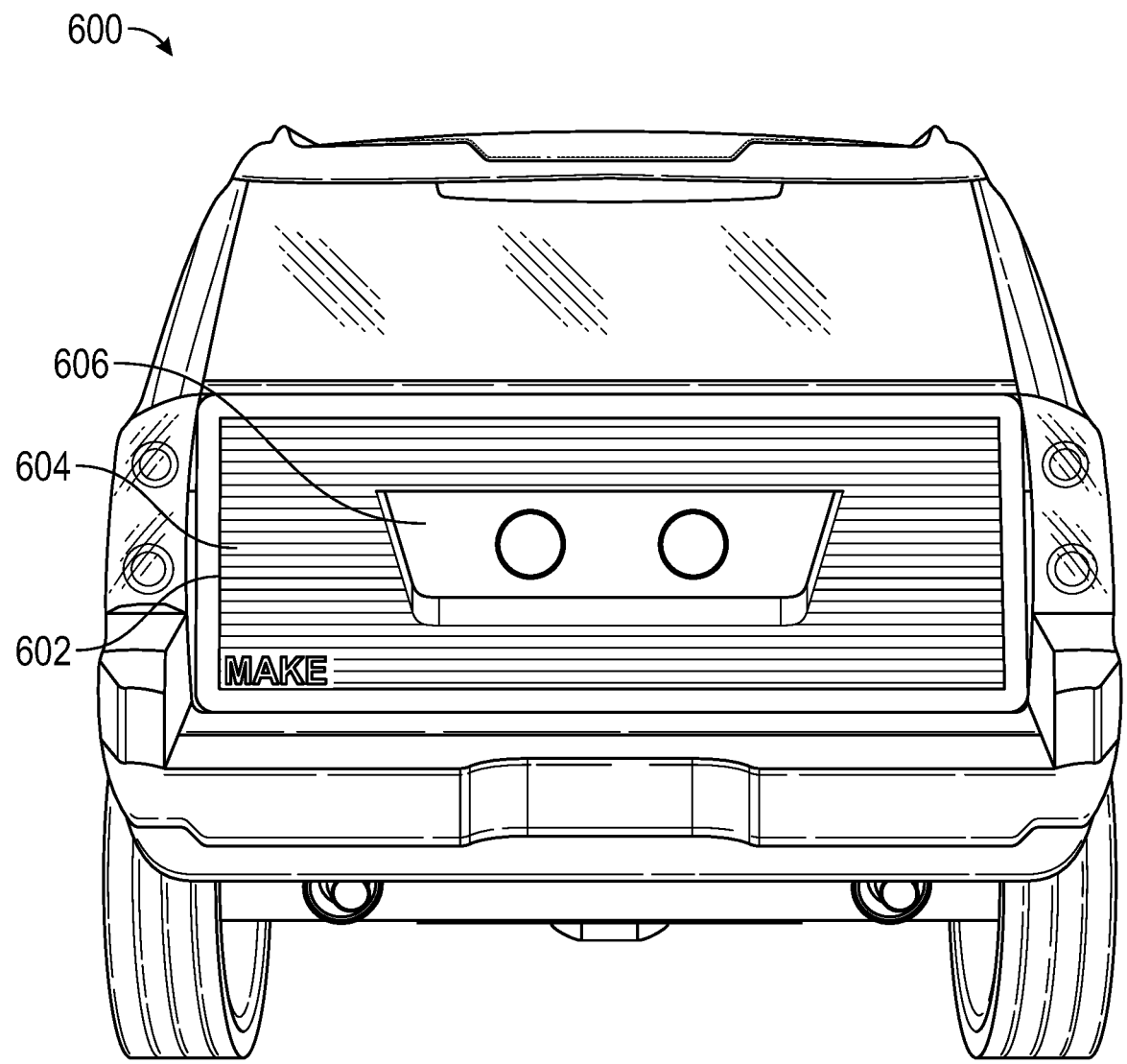
FIG. 6 illustrates an example embodiment a rear view of a vehicle with emphasis on a ribbed standoff.

After a digitized XYZ scan becomes available, a mounting algorithm identifies an outboard perimeter for an HDS display mount on the target vehicle's mounting surface. The scanning system may then present the identified perimeter to a display adoption technician on a presentation system and ask for manual adjustment or acceptance. The outboard perimeter cut lines may be completely or partially defined by the form and extent of a trunk, deck lid, hatch, door, tailgate, and/or other physical features (see FIG. 6, 602).

Next, the mounting algorithm displays and suggests the most likely location for the perimeter mount strip 602, such as immediately inboard the cut lines on the non-glazed lower hatch, following that perimeter. This is typical for a first iteration for a full perimeter mount strip 602 which suggests a best or preferred perimeter mount for the display. It should be noted, however, that what is referred to as a "perimeter strip" here, need not be located at the perimeter of the HDS display component or the perimeter of the panel it is mounted on, but may be located nearly anywhere where it makes sense in terms of structures and sealing; nor does this strip need to be of any particular dimension or be a parallel strip since it may need to vary its physical dimensions to follow surface curvatures (FIG. 2A, 200A) or clear certain objects on a vehicle's surface. In some embodiments, an HDS display product may take a form of attaching an OLED/TFT diaphragm directly onto the surface and may have the algorithm suggest a different perimeter in order to accommodate the change in incorporation method. Also, depending on used display type or method of securing/incorporating the display, the algorithm may suggest yet different perimeter strip dimensions.

Where an adoption technician may need to interact with the proposed design from a digitized XYZ scan, much of the aesthetic design can be achieved from the sightline point of view of an onlooker in a tandem-paused vehicle to the immediate rear. Here the crown of a deck lid, a spoiler, or an edge of glazing offers the technician an upper horizontal reference for both the top of the active display area while the left/right angles of a rear deck cut line, a tail light or a fender bulge might offer cues for the lateral edges of the display and its trim. The upper fillets of a bumper, or the character lines of a rear hatch may help identify the lower edges of the display.

One function of the HDS display trim is to protect the HDS display edge from impacts, enclose sealed edges, create a visual frame around the chosen display size, provide an easy means to duplicate almost exactly the rear character lines of a vehicle as viewed from the rear, and/or to tailor the visual area between those character lines and the edges of the display glazing. Embodiments, the display edges reflect a theme or appearance of the HDS display partially or completely around the top, bottom, left & right edges of the trim. In some embodiments, the display trim contacts certain vehicle surfaces wherein it can make this surrounding trim appear as though it is an original part of the target vehicle. The trim (or frame) can be also be produced in a variety of materials—ranging from clear to black, from smooth glass-like finishes to textured, satin. The frame is conceived to accept (for example) air inlets or air extractors, brand logos, recesses for sensors or cameras and other trim items which, when directed or selected by a skilled designer (and in some instances even by an algorithm) all of which result in the production of a part which appears custom sized, shaped and detailed for a particular vehicle.

Selecting Size, Elevation, and Aspect Ratio

Choosing the most appropriate size and aspect ratio for the display, relative to the target vehicle may be performed once a particular location for the display has been identified, such as after the perimeter strip dimension has been defined. This may be based on the sizes of the glass or plastic covers and TFT matrix assembly that are available and/or most economical. In some embodiments, these might be straight-cut sections with radius corners. In some other embodiments, they may be mildly curved to match the lines of the base vehicle when viewed straight on from the rear. The displays may be of the same or similar aspect ratio as TVs, with the final widths, heights and outer perimeter curves being added by HDS display outer trim or frame.

Figure 4A:
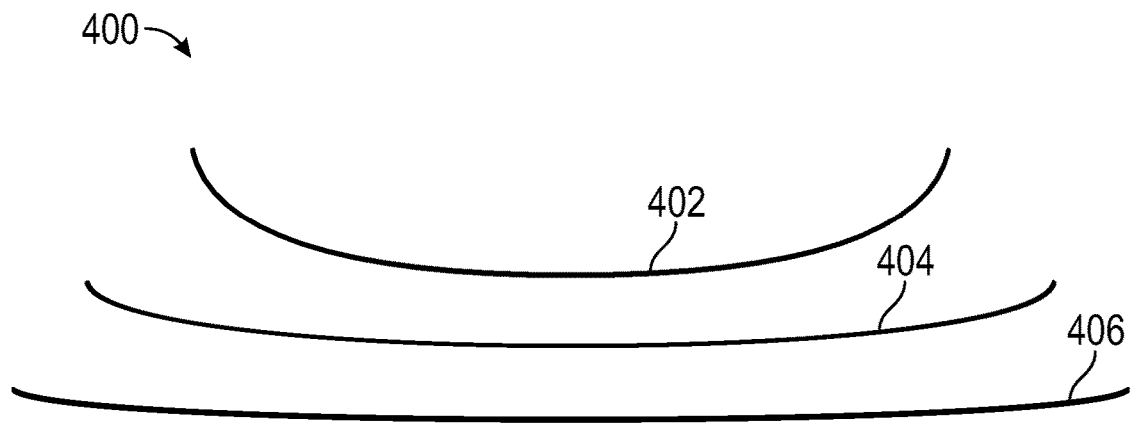
FIG. 4A-C illustrates one embodiment of various display curvatures and selecting the right curvature.
Figure 7:
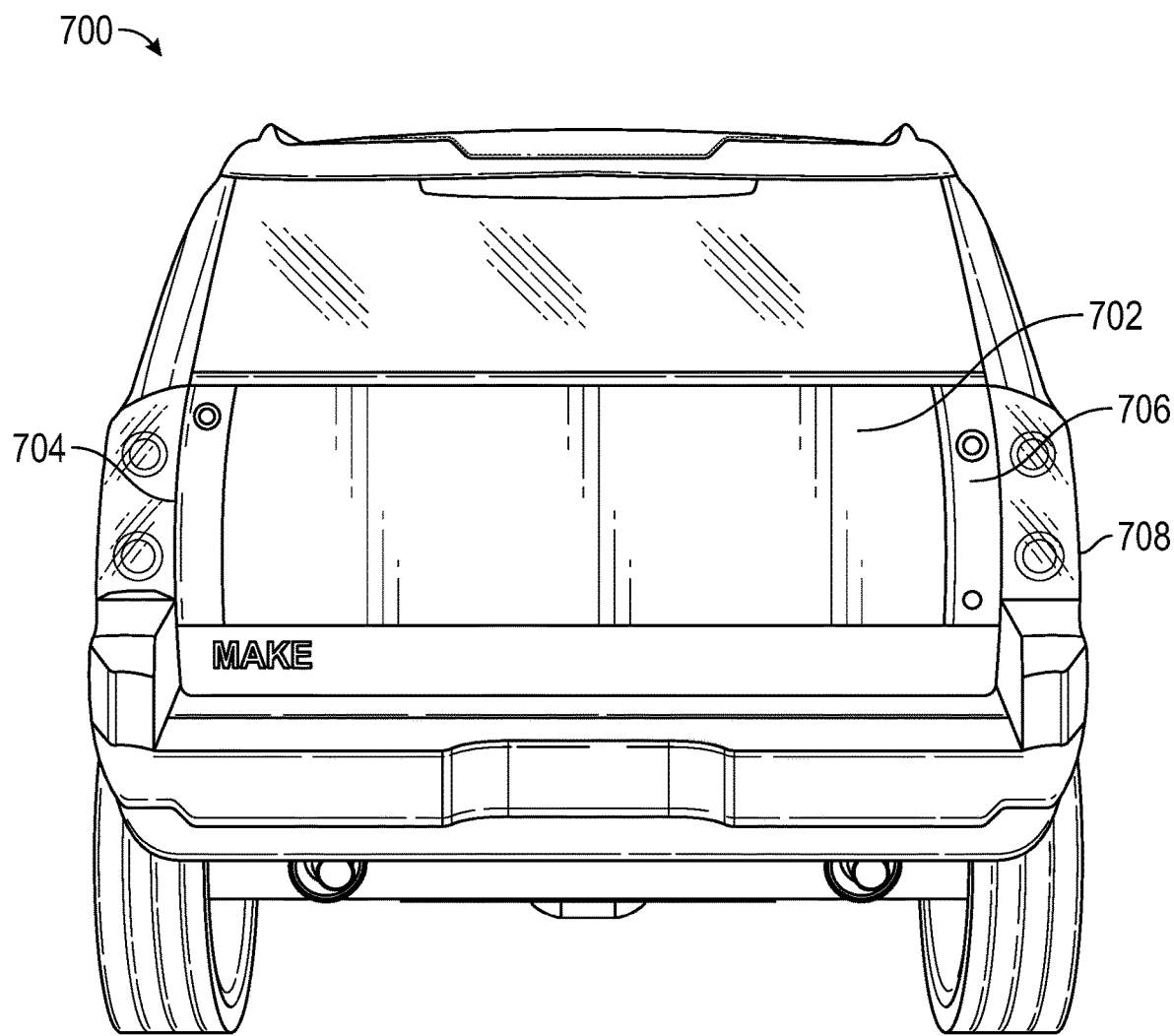
FIG. 7 illustrates an example embodiment a rear view of a vehicle with finished HDS display configuration.

FIG. 7 shows an HDS display 702 having a straight top and bottom, but with left and right vertical perimeters slightly curved similar to curvature in FIG. 4A, 406 to correspond with the target vehicle's lower hatch edges. The design and/or manufacturing process may be shared with a slightly larger or smaller base vehicle, with the outer right and left trim strips (shown in FIG. 7, 704) made wider or narrower to accommodate the changes, making the component appear custom designed. In some embodiments, an HDS display may incorporate queuing and measuring instruments such as targeting cameras, proximity sensors, dedicated short-range communications (DSRC) receivers, and optical receivers (visible or IR) at locations similar to those shown in FIG. 7, 706 and 708. Trim panels may also carry logos for a vehicle brand or model in those or similar locations.

To accommodate mid-range vs. full-size pickup truck tailgates, the manufacturing and mounting process might be the same or similar, possibly using different blank sizes for the TFT matrix, while using the same clear covers, trims, electronics, branding, etc. Certain vehicles, such as an SUV, for example, might share common glass or plastic outer covers w/crowned surfaces, the OLED/TFT matrix and electronics, branding logos, cameras, etc. but then modify the display's outer/edge soft trim or frame to make the shared components exactly fit the available space so it has all (or most) of the appearances of being custom. Thus the outer rim on HDS displays can be used to allow the finished product to blend with a particular vehicle brand. Case in point, the inner sheet metal structure on a tailgate or full-size SUV rear hatch may be essentially the same on an Escalade, Denali or Suburban with minor differences in the outer sheet metal curvatures and trim. This is similar to the mounting concept for mounted HDS displays with the major variable being the outer rim (or frame) that creates the final blend with the existing surfaces. By allowing for a sliding degree of customization, HDS displays may be installed on any make, model, and year of a vehicle or a truck with ease. Further, the installation blends aesthetically with nearly any vehicle design. When HDS display is designed and manufactured with TFT display or as an OEM part, it will preserve the aesthetics of the original vehicle.

The HDS display's elevation (placement above the road relative to the road surface) is also selected to assure the best sightline from a tandem-paused viewing vehicle (or other viewing point). Selecting the elevation may consider inherent design lines of a base vehicle (such as the lower edge of the backlight glazing or trim) and/or the clearance of important hardware items such as a rear window washer/wiper system. For example, if an upper edge of the display is higher than a washer/wiper system's center of rotation, the display may better be positioned further aft on the vehicle to clear the system's shaft and wiper arm in its parked position. Conversely, if the HDS display can be placed beneath such an existing wiper location, the reverse is true and the HDS display can be closer to the original base vehicle's body surface, or outer mold line.

Locking-in Display Curvatures, Stations, and Standoffs

Once the display size, aspect ratio and elevation for the display are determined, the remaining steps for design integration are to establish the curvature of the display face and its image-producing assembly, as well as the corresponding proximity of that assembly to the vehicle's rear surfaces. Some additional factors, such as clearance for air-flow ducting, soft mountings or seals, access to latches, original vehicle trims and functional hardware, built-in locks, latches or levers, and swing clearance, for example, may be considered in this design step to reduce likelihood of the display impacting parts of the vehicle (for example, FIG. 20C illustrates positioning an HDS display further aft to clear backlite wiper system).

All or portion of the selection and matching is performed by a computer using a design algorithm which matches the prior digitized XYZ scan of the rear vehicle surfaces to a display curvature which most closely matches and/or that may be custom manufactured. With certain productions methods, a pre-manufactured display may be flexed to accommodate unique curvatures. The degree to which that flex can occur may be controlled by the algorithm, providing further curvatureing capacity.

Alternatively, a curvature from one of many standard curvatures produced for a given display area and aspect ratio around a specific vehicle family or class may be selected (FIG. 4A, 402, 404, and 406). Since by class (SUV, pickup, compact, full-sized sedan, et cetera) the horizontal sections through their rear end or deck areas are quite similar, a reasonable number of curvatures, say 3 or 4, can be pre-made and stocked. Vehicle body styles can vary widely between categories—a subcompact can be anywhere from relatively "flat-ish" to deeply curved and these styles can and are adapted to vehicles in various size categories, at least within reason. Depending on the type of display composite and the number of that vehicle model sold, standard curvatures, aspect ratios and sizes can be planned in advance. Thus an initial step in selecting a pre-existing curvature is to generally match the largest comfortable display size and aspect ratio to the class of vehicle to the unique curvature through its horizontal section at the anticipated HDS display surface.

The actual curvature and volume commitments for a production run may be the result of in-depth research, including the actual 3D-scanning and digitizing of automotive surfaces (described elsewhere herein). So curvatures may be produced and stocked by their depth or degree each slightly more crowned than the previous (FIG. 4A, 402, 404, and 406). In some embodiments for a higher-end vehicle brand, curvature may be selected for a greater degree of conformance (FIG. 4C, 460) for a customized display may be created for even closer conformance with the vehicle attachment service.

Next, a standoff/closeout may be selected. At this stage, the design can be viewed from the side, the top and in all rotations as well as be hinged open and closed with the panel it will be attached to. However, the design remains fluid such that the display can still be raised or lowered, its trim/frame can be stretched, resized or re-curvatured, and if necessary and space exists, can be shifted forward or aft to accommodate structures, assure functionality, fine tune its appearance or alter the space between the rear of the display housing and the vehicle body.

Figure 4B:
Figure 4C:
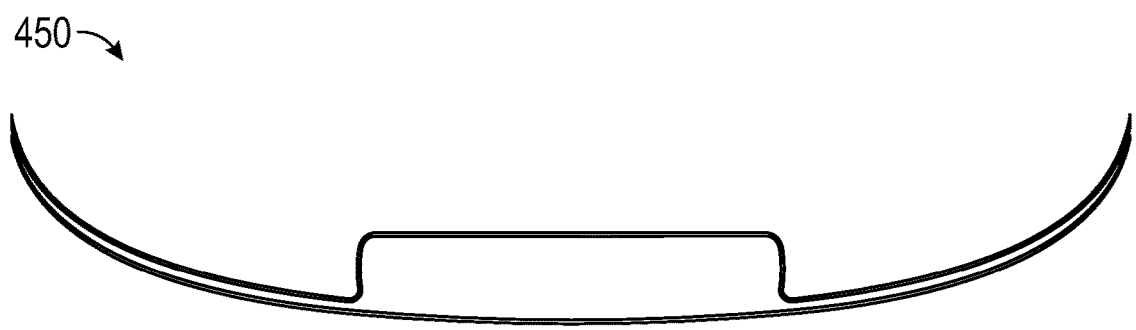

A standoff structure essentially fills this space between the back surface of the display and the mounting surface of the vehicle (FIG. 4B, 442). Using structures similar to the ribbed standoff panel structure (FIG. 6, 604), a display may be attached to the standoff as if the display and the standoff structure are essentially a single piece, while the opposite surface of the standoff tightly engages the attachment surface of the vehicle. One benefit of this method is that a single pre-made display with calculated dimensions from the above steps may be used for multiple vehicle surfaces so long as one side of the standoff (e.g., the side facing the vehicle attachment surface), such as based on the 3D scans of the attachment surface. Also, generation of customized standoff structure with some uniform substrate material is a relatively easier process than the generation of a display surface having a non-standard curvature thereby decreasing production costs. For example, a self-hardening foam (or other substance) may be used to fill a gap between a HDS display and a vehicle's attachment surface to essentially provide a tight sealed standoff. Further trim or other ornamental features may be added to cover the standoff foam (or standoff structure upon hardening of the foam). As discussed herein, standoff structures may be pre-manufactured also (such as based on custom contour of a vehicle from a three-dimensional surface can) and attached to the attachment surface of the vehicle and the HDS display.

For example, FIG. 4A shows horizontal cross-sections 402, 404, and 406 of three HDS displays (which may be mass-produced for use in multiple makes, models, years, etc. of vehicles), each more crowned than the last. Curvature 402 has a smaller radius (a tighter curve) making it better suited for smaller/narrower vehicles. But curvature of cross-section 402 is so extreme that its outboard ends may make contact with the base vehicle's body corners and prevent it from being mounted in a far forward position that may be less obtrusive. Curvature 406 is flatter and may be better suited to a larger vehicle or SUV because its outboard ends may stick out well above the original vehicle surface. In some embodiments, a standoff that is not reach the perimeter of the HDS display, or even know standoff at all, may be used to meet certain design objectives. For example, in the example of FIG. 27A, HDS display face 2704 spaced away from the vehicle attachment surface without a standoff). Curvature of cross-sections 404 may be the curvature that mostly closely matches curvature of the vehicle attachment surface 440. Such a curvature may be moved as close as practical to the original vehicle bearing in mind its vertical curvature (if the vehicle has compound curvature surface). In some embodiments, a minimal degree angle forward (towards the attachment vehicle) at the bottom to bias environmental reflections away from the brighter sky towards a darker roadway may be implemented in the design. For example, some embodiments a 6 to 8° angle may be sufficient, while in other embodiments a lower or higher angle may provide better viewing results. In general, the closer the HDS display surface duplicates the base vehicle, the better the shape is likely to blend in. A standoff structure can, in some embodiments with help of designing software, easily be designed and manufactured that uses the selected curvature, even if a non-optimal curvature, such as 406 or 408 with reference to attachment surface 440, is selected, providing an appropriate standoff structure in combination with advanced display technology (discussed further below) can still provide a surface that highly represents the original vehicle attachment surface.

A display adoption technician may review all branding and trim on the vehicle, all cut lines, latches, locks, lighting or controls and make adjustments so HDS display perimeter seal rides above or properly seals against any original trim, jewelry, logos, lighting or body details and doesn't interfere with existing surface components, hardware, or features. The outer size, shape and curvature of the HDS display product can be superimposed over the digitized image of the target vehicle where it can be manipulated to preview the proposed display as it will look when attached to the target vehicle under various lighting conditions. At this point a designer-technician can plug in various in-house manufacturing criteria such as the use of pre-determined/pre-designed display formats or blanks. He can increase or decrease the crowned face of a proposed display, raise or lower the mount location, and move the display forward or aft on the vehicle to confirm appearance in its mounted condition, and rotate close-in views of the installed product. While remaining flexible on the previous steps, a designer-technician locks-in curvature, station, and standoff before calling up from a database a wide variety of trim sets, frames and finishes. In some embodiments, the 3D scan of the vehicle surface and the manufacturing process of the HDS display and/or any necessary standoff, is precise enough to remove the need for manual adjustment of an original design. Thus, the entire process may be performed using software, such as by a consumer executing software through a web interface or downloadable application to view the mounting surface and easily design an optimal HDS display.

Model Final Interface

With optimum curvature, size, shape and elevation for assured sightlines and clearances for operating hardware, a variety of trimmed and trim-less designs may be selected, such as automatically by software (e.g. based on the consumer preferences, the vehicles color, sheen, make, model, etc.) and/or by a design technician or consumer. The various trims may be applied to the display perimeter and then pulled, stretched, expanded and/or formed into transitional shapes which conform precisely to the original production vehicle beneath. The software and/or a design technician may choose to move the display closer or further away from the vehicle attachment surface, such as by articulating parts to confirm clearances and access to special openings for service, or unit attachment. The design can further be modified, as needed, to take into account and provide appropriate temperatures, threaded connection points, clips, etc., for attachment of targeting cameras, sensors, logos, air intakes extractors, a spoiler, a turning vane, etc., which may provide optimal blending of design lines and cues to make the HDS display look as though it was a brand 'original' offered up by the same talent who created the vehicle's original design.

Once the display surface is positioned fore/aft, confirmed in elevation with the desired curvatures and with a trim concept at least loosely defined—and with mounting, removal, electrical and HVAC issues identified, data can be generated for tooling the mating surfaces. For example, a splice component (which could include a standoff structure in some embodiments) completing the space between the proposed rear surface of the display assembly and the attachment surface of the target vehicle. In some embodiments, critical joint sections (e.g., glass/plastic covers to the display housing, its inner bezels and outer perimeter seals as well as sections of the HDS display housing which extend beyond the mounting perimeter) can remain fluid and be moved by a technician then rendered in its new position by software until all functional criteria is met and the designer is satisfied with the aesthetics.

In some embodiments, the HDS display design software provides a visual representation of the finished HDS display assembly (which includes the HDS display, any splice components, standoff structures, trim, mounting components, etc. associated with the HDS display that will be included/used to mount the HDS display to the vehicle) that can be viewed from multiple angles and/or rotated (manually in response to user input or automatically such as in a cine mode that shows a automatically rotating 3D view of the HDS display assembly). Thus, the designed HDS assembly (or any portion of the assembly) may be thoroughly analyzed by the technician and/or and consumer. In some embodiments, virtual reality (VR) headsets may be loaded with the HDS display design such that the user can walk around a simulated parked vehicle, be seated in a simulated adjacent vehicle or lane, or view the HDS display piece in real-time, day or night under shifting lighting and environments, alternating display face finishes, applying reflection environments or algorithms, trims, vehicle colors, or models, complete with the presentation of content on the display. Such content may include the viewing of any motor vehicle regulations on illumination, safety signage, or public service messaging—just as the product may appear in the real world.

When everything meets target specification, the configuration may be locked and saved. Advantageously, the design may be automatically processed by a computing system to generate code for operating tooling equipment to actually manufacture the designed components, or perhaps a plurality of the HDS display assemblies for use on the same/similar vehicles. The same digitized XYZ scans thus not only enable myriad versions of designs based on live, in-the-moment or prerecorded content to enable optimal conformance to the surfaces of a host vehicle, they may also be used in defining the tooling which makes the parts which assure an optimal fit (See Tooling below). The digitized XYZ scans may be used not only on the non-custom or less customized HDS display designs and manufacture, but also with completely customized HDS display designs such as designs for HDS display OEM parts.

The back of the HDS display assembly, using 3D imagery of the attachment surface (e.g. the entire surface that will be covered by the HDS display) to allow the software and/or design technician to incorporate a variety of custom modifications to make room for or replace latch or lever mechanisms for the direct or indirect operation of latches or levers that may be partially or fully blocked or covered by the HDS display assembly once installed. Latches which operate in much the same way as the original vehicle can be located at convenient points around the perimeter of the HDS display housing and linked mechanically or electrically to the original latching hardware. Several basic mechanical solutions may be standardized to meet such adaptations so during the design stage it is simply a matter of choosing the best option for a given set of vehicle components and allowing the design algorithm to implement proper adjustments to the HDS display assembly in the design and tooling stages.

Standoffs

Previous sections discussed some potentials benefits of using a standoff. For example, standoffs may allow for use of more standardized curved displays across various vehicles of different model and make. Also, design and manufacture of standoffs often come with reduced cost and may provide for better heating and cooling features.

FIG. 8-11 illustrate sectional views of an example standoff mold. The mold may be constructed with a numerically controlled machining of slots for internal ribs 802. A digitized XYZ scan provides a desired vehicle curvature 810 and display curvature 806, which can be analyzed to determine the optimal quantity, dimensions, materials, etc. of standoffs in providing optimal attachment to the vehicle attachment surface. In some embodiments, a machinable plastic composite 808 may be formed having a desired display curvature 806 (or other curvature, such as closer to vehicle curvature 810). Next, slots, or cuts, having the depth approximating the touching points of a vehicle curvature 810 are machined. A fully cut groove 802 and a partially cut groove 804 are illustrated, where depth of each fully cut grooves will result in the ribbed standoff when a standoff is injection molded.

Figure 8:
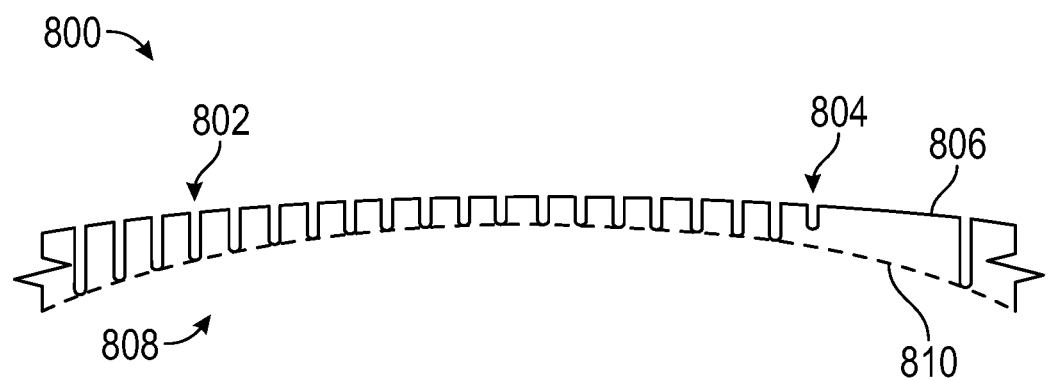
FIG. 8 illustrates an example sectional view of a standoff mold construction.
Figure 9:
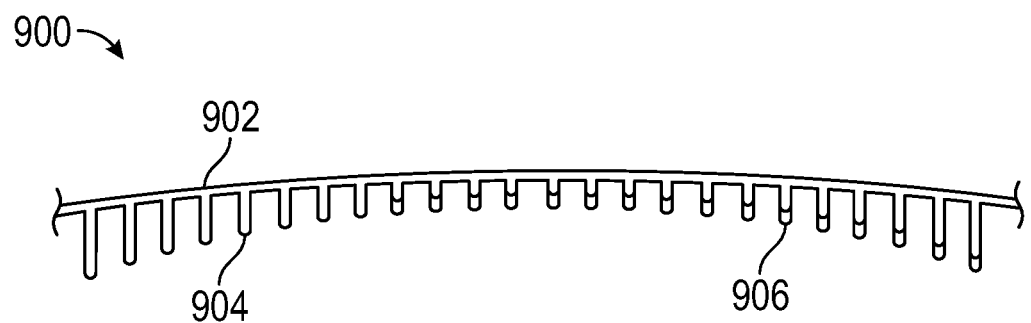
FIG. 9 illustrates an example sectional view of a silicone-tipped standoff created from the mold.

FIG. 9 illustrates a sectional view of finished display mount standoff providing internal rib structure 904 and display backing curvature 902, such as may be created using injection molding with a standoff mold (e.g., such as is illustrated in FIG. 8). Material for this component, for example polycarbonate, may be selected to provide thermal-sensitive characteristics for heat and cold dispersion, while having engineering-plastic structural characteristics. In some embodiments, the process may add silicone tips 906, or tips made of other flexible materials, to rib edges which may provide (1) positive seal against vehicle surface and/or (2) energy/vibration absorption capabilities. The tips may help with absorbing lateral or vertical stress of mounted display, compensating for different co-efficients of expansion in various materials under hot or cold extremes, trunk/tailgate slam impacts, and other major twisting or torque stress.

Figure 10:
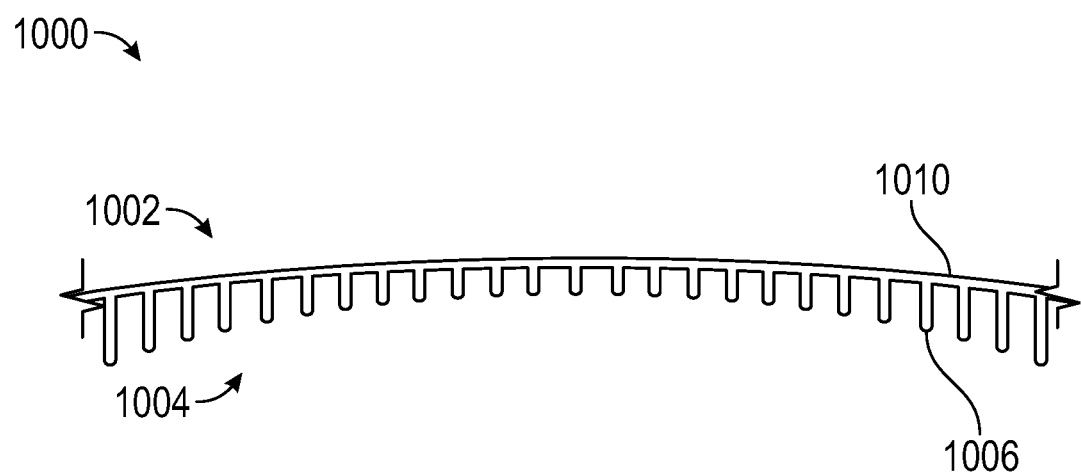
FIG. 10 illustrates an example sectional view of top and bottom of an injection mold for standoff.

FIG. 10 illustrates a sectional view using a closed injection mold having an upper 1002 and a lower 1004. The upper 1002 and lower 1004 create a closed cavity 1006 into which standoff material may be injected. The completed ribbed standoff material may have one surface matching the curvature of display substrate 1010 and ribs, tipped or otherwise, matching the curvature of the vehicle 1006.

Figure 11:
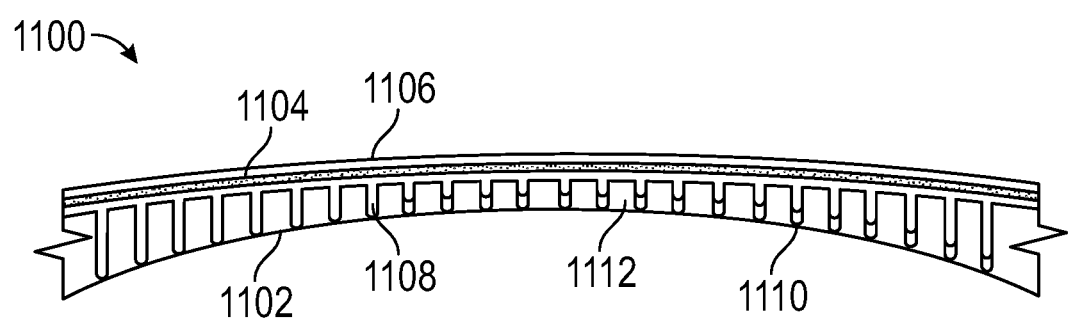
FIG. 11 illustrates an example sectional view of a finished HDS display.

FIG. 11 illustrates a sectional view of a completed HDS display (or HDS display assembly since it includes the standoffs and/or other components used in mounting). The ribbed standoff produced from the injection molding (and/or other process) may be positioned on the vehicle surface 1102 on the tips 1108 of the ribs. As discussed, the silicone-tips 1110 may provide enhanced stability and impact resistance. An OLED/TFT flexible display 1104 may then be layered on the other side of the ribbed standoff, followed by an outer face/cover 1106 in some embodiments. In some embodiments, the combination of the ribbed standoff, the flexible display, the outer face/cover, and/or any other components of a HDS display assembly may be provided preassembled to a consumer and/or automotive technician for installation on the corresponding vehicle.

The face/cover 1106 may be made of various materials, such as glazing or plastic with polarizer filters. In some embodiments, the standoff may have other types of cavities, such as honeycomb-like structures which may provide for better impact resistance. One benefit of having such cavities is that, even when sealed against the body, the structure leaves air-flow channels 1112 which may provide for enhanced heating and cooling (further detailed in Heating and Cooling section below) while possibly also reducing the materials costs. In some embodiments, additional layers of film(s) providing for polarization, tinting, and selective transparency may be inserted between the standoff and the display panel. In some embodiments, standoffs may not be ribbed—e.g., the standoff is a solid structure or hollowed out structure.

Figure 12:
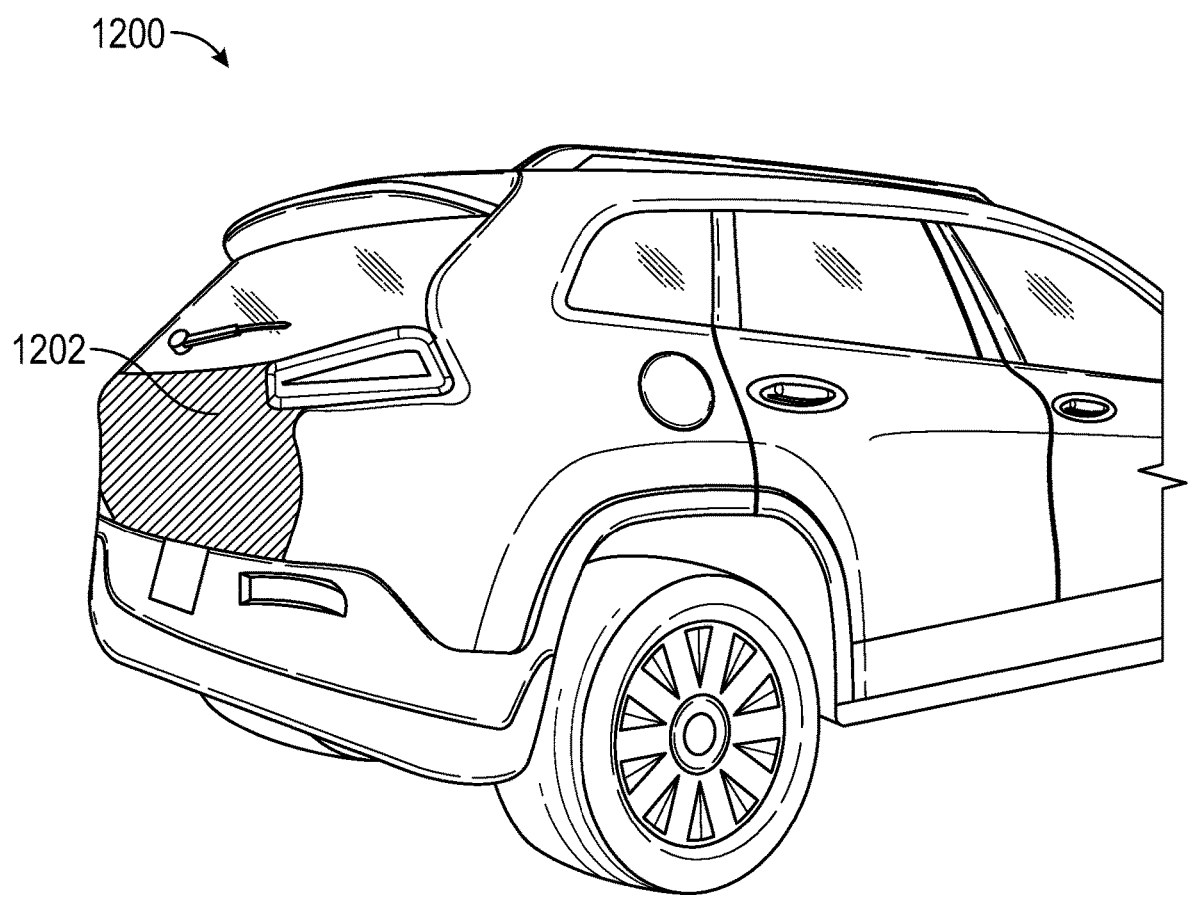
FIG. 12 illustrates an example a side view of a finished and HDS display.

FIG. 12 shows a side view of a mounted HDS display. The HDS display 1202 precisely matches the surface of a target vehicle. In this embodiment, the HDS display comprises a clear, flexible OLED/TFT that adds nominal new thickness to the original body surface. This embodiment shows an auto-darkening substrate layer made of Transitions™-style photochromic technology, which may be used to improve content contrast on bright daylight backgrounds. In other embodiments, various other photochromic layers, additives, or materials may be used to provide different contrast properties.

Replacement of Physical License Plates

HDS displays overcome the customary thinking that one should not interfere with the physical license plates and that there are no feasible and safe alternative to the physical license plates. One aspect of the HDS display is that it can replace a motor vehicle's physical license plate and registration stickers with a more cost efficient, less time consuming, securely-monitored, tamper-proof, and far more consumer-friendly digital alternative to the standard license plate and registration.

It is anticipated that domestic and global licensing and registration regulations in which license plates are limited to painted metal license plates and annual registration stickers is ultimately replaced by an all-digital system in which the state of the art will be advanced significantly to the point that vehicle licensing can no longer be defeated by someone with a screwdriver. An all-digital system will strengthen vehicle safety, security and crime prevention enabling improvements in vehicle identification, traffic and law enforcement, DMV currency monitoring, prevention of delinquent or illegal operations, stolen vehicle tracking, insurance fraud, accident reporting, improved consumer convenience and acceptance, and/or potential cost savings for domestic licensing and registrations approximating $2.5 to $3.0 billion US each year.

In some embodiments, an HDS display provides a solution to the current requirement of physical license plates because it can match or surpass nearly all federally mandated illumination systems of tail lights, turn signals, side marker, center mount, backup and/or emergency flashers as necessary on the display area. Such illuminations may be wired into existing vehicle electrical systems, or may be activated via lighting sensors within the HDS display housing which literally translate vehicle illumination commands (e.g. brake or turn signal activation) wirelessly/optically and then relaying these signals in real-time to the HDS display for the enhanced replication of that display function. The HDS display system is also capable of determining when a bulb, LED, tail lamp or other failure occurs and initiating actions to assure vehicle safety, such as, for example: (a) assuring illumination upon lighting activation, (b) alerting the driver to the malfunction, and/or (c) alerting a dealer, service center or law enforcement, as appropriate. Another potential benefit may be that these digital license plates may also be called up on-demand, displayed, locked in place, recorded, photographed, documented by a smartphone or wearable device, transmitted to another person or vehicle, and generally accessed to provide and/or receive information with authorized third party users. In situations such as an accident, collision, or theft, for example, a digital license plate (e.g., software executing on the HDS display assembly) may automatically facilitate resolution of the situation, such as by automatically transmitting (e.g., via cellular or Wi-Fi data signals, information regarding the automobiles involved in the accident, the accident location (e.g., based on GPS data that is determined by the HDS display system and/or another GPS or location-based sensor in the vehicle), and/or other information regarding the incident that may enhance the ability of first responders to address the situation.

A transition from physical license plates into the above discussed digital replacements may occur over time. Several solutions for relocating our present day metal plates until such time when all states can agree on new standards for license plates are proposed for an orderly transition to an all-digital system. The license plate may be made visible by: (a) a literal see-thru view of an actual license plate with registration, mounted and illuminated in a prepared recess included as part of the HDS display unit, (b) a live/real-time video view of the physical license plate & registration, in which the plate may be located remotely, or (c) a stored-data, digital facsimile of an actual photo or illustration of said license plate and registration. Any of these can be continuously displayed or called up on-demand to meet the legal requirements. In some embodiments, a presentation of a license plate may be triggered by an audible/RF/IR alert, proximity to another object, motion or optical detection, or by vehicle accelerations/decelerations, impacts, or other variety of cues. For example, a license plate may be automatically digitally displayed on an HDS display in response to detection of law enforcement personnel within a predetermined proximity (e.g., within 50 yards of a vehicle), such as in response to communication with and HDS display system of a law enforcement vehicle (and/or other electronic communication signifying location of the law enforcement personnel).

Figure 13:
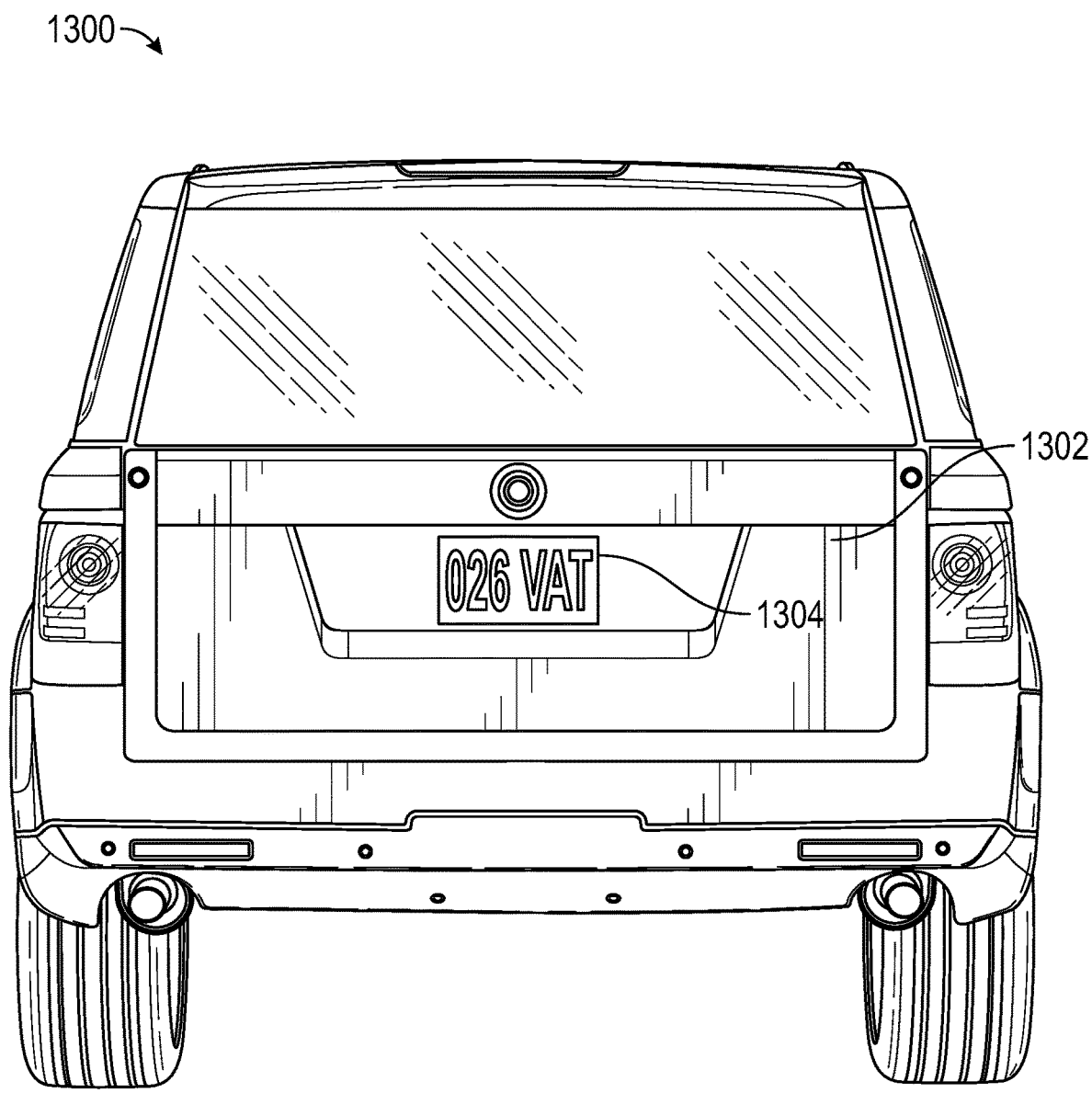
FIG. 13 illustrates an example embodiment of a license plate through an HDS display configuration with selective transparency.
Figure 29:
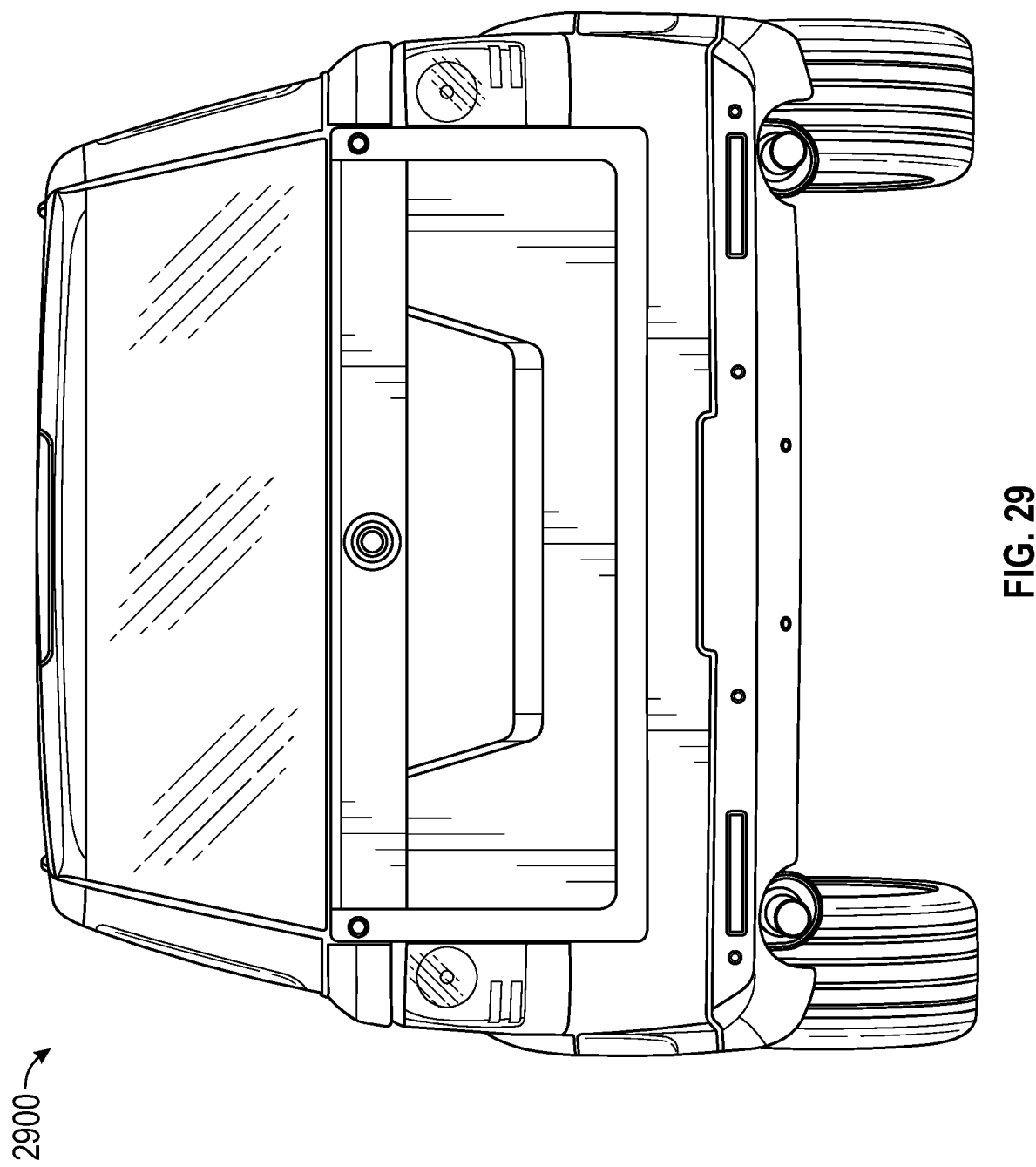
FIG. 29 illustrates an example embodiment of an HDS display unit which provides for see-thru presentation.

For a literal see-thru solution with an actual license plate, an HDS display that is at least partially transparent may be used. By layering an electrochromic glass or plastic that can be controlled to have different degrees of transparency on a transparent OLED/TFT (or using an electrochromic OLED/TFT), a controllably transparent HDS display may be made. A vehicle with such HDS display can make an actual license plate see-thru visible. FIG. 29 shows a visual representation of an HDS display unit which provides for see-thru presentation of a physical license plate (recess shown without a plate to demonstrate the HDS display's see-thru capability). FIG. 13 shows a conventional license plate through a transparent HDS display configuration with selective transparency.

Alternatively, it is also possible to use the standard HDS display and its onboard cameras to duplicate a live view of the display and to present that at any time or all the time, or even on-demand by law enforcement officials. A photo sensor (e.g., a wide angle camera) may capture real-time plate images and present the images in any desired size, continuously or on-demand, on the HDS display. A live view of the license plate may look similar to license plate display shown in FIG. 13. For detailed embodiments of live video of an actual plate, see FIGS. 26 and 27B and their accompanying descriptions.

Digital Facsimile of License Plate for On-Demand Display

A digital reproduction that is decoupled from an actual license plate can provide additional benefits of better legibility and security, to name a few. Because a hypothetical digital license plate may be presented on an HDS display, it does not have to be an exact visual copy, it can be as large as the display itself, providing for better legibility (standards may limit the sizes). Also, when the entire HDS system is linked to DMV and/or Law Enforcement Agencies, it may provide improved vehicle identification and monitoring, easier enforcement of annual registrations, payments and upgrades, changes for vehicle purchase, and issuance of special plates and markings. For example, counsel corps, handicapped, taxi/limousine, special permits, et cetera may all have distinctly identifiable license plate facsimiles. Also, these systems may protect the public in terms of fraud monitoring, stolen vehicle reporting, habitual violators, moving upgrades, ownership changes, tracking of terrorist activities, rental agencies, emissions violations and numerous related licensing issues. These digital license plates may even distinguish active/current registration with different colors from expired registrations, making the expired traffic easier to spot for police officers.

FIG. 1 illustrates a digital imitation 106 of a physical license plate which presents all the required information but with greater size providing better legibility.

FIG. 7 reflects an edited version of a digitized rear end in which the rear license plate, registration and the plate recess itself has been removed or covered by a HDS display system) by an owner or a program. Where all license plate information has completely become digital, eventually there may not be a need to display license plate visually. The original, removed license plate (in one embodiment) can be inserted into a supplied plastic envelope or interior trim package which is stored inside the vehicle's trunk or on its hatch interior trim panels. Until such time as DMV regulations permit, vehicle owners may be required to hold and to present this original state license plate to law enforcement officers on demand to confirm that it matches the displayed digital representation. Embedded security features in new DMV software may preclude in real-time the electronic display or change-out plates or alterations which might disassociate an issues license plate/registration with a specific VIN. Such changes may have to be cleared with DMV or licensing agencies in advance of changing to avoid an alert being sent to authorities or even posted on the vehicle display itself.

Product Structural Overview with Various Embodiments

Figure 17:
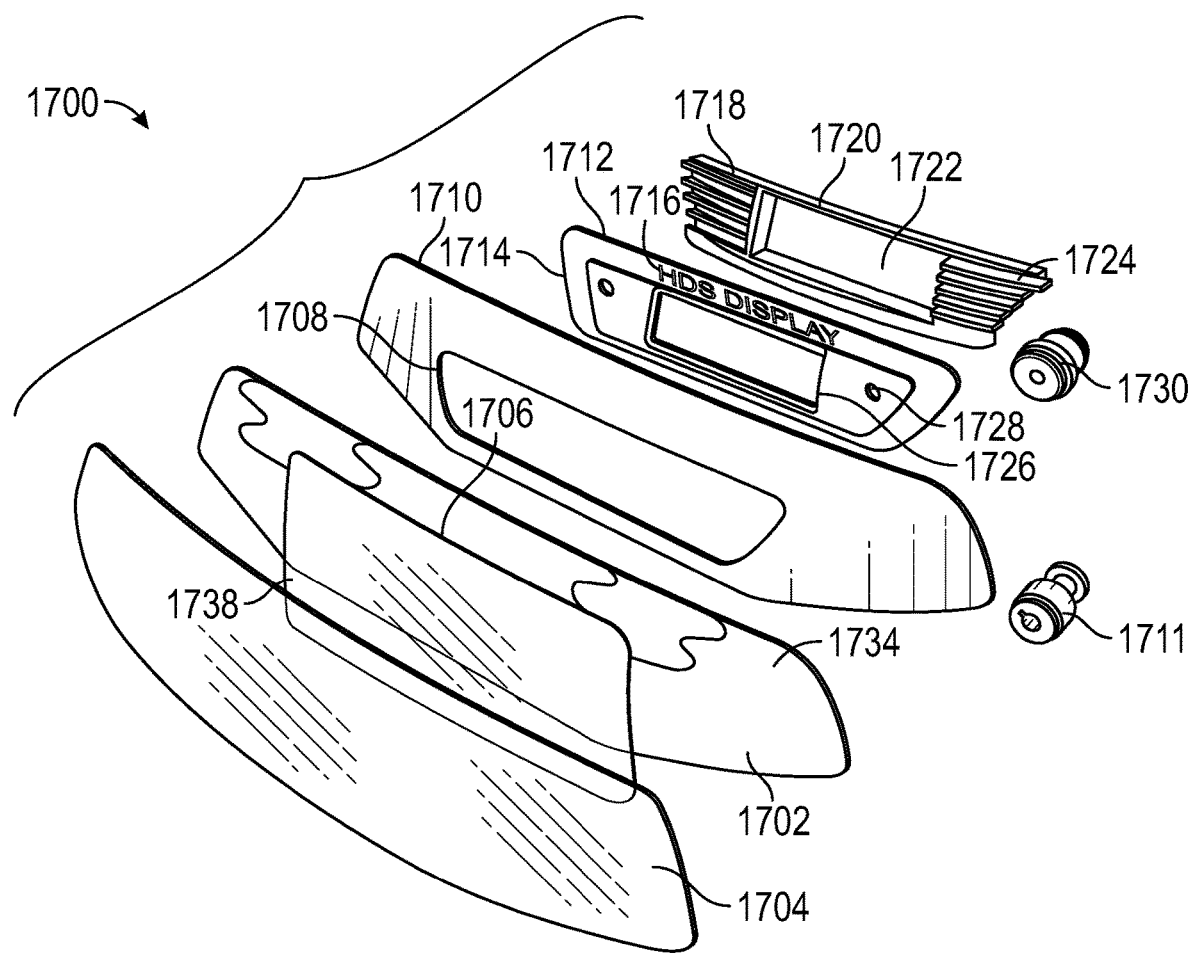
FIG. 17 illustrates an exploded view of an embodiment of an HDS display system.

An HDS display may be implemented on a vehicle in one or more approaches, such as: (1) sealed attachment standoffs where the space between the back surface of the display and the rear mounting surface of the vehicle is essentially filled with a standoff structure and weather-sealed around its perimeter such that it essentially becomes a single piece with the underlying surface; (2) a floating appearance in which the display surface seems to hover or float just off the original vehicle's surface (best when used with a see-thru or floating sheet of glass theme; and (3) a fully-integrated appearance with an original vehicle's surfaces so that the image-producing elements appear to be the body surface itself, rather than a diaphragm or film attached to it. In some embodiments, selection of one of these three approaches (or combination of these approaches are additional approaches) dictates certain design parameters, such as materials that are usable for the actual display, space available for electronic circuitry, etc. In each application, though, a common characteristic is that the HDS display looks as though it is a natural, inherent surface of the vehicle FIG. 17 illustrates an exploded view of an embodiment of the mounted trimless display unit (excluding electronics). In the example of FIG. 17, as well as other multicomponent illustrations (such as other exploded view drawings), include various components that are described and illustrated with relation to other components. Any one or more of these components may not be required in certain implementations. For example, in one implementation of the display unit in FIG. 17, the film 1706 may not be included. In some embodiments, additional components, materials, layers, etc. that are not illustrated may also be included as part of the illustrated apparatus.

In the embodiment of FIG. 17, a clear flexible OLED (e.g., a single sheet) or an equivalent display panel 1702 is cut to a desired shape for a trimless end product. The display panel 1702 may be surrounded by transparent glass or plastic on front and back sides that provides see-thru capability such that the original vehicle lighting can be seen through the HDS display unit. The combined display layers may have their outboard sections wrap-around the left and right sides for the display of 3D illumination, display of alternate license plate viewing, vehicle branding on corner portions when main content is being presented on center portion of the display 1702.

Figure 18:
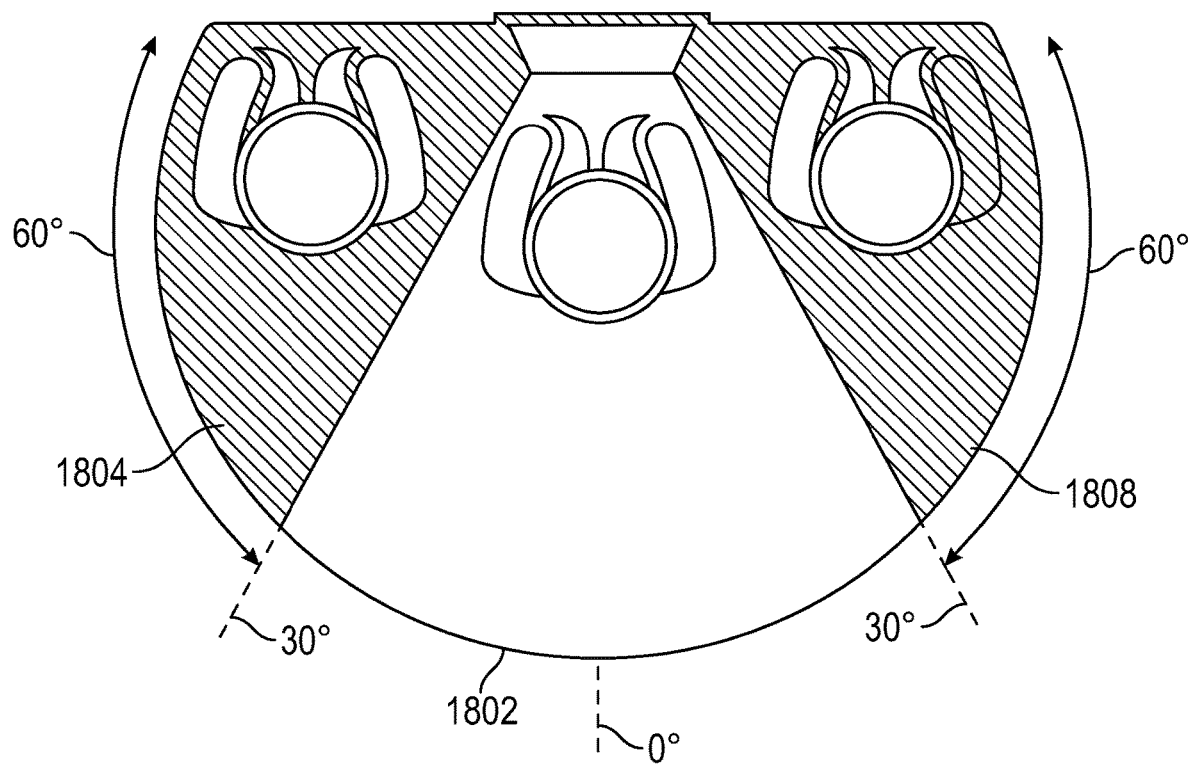
FIG. 18 illustrates an example embodiment of a presentation zone of privacy.

In some embodiments, the outer cover 1704 comprises linear polarizer and quarter wave polarizer to eliminate reflections of ambient light off internal reflective surfaces of HDS display. The clear glass or plastic face 1704 may also be lightly tinted, shaded or contain metallic deposition on surfaces to cope with heat buildup and external light reflections. A film 1706 capable of limiting viewing angle, such as 3M Microlouver™ film, may be placed between the display panel 1702 and face 1704 to reduce lateral rear viewing angle from near 90° to 60°, preventing content from distracting drivers in adjacent traffic lanes while maintaining privacy of selected content. FIG. 18 illustrates this "zone of privacy" where a tandem-paused vehicle situated immediately behind the publishing vehicle in zone 1802 may see the presentation but not those who situated in other zones 1804 and 1806. For the display panel 1702, a MicroLouver™ halftones may be deployed around perimeter of MicroLouver™ film 1706 to soften transitions between visible and masked viewing surfaces. In some embodiments, a separate smaller, license plate sized display may be laminated into or otherwise positioned on the outward side of the Microlouver™ film to publish license plate for a full wide area.

A backup plate 1710 made of transparent glass or plastic provides support for the display panel 1702. In some embodiments, the backup plate 1710 may be made of Transitions™ style photochromic (or electrochromic) technology that allows for darkening in outdoor or artificial ultraviolet environments to produce greater background contrast when placed in bright surroundings. The photochromic layer is placed behind an OLED/TFT display panel 1702 and closer to the vehicle surface. In some embodiments, a photochromic layer may not be included and/or may be included in angrily in the display layer 1702. Where needed, soft attach pads 1711 may be placed on outboard portions of the backup plate 1710 and on vehicle surface to secure outboard edges of trimless display. These attach pads are preferably of unnoticeable color and do not damage vehicle surfaces.

In this example, the backup plate 1710 includes a cutout 1708 to allow for unhindered display of the license plate. Where a physical license plate is mandated, an integration module 1712 can provide a slide-in internal storage and frame for placement of actual license plate for anytime viewing day or night. The integration module 1712 can also provide for convenient placement location for cameras, video electronics, sensors, within temperature controlled housing. The module may include a quick-release feature for detaching the HDS display unit from a vehicle under security precautions. Bonding strips and perimeter mask 1714 may be used to seal the module to the HDS display. A brand logo or other messages 1716 may be molded-in, engraved, embossed, or otherwise marked on a surface of the integration module. The backup plate 1710, the integration module 1712, bonding strips and perimeter mask 1714, soft attach pads 1711, standoff(s), and/or any other components that provide structural support for and/or reduce vibration or other structural-related operational challenges that are discussed herein, or that may be used as an addition or replacement to components discussed herein, may be broadly referred as "mounting interfaces." Thus, mounting interfaces for various designs and/or implementations of HDS systems may include different (e.g., customized) components for mounting the HDS at a preferred location.

An air-flow rib section 1718 connects with the integration module 1712 and locks with the vehicle with locking systems 1730. Cameras and sensors may be mounted at designated mounting locations 1728 which provide for see-thru through the display and cover. Additionally, the assembly may have an illumination device 1720 for the license plate controlled by a photocell which activates or deactivates the illumination device based on ambient light, HDS display activity, or some other timing criteria. In some embodiments, a sealed plastic box 1722 housing circuitry responsible for digital security, GPS tracking, video driving, and emergency power is placed in the license plate recess. The rib section 1718 may be molded simultaneously with the integration module 1712 or may be molded separately but assembled together after manufacture. When assembled, the rib section 1724 provides airflow channels which may be used by included air fan or HVAC for heating or cooling.

Figure 19:
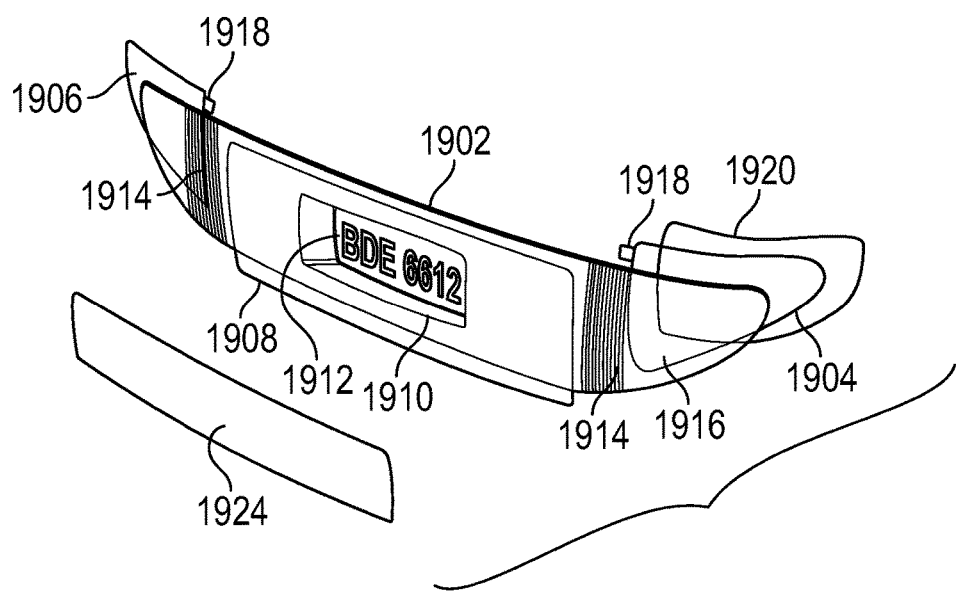
FIG. 19 illustrates an example embodiment of an exploded view of an embodiment capable of publishing real-time 3-D effects.

FIG. 19 illustrates an exploded view of an embodiment capable of presenting real-time 3D effects. The exploded view 1900 shows a flexible OLED/TFT display that combines multiple clear or opaque layers having special masks and filters to generate 3D effects. The overlapping display layers have at least two layers of display panels which are capable of independently displaying different contents. The main display panel 1902 is a single, clear OLED/TFT flexible display spanning nearly the full width of a vehicle's rear end with its extreme left and right outboard portions 1916 and partially overlaps the secondary taillight displays 1904 and 1906. The secondary display surfaces 1904 and 1906 have electronic connectors, such as the ribbon connectors 1918, for independent power and separated display output instructions. By enabling displays at different depth, the embodiment can generate views having 3D effects. Additionally, if the main display panel 1902 uses 2-way light emissions, deliberate reflection off of taillight displays (1904, 1906) and taillights (1920) can generate unique 3D views.

Such an arrangement produces a true physical depth between the layered digital images, which once combined with different lighting intensities, movement or animation, can produce convincing automotive visuals. For example, a portrayal of an original vehicle's right hand tail light (FIG. 19, 1920) of an adjacent OLED surface 1904 and then again on OLED surface 1916 can yield a 3-level multi-plane simulated display of that tail light which can further be moved relative to one other and to the original based on proximity data received about a viewer's location. Next, highlights and movement detected and recorded by live, onboard cameras and/or other sensors (for example of street lamps passing overhead, a neon lighted sign, a setting sun, or sunlight between the leaves of trees) and these visual images can be painted or rendered on top of the digital body representation precisely the same way those highlights may flow over that surface were it visible. By selectively choosing one TFT matrix over another (FIGS. 19, 1904 and 1916, with 1904 and 1906) such a system can create a hyper-real depth and dimension achieved solely with flat digital images viewed by individuals seated in a tandem-paused vehicle to the real, for example, or by passing pedestrians or cyclists.

The main display panel 1902 may have a black mask or an opaque substrate layer on its second (rear) surface which precludes the passage of light towards the vehicle except in a centrally-located window 1910. In some embodiments, the preclusion of light effect may be produced by using Transitions™ style photochromic (or electrochromic) technology. Through the window 1910, a license plate 1912 may be viewed through the clear OLED 1902. A layer of opaque mask 1913 that transitions from opaque to clear may be placed at each outboard (transition shown with 1914 on both outboards). In some embodiments, the transition 1914 may be introduced by line patterns or dot patterns, similar to the black masks seen in windshields or automotive backlites. To provide private viewing of the central portion of the display 1902 an optical adjustment layer 1908 (e.g., 3M MicroLouver™ film or other film) may be placed over the central portion of the display. Because this would normally disable angled viewing of the true license plate at angles exceeding 30 degrees off-center, a license plate sized rectangle may be cutout in the film. Alternatively, a separate, optional, dedicated clear OLED 1924 can be overlaid on top of the optical adjustment layer 1908. This way, a licensee display may be activated/deactivated upon content priority or on-demand. The additional display layers may provide reconstructions of a vehicle's original taillight design, unique depth, enhanced perspectives, animations, interlayer movements, and/or extraordinary illumination concepts extending across the full rear span of a motor vehicle.

Figure 20A:
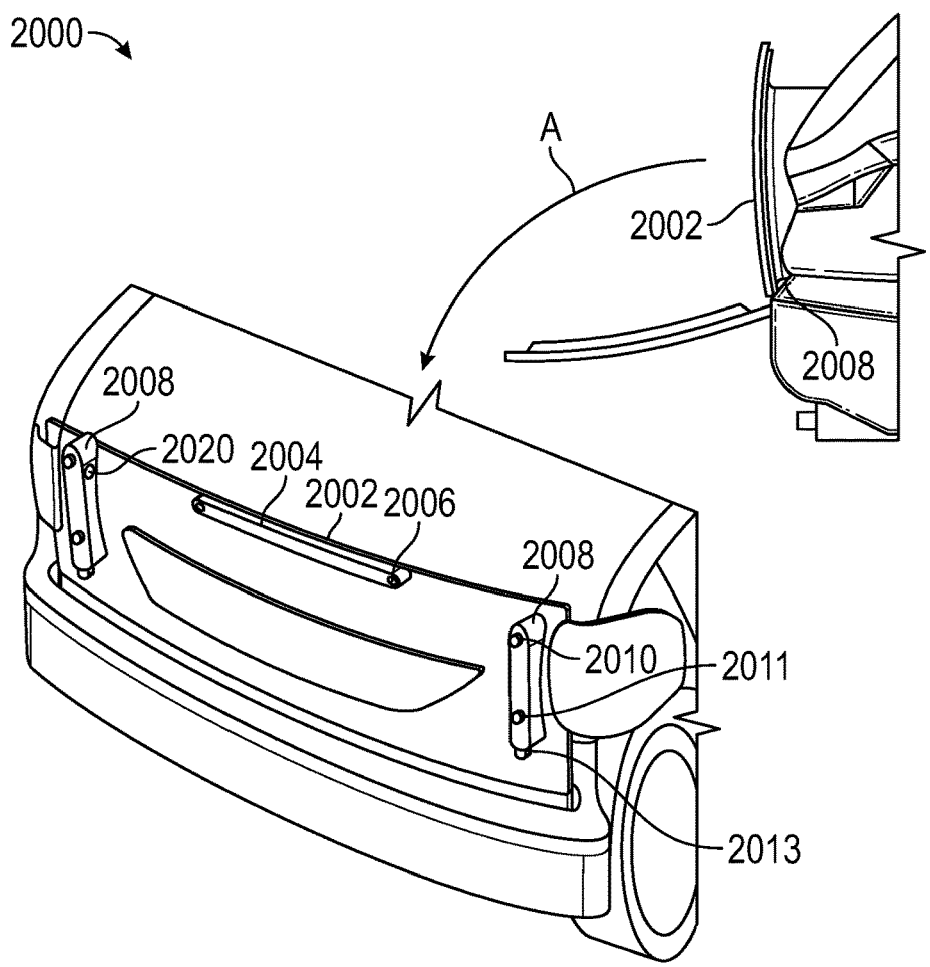
FIG. 20A-C illustrates an example embodiment of a free standing see-thru HDS display configuration.
Figure 20B:
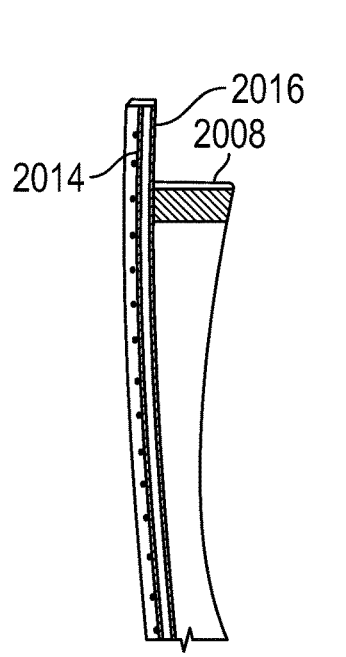
Figure 20C:
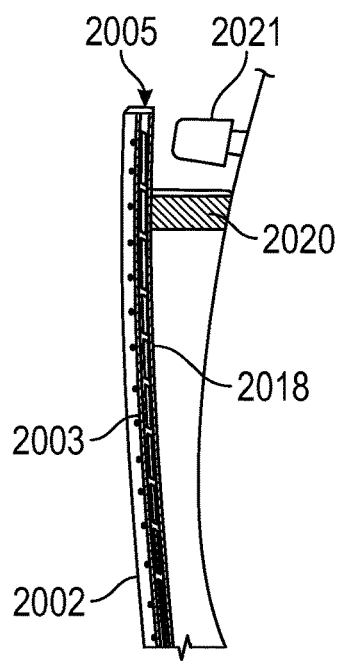

FIG. 20A-C illustrates one embodiment of a free standing see-thru display configuration. This configuration takes a more architectural approach to blending a contemporary display product 2000 with vehicles. Although this all-glass, trimless design is compatible with all vehicle types, it may be better suited for vehicles which are more angular and rectilinear in basic form such as SUVs, vans, trucks or busses. Its impression is that of a sheet of glass, flat or mildly curved in one or two planes, but which floats off the vehicle surface beneath supported by either of one or more strategically placed standoff pedestals 2004 (center support) and 2008 (side supports). The display assembly 2002 may comprise transparent, or at least partially transparent, material that may be edge-sealed against weather as a stand-alone display unit.

When the display is Off or inactive the display appears much the same as a sheet of clear or lightly tinted smoke glass, where the vehicle surface beyond can be clearly seen. The standoffs 2004 and 2008 themselves might be formed and finished in an equally architectural style using such materials and finishes as black, chrome, nickel, clear glass, plastics, bright, satin or similar finishes as seen in contemporary televisions, furnishings, picture frames, coffee tables, architectural glazing, modern baths of office treatments where a see-thru look and a clear glass elegance is a key objective.

When the display is On or active a displayed image may be balanced for brightness with the ambient light, the color and value of the surface the display is mounted on and/or the level of transparency desired for the display image. If increased background darkness is desired for contrast to properly display an image (for example a photo or video on a bright sunlit day on a white vehicle) then certain filters, materials or electrically-controlled surfaces 2016 may be combined to darken the clear glass appearance of the background, for example: (a) electrochromic glass (or plastic) in which lithium ions move in response to a small electrical voltage; (b) photochromic plastic sheet or films responsive to UV light (such as "Transitions™" where photochromic lenses convert to dark glasses upon exposure to UV light); (c) thermochromic glazing or films responsive to ambient temperature changes; (d) polarization in which light passage between filters can be rotated in quarter waves to block additional lights; (e) MicroLouver™ films that create microscopic blinds by masking light based on angle of view; (f) tints in glass or plastic material itself; (g) various types of In-Plane Switching (IPS) displays such as ON-State Blocking (where voltage is applied to block light) or Off-State Blocking (in which voltage is applied to let light pass through); and/or (h) reflective coatings which can be applied to the outer surfaces of clear sheet materials. The list is not exhaustive. In some embodiments, a photocell or a photosensitive sensor 2020 detects ambient light or UV exposure on vehicle surfaces and provides control input to the display's darkening mechanism for better contrast. Also, this HDS display may have targeting camera 2006, proximity sensor 2011, security sensor (not shown), and/or other sensors 2012. The electrical connections for the sensors and the display are preferably hidden from plain sight by concealing the connections inside the mounting mechanical mechanisms.

In some embodiments, the display assembly 2002 has, from vehicle surface toward a viewer, a clear photochromic layer 2016 that responds to ambient ultraviolet light or on-state light blocking polarizer, followed by an OLED/TFT flexible display panel 2005, followed by a quarter wave retardation film 2014, followed by an outer cover made of glass or plastic 2003.

In some embodiments, latches, locks, hinges, and other mechanically fastening structures (shown in 2013) may provide for the complete or partial detachment of the display for easy cleaning or service. One such partial detachment is unlatching or unmounting the top portion of the display assembly 2002 while maintaining the attachment of the bottom portion (likely having a hinge-type attachment), and rotating the display toward the service technician following the arc A.

As shown in FIG. 20C, some vehicles may have backlite washer or wiper system 2021 that requires certain distance between the vehicle surface and the display assembly 2002. For those vehicles, the central standoff 2004 and any number of additional standoffs 2008 may further float the display assembly 2002 and provide the necessary structural support. In any of these embodiments, optional air distribution panel 2018 that pulls air from perimeter laterally to opposing standoffs 2008 may be integrated.

Figure 15:
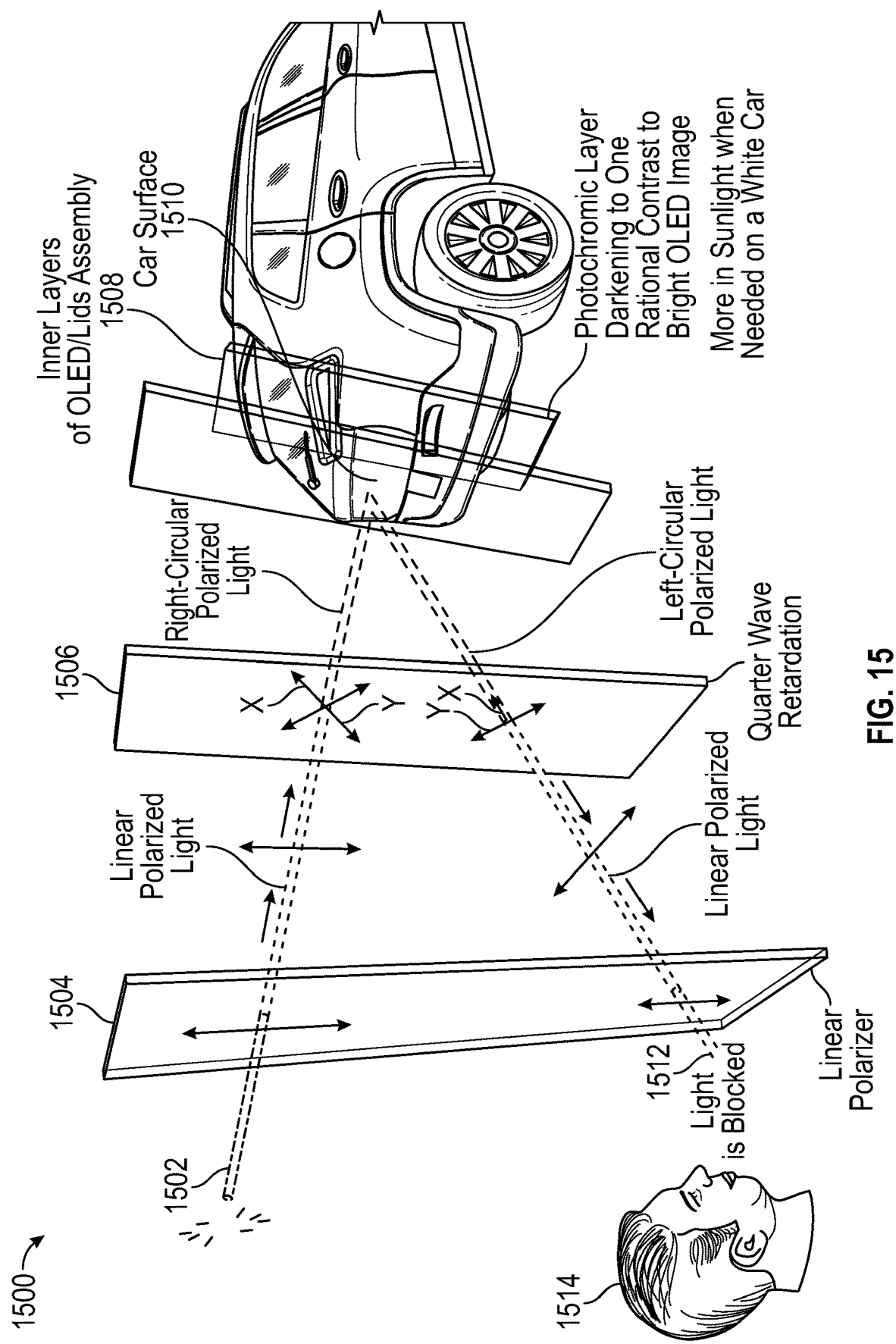
FIG. 15 illustrates a perspective view of an application of polarizing filters and photochromic layer as applied to HDS displays.

FIG. 15 details polarizing filters and photochromic layer as applied to HDS displays. Polarizing filters are coated with a special chemical film that helps reduce glare which is caused when light from the sun is reflected off of water or a solid surface. The chemical film is designed to absorb horizontal light waves, while still allowing vertical waves to pass through. Because light only travels in one direction through polarized lenses, glare is eliminated. Here, solid surface is the surface of the vehicle. Polarized filters help neutralize glare and allows viewers to see objects more clearly.

Figure 16:
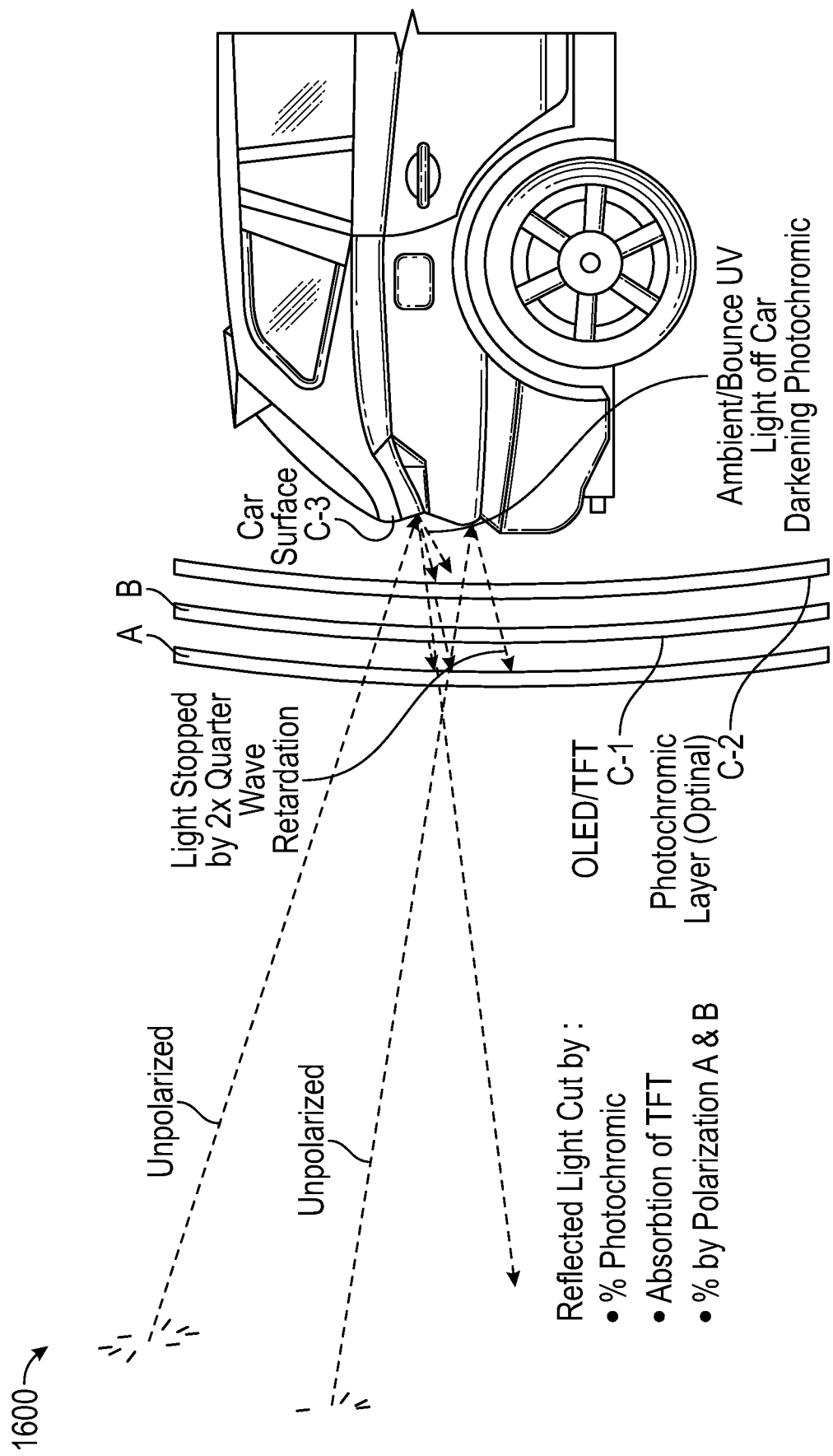
FIG. 16 illustrates a side view of the application of polarizing filters and photochromic layer in FIG. 15.

An ambient light 1502 enters an embodiment of an HDS display layered with polarizing filters. The ambient light is linear polarized after going through a linear polarizer 1504. Then the linearly polarized light goes through quarter wave retarding filter 1506 and becomes right-circular polarized light (or left-circular polarized light in some embodiments). This right-circular polarized goes through the inner layers of OLED assembly 1508 which may include a photochromic layer providing degrees of darkening to provide better contrast of what is displayed on the HDS display. The reflected light is reversed in polarization and becomes left-circular polarized light. Going through the quarter wave retarding filter 1506 again, the reflected light becomes linear polarized light once more. When this linearly polarized light again travels through the linear polarizer 1504, glare is blocked by the linear polarizer 1504 and a viewer 1514 can better read the content of the HDS display. FIG. 16 is a side sectional view of the illustration in FIG. 15.

Figure 21A:
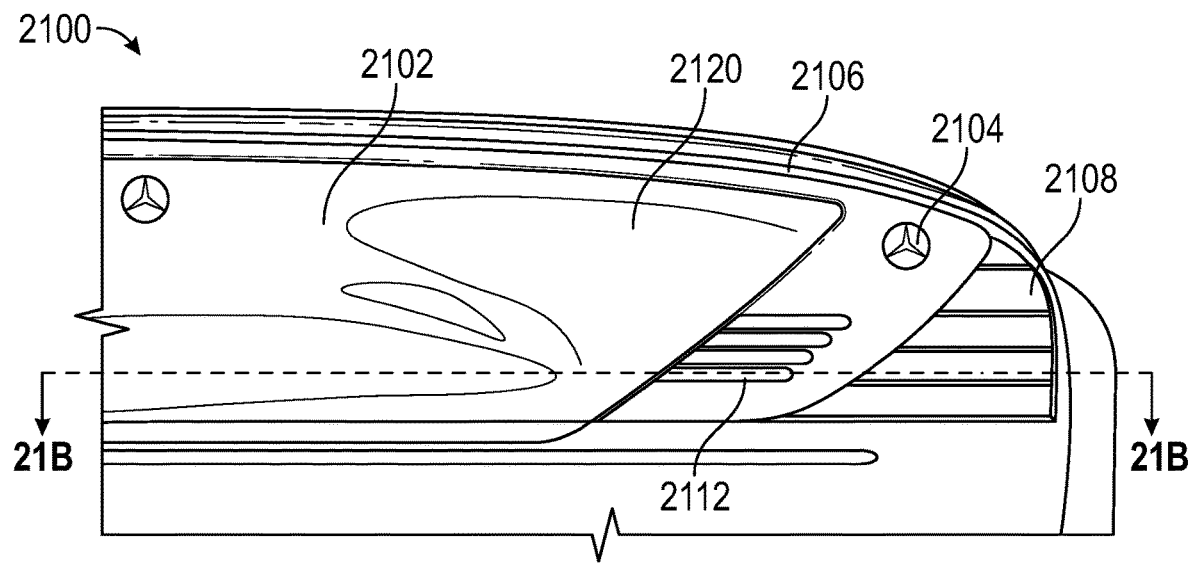
FIG. 21A-B illustrates an example embodiment of an HDS display system.
Figure 21B:
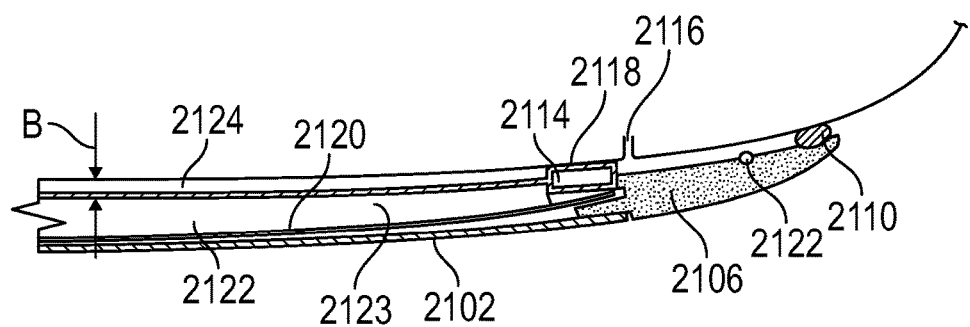

FIG. 21A-B illustrates another embodiment of the HDS display system. In this embodiment, the HDS display is designed for a small high-end vehicle such as a Mercedes SL Class where an owner is likely more discriminating on issues like image, quality, appearance, branding, detail, exclusivity and performance. Such owners are not likely to tolerate their vehicles or brand being compromised by a product that's cheap in appearance, poor in performance, inconvenient, inefficient or in any way degrading. Looks and quality of the component added have to be equal to or superior to the underlying vehicle. This design adds minimal apparent thickness to the aft surfaces of the rear deck lid since the unit's surrounding lip 2106 is modeled to be nearly integral with the original vehicle's curvature and air-flow cavity (B-B) is minimal.

A Mercedes logo 2104 or brand with jewelry formed into flexible outer right end is shown. The cover glazing face 2102 is elegantly sculpted and trimmed by a soft neutral satin textured elastomeric bumper 2106 with molded-in features 2112 including a brand logo on both the left and right trim extensions. The cover glazing face 2102 is made of glass or plastic material which protects the OLED/TFT display panel 2120 from the aft to vehicle impacts. The HDS display face 2102 may be clear or with light tint. The soft trim 2106 (better shown in sectional view of the same HDS display FIG. 21B) protects edges from head bumps when deck is raised. Molded-in rib interface 2112 operates as air inlets or exhausts and matches the assembly's internal pressure with the changing atmospheric pressure.

A centrally-located full chrome logo is digitally rendered on the centerline and uses the onboard camera system and algorithm to accurately map reflections of the surrounding environment in real-time onto its digital chrome surface such that this logo is not visually interpreted as a digital facsimile by viewers. The digitized logo may be programmed to disappear when other content is displayed. The content presentation area 2102 is larger than the articulated deck surface ending at cut line 2116 beneath it. The original vehicle's tail light area (deliberately masked slightly in the figure), is dramatically expanded upon as shown in area 2120, when activated. Activation of HDS display adds taillights, turn signals, side-markers, emergency flashers, et cetera via normal electrical connections or by photocells picking up light from the vehicle's existing illuminations. New designs of illuminations can be downloaded from trusted sources.

Figure 22A:
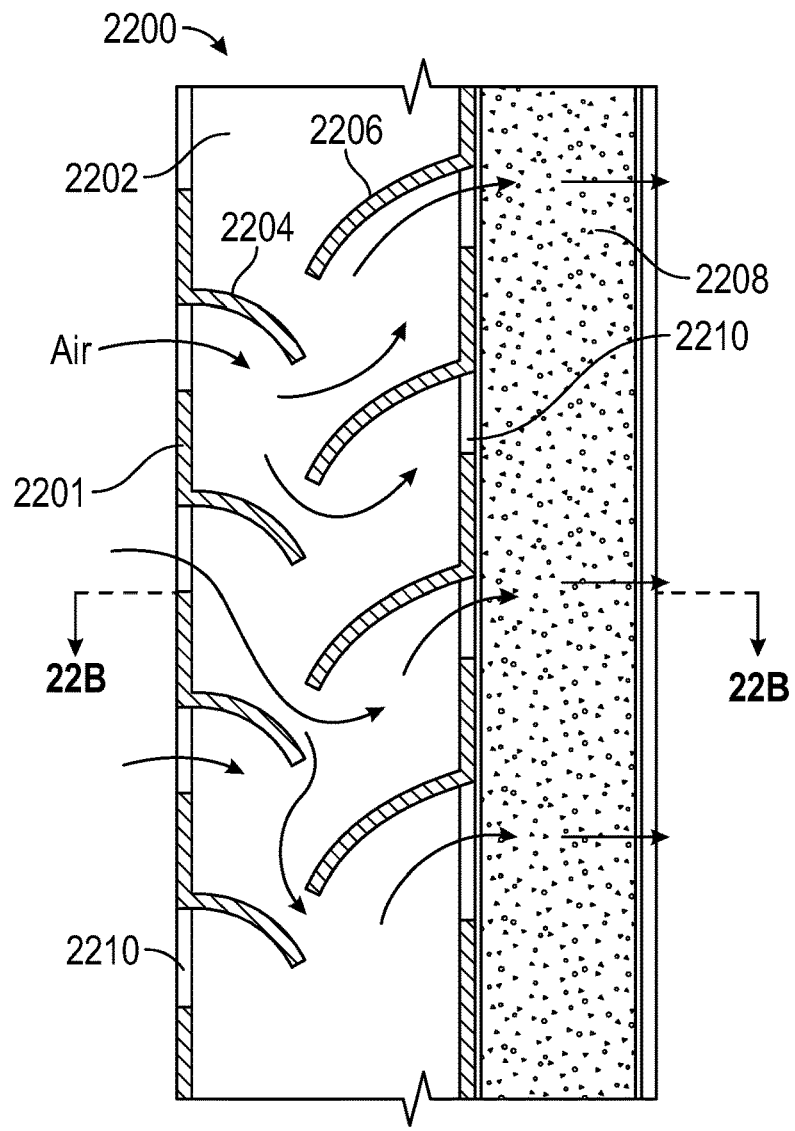
FIG. 22A illustrates an example embodiment of a straight-on view of a typical perimeter channel with an average cross-section showing depth, width and draft angle.
Figure 22B:
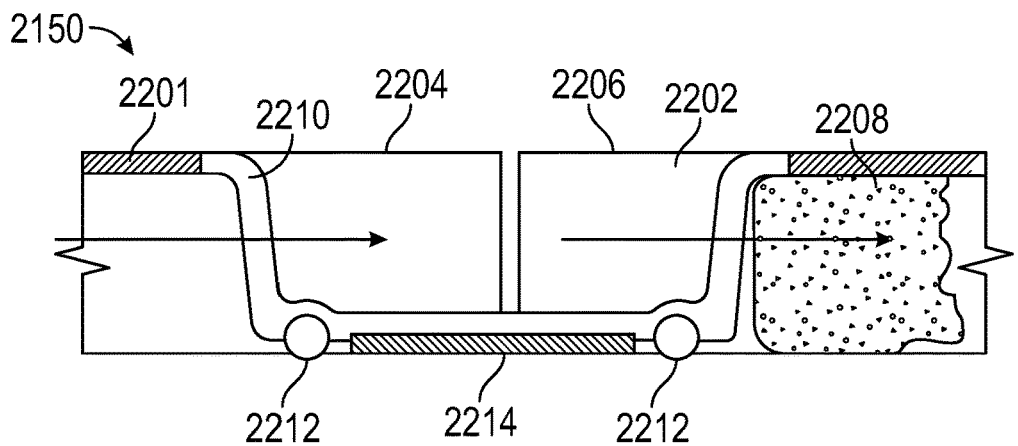
FIG. 22B shows an example sectional view of FIG. 22A.

The perimeter mount channel is shown here with an adhesive strip 2118 securing the outer HDS display perimeter just inboard of cut line 2116—all seen in horizontal section FIG. 22B. A replaceable air-filter cartridge 2114 may be placed in the mount strip, removable from the bottom of the HDS display unit when the vehicle deck lid is in its open (raised) position. In this embodiment, the OLED/TFT flexible display 2120 is secured and stabilized by internal rib sections 2122 molded as an integral part of HDS display rear structure 2123 and outer cover 2102. Heated or cooled air can be moved through this volume guided by aft ribs 2122 and horizontal ribs 2124 (made of heat conductive materials), after filtering by a replacement filter cartridge 2114 (see FIG. 17 for more detail, described below). Weather-seal 2110 closes out the HDS display unit at the left and right extensions against the original body just the same as a normal door or trunk weather-seal.

FIG. 22A-B shows sectional views through a perimeter mount. Conceptually the perimeter mount is a channel having a width, depth and draft angle suitable for spanning the distance from the back surface of the display at its desired pitch and station forward to the scanned rear end of the subject vehicle. This channel may be formed from a one-pull injection mold (where two halves separate in a straight pull without a need for undercuts or slides to eject a part) thereby lowering both the tooling and forming process. The vehicle side of the channel creates a surface which matches the compound curvatures of any motor vehicle scanned to fit it. Its design process may be guided by a tooling design algorithm which allows the channel to be spanned out or adjusted to clear any minor surface details such as chrome trim, moldings or branding jewelry attached to the vehicle's rear-end surfaces. By not having to remove such trim pieces effort required for HDS display installation may be reduced, while maintaining the vehicle's original factory-sealed design allowing a restoration to original condition when/if the HDS display is later removed. In addition to creating a tightly-fitting full-perimeter mounting strip and seal, this embodiment offers a surface for mechanical attachment should it be needed and a means to both induce, filter, channel and/or extract warming and cooling air to control temperatures in the HDS display system.

FIG. 22A shows a straight-on view of one embodiment of a perimeter channel with an average cross-section showing depth, width and draft angle. Each channel along with its mounting detail may vary between vehicles. The perimeter is essentially a recessed channel with the channel bottom following precisely the surface of the target vehicle from which it was derived from the digitized scans. This channel matches the vehicle's exterior curvatures and essentially follows just inside the perimeter of any hang-on part to which it is to be attached. In some embodiments, the perimeter mount may include a molded-in recess for a soft, black "O-ring" seal (e.g., FIG. 22B, 2212). When the O-ring is added to the molded-in recess and the perimeter mount is mounted on a surface, the pressurized O-ring separates the two sides of the surface completely.

Each perimeter mount may possess one, two, or more such parallel linear "O-ring" seals, such as o-ring 2212 in the example of FIG. 22B. Centered between this pair of seals and possibly set into a separate recess may be a factory-installed die-cut adhesive strip 2214 not unlike the adhesives used to mount and seal windshields and backlights in vehicles. The other side of the adhesive is the primary HDS display backing substrate structure 2201. This adhesive strip 2214, if factory-installed, may have a protective paper layer over the adhesive, removable by an installer at the time of installation. The sidewalls of the perimeter mount channel may include strategically-placed openings (FIG. 22A-B, 2210) through which air can be moved from the outside of the vehicle inside (or vice versa) for cooling or heating. Molded-in openings 2210 may be formed by turning vanes 2204 and opposing turning vanes 2206 placed in the perimeter channel. Such air intake (or exhaust) ports may ultimately be located based on aerodynamics testing and confirmation per vehicle to identify high vs. low air pressure areas around the part and at various vehicle speeds and points on the HDS display component. Some embodiments may include a replaceable air filter cartridge 2208 for easier cleaning and service.

Figure 31:
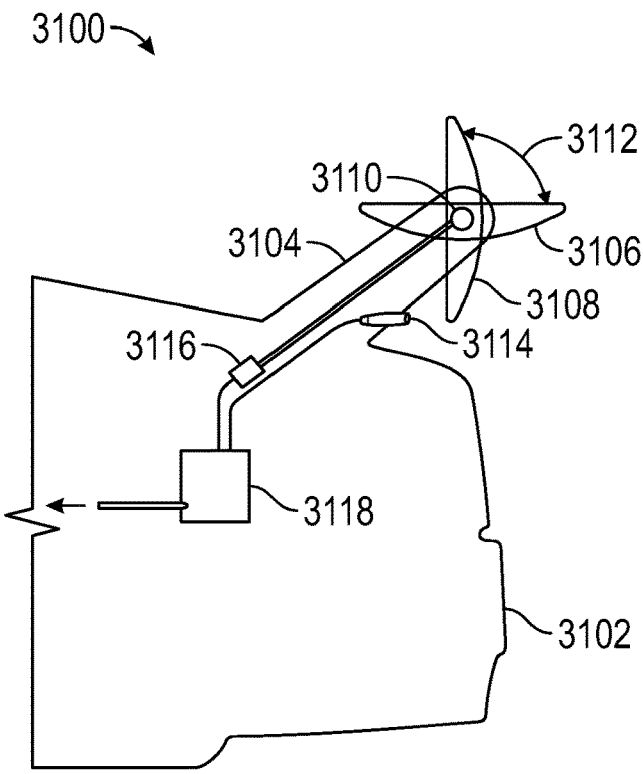
FIG. 31 illustrates an example embodiment of downforce installation for low-to-the-ground high-performance vehicles.

FIG. 31 illustrates an embodiment of a wing add-on configuration that may be mounted on a single or on multiple struts at or near the rear portions of a performance vehicle body. These wings 3104 may be installed on high-performance, high speed vehicles to provide downforce and control or correct degrees of aerodynamic performance. The wings provide for a convenient installation location for the HDS displays. Additionally, where a vehicle may have aft body shapes that are too low or rounded, such as Porsche-brand vehicles, or which might otherwise find it difficult to adapt a standard HDS display configuration, a wing with a wing add-on configuration may be installed. In the wing embodiment illustrated, a carbon fiber-like strut and wing structure may be used and wing surface 3108 may be of a clean glass or plastic material with a flat-wrap OLED/TFT flexible display beneath it. In practice the wing may contribute to vehicle aerodynamics at speed 3106, then when it returns to slow, sustained speeds, the wing may rotate about pivot 3110 through arc 3112 placing the wing's trailing edge up and the display surface vertical (perpendicular to a rear viewer's sightline). Wing rotation motors and drives 3116, display drivers, video microprocessor with DVR 3118, and targeting/security cameras 3114 may key in automatically operating the HDS display so a driver does not need to do anything special to operate the HDS display.

Figure 32:
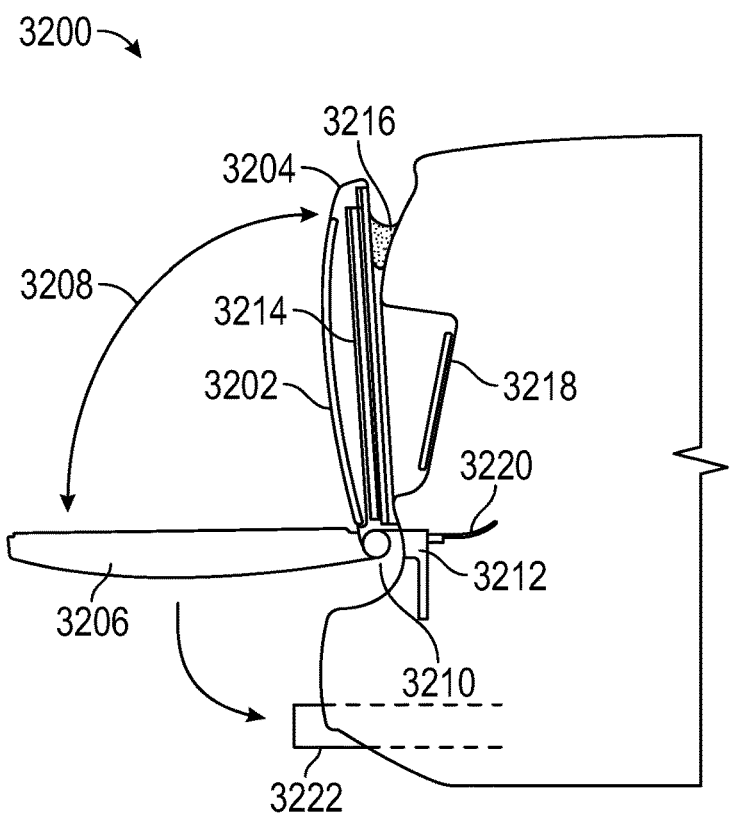
FIG. 32 illustrates an example embodiment of a ruggedized embodiment for use in rough environments.

FIG. 32 illustrates an HDS display industrial application where the HDS display unit is ruggedized for use in rough environments, such as commercial ride-share or taxi service. The unit is configured for external mounting and use as a hyper-relevant video message board in traffic, which then doubles as a luggage/load deck for passenger vehicles, trucks, vans, small personal transport, golf carts, driverless carts and public transportation. This unit creates easily added multi-use fold-down platform 3206 for use as tailgate, bench seat, luggage rack, bed extender and multiple other uses. The unit permits easy fold-down through arc 3208 from closed position 3204 to fold-down position 3206 about a pivot point 3210. The unit may be spring-loaded to assist closing (mechanism not shown). An original license plate 3218 can be viewed by law enforcement to confirm digital facsimile accuracies by folding-down the unit. Unit is suitable for very low cost upfitting of older model taxis or service vehicles where blending-in and aesthetics is less a requirement. It can use a totally flat, protected OLED film 3214 and a clear tempered glass or polycarbonate formed face 3202 over it. A water runoff and anti-slamming cushion or seal 3216, likely attached to vehicle trunk, is recommended. The display 3214 may be connected with DVR, database, forward cameras, aft sensors, backup power, et cetera near the pivot hinge 3210 with cables and connectors 3220. The unit can be adapted to existing vehicles by securing it to trunk structures just above the bumper using special adoption kit hardware 3212 or by using a trailer hitch mount 3222.

Figure 33:
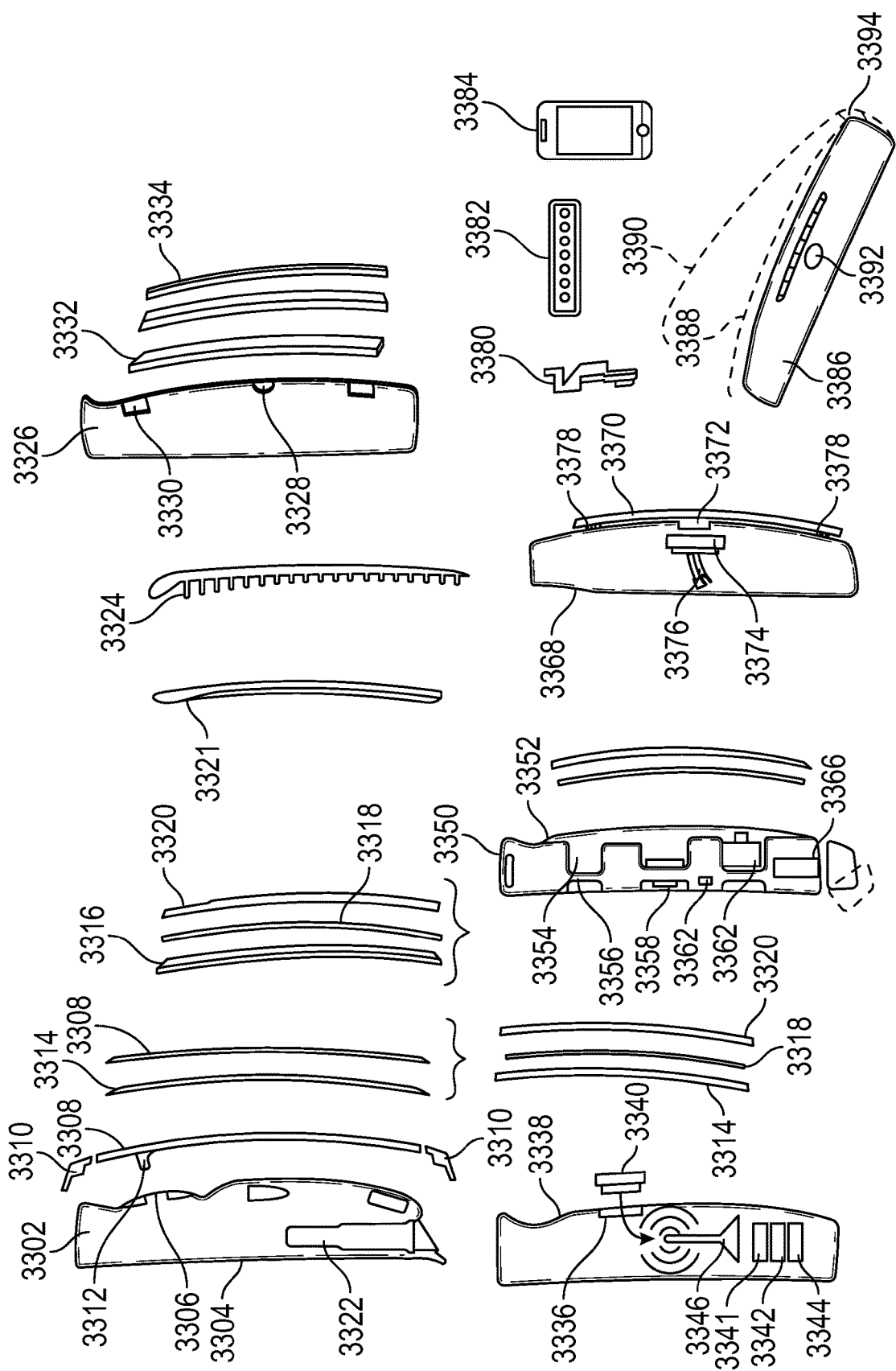
FIG. 33 illustrates an example embodiment of various mounting or securing, suspending and viewing flexible OLED/TFT diaphragms.

FIG. 33 illustrates various types of tailgate structures in cross-sections with a variety of potential methods for securing digital displays against their outer/existing surfaces. It is also feasible to plan tailgate production in which the display becomes an integral part of the base structure wherein the tailgate's outer finished surface is in plane with and curvatured to any adjacent body panels so that it appears to be a consistent built-in or integral part of the vehicle. The broader purpose and use of digital displays has been described in previous patent applications by inventor.

FIG. 33 shows a vertical section 3302 through a typical steel or aluminum tailgate. An opening 3306 in the tailgate's outer exterior surface for the attachment of branding or latches is shown. An independently fabricated digital matrix 3308 in a flexible film such as those being manufactured in smaller sizes today by LG of Korea is shown. A surrounding and protective bumper, seal or trim component 3310 is indicated. An electronic ribbon connector 3312 which can be connected to other display driving components is deployed from the rear of the display at a location opposite to an appropriate hole in the tailgate surface allowing electrical power (e.g., electrically coupled to a battery of the vehicle that is also used for routine functions of the vehicle) and transmission signals to pass from the finished TFT film into the inner volume of the tailgate structure. This design represents one of the simplest additions to an existing tailgate because the OLED/TFT digital flex matrix structure 3308 is sufficiently stiffened to span any openings 3306, or minor, local surface irregularities (not shown) yet still be curved to match the surface of the original tailgate. Such a matrix 3308 also may have an outer surface or coating either applied or manufactured as a part of its inherent structure as to be robust, durable and capable of withstanding automotive applications and environmental wear and tear. The display matrix 3308 may be attached with adhesives, with mechanical fasteners, or secured about its periphery in a similar fashion as automotive glazing at designated points across its contact surface via edge clamping or perimeter retainers or any combinations of the foregoing attachment means. A diaphragm including such display matrix 3308 can also be designed for removal and re-attachment.

Another panel embodiment adds a substrate layer 3314 is added to the event digital matrix 3308 to provide for the needed additional stiffness for spanning holes 3306 or deep character lines or negative surfaces. The substrate layer 3314 is also capable of adding insulation to enhance heating or cooling, aid in serviceability or serve a priming role in the physical attachment, bonding or trimming to enable mounting to an automotive body panel. Combinations of digital matrix 3308 and panel 3314 are suggested to meet design and environmental engineering requirements.

Variations of composited digital displays may also be used. These panels are designed with the properties of previously discussed panel embodiment, but it can also be electrically heated and is constructed of materials which are capable of rapid heat transfer/dissipation and is sensitive to cooling. These panels can include passages, grooves or cooling fins for cooled air enabling it to interact with a variety of cooling fans or vortex compressed air coolers 3322 such as those made by Vortec of Cincinnati, Ohio. When attached inside an original equipment metal tailgate structure, this fan uses compressed air to remove heated air and induce cool air to flow over or through channels or ribbed surfaces 3324, or into the volume of the tailgate itself to counter heat buildup from an LED or OLED matrix 3318 when used in hot environments. The diaphragm comprises an LED or OLED/TFT image-producing video matrix 3318 ready to be optically bonded to a formed and tempered glass outer protective display layer. Such glazing is quite similar to traditional automotive backlites located near rear windows and as is frequently done with automotive windshields or backlites, which may include an embedded pattern of fine wires or printed metallic deposition on the inner surface of glass 3320. Once an electrical current is applied, the embedded structures can generate sufficient heat to defrost such glass or keep certain components from freezing. Such embedded structures can be included in either substrate panel 3316, in matrix 3318, or on the inside (second) surface of protective glass panel 3320 where such lines are no more apparent on a display than they are on a vehicle's backlite.

Figure 30:
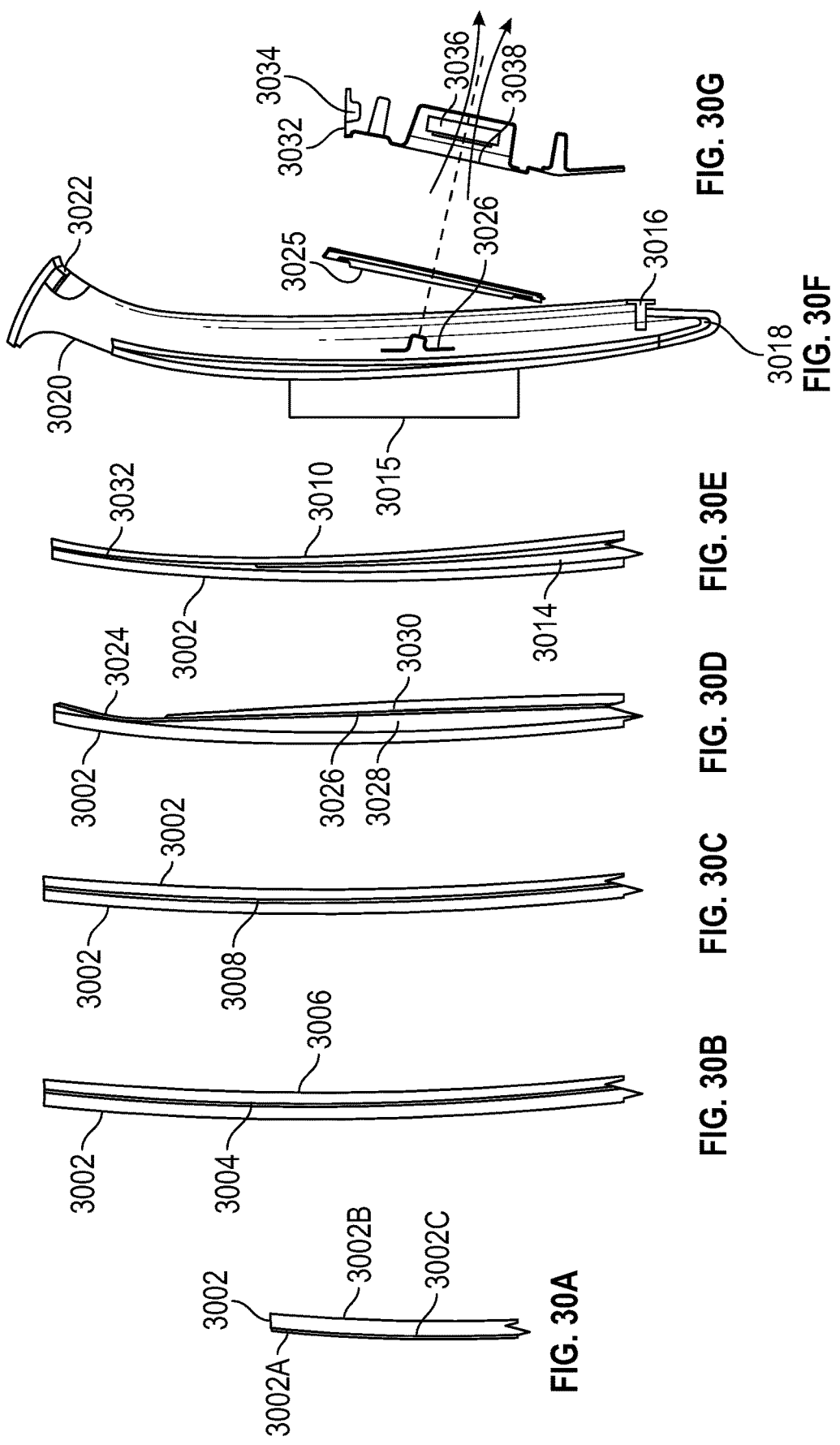
FIG. 30A-G illustrates an example embodiment of various flexible OLED/TFT diaphragms.

In some embodiments, such as in FIG. 30E, a display assembly may be a liquid suspension display 3321. Generally, it will consist of an outer protective surface of compound curvatureed tempered glass with a semi-flexible inner panel bonded to and sealed against the tempered glass with the cavity between filled with an inert clear liquid. In this liquid, the OLED or LED digital image generating matrix is suspended as a separate element. This assembly offers some unique advantages and serves several special functions which are described in OLED/TFT Display Assembly section.

Figure 36:
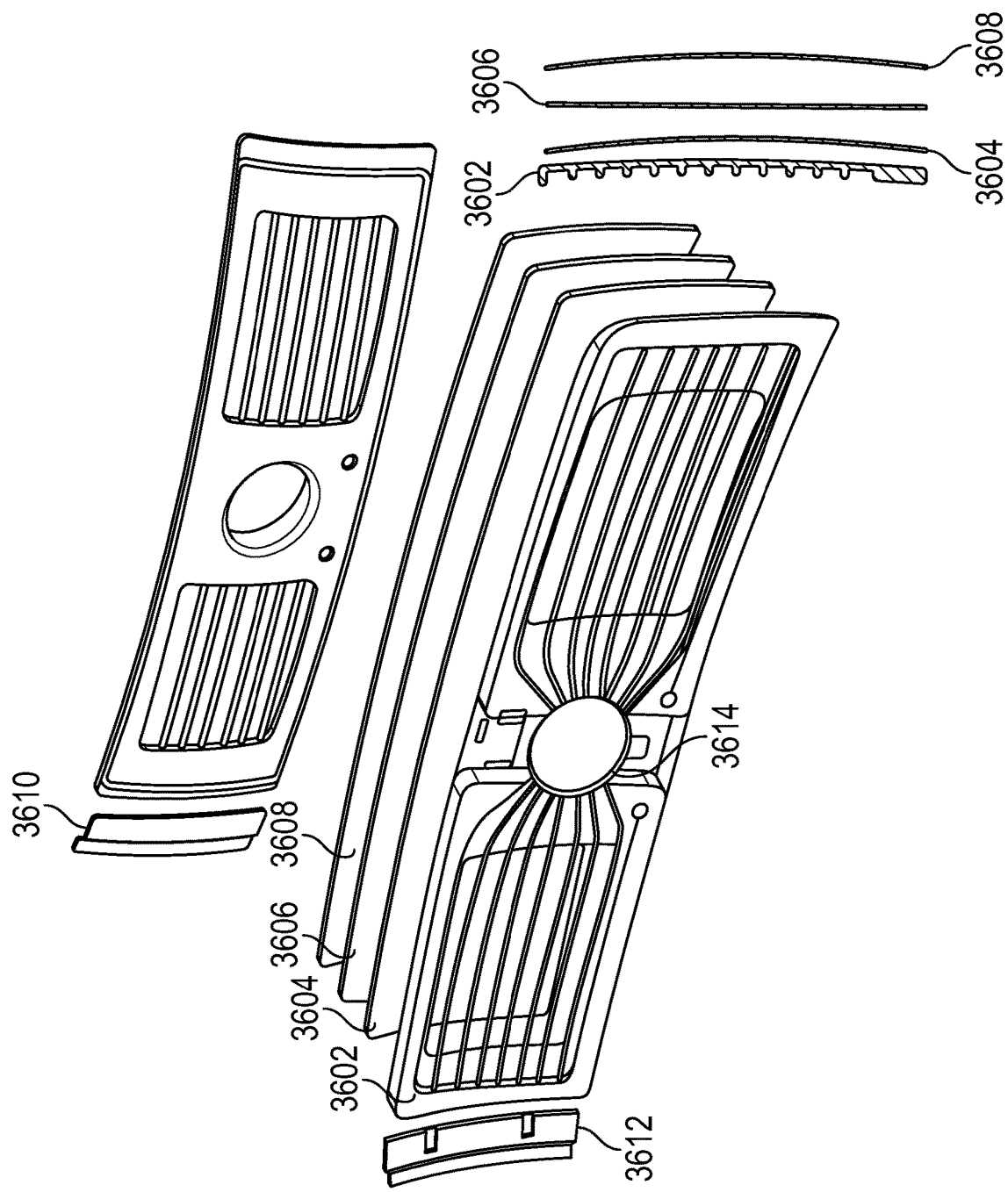
FIG. 36 illustrates an example embodiment of thin display matrix for tailgate assembly.
Figure 37:
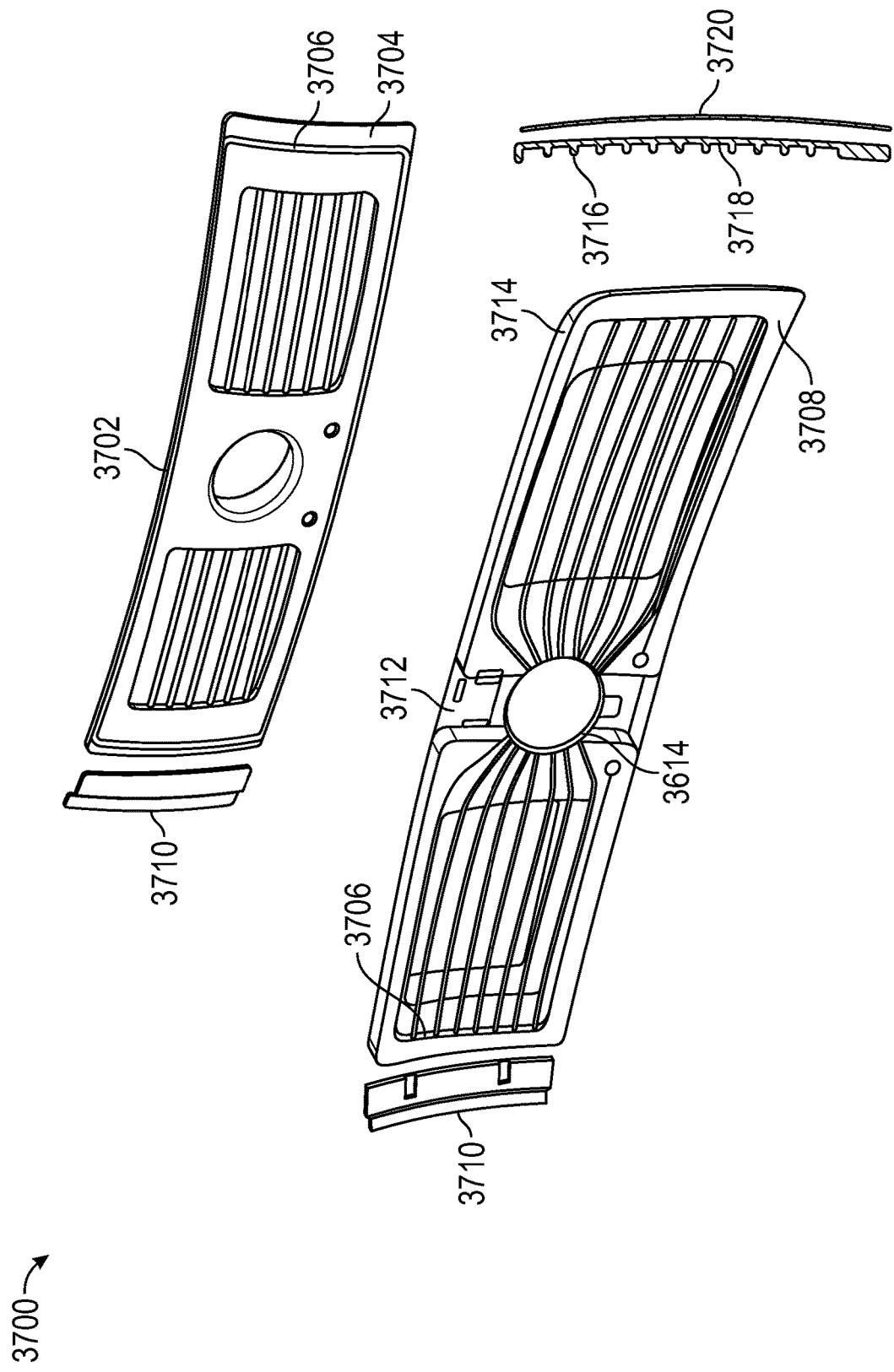
FIG. 37 illustrates the display matrix of FIG. 36 with various added functional elements.

A vertical section of relatively large, thin-wall injection molded part 3324 which is nearly identical in size to the viewing surface of the display area anticipated for the exterior of a traditional pickup truck tailgate is illustrated. This component 3324, also shown in exploded view FIGS. 36 and 37, are pickup truck tailgate versions of HDS displays and are companion alternatives to previously filed patents defining a video display fully integrated into the surface, or the structure, of a pickup truck tailgate. The portion of panel 3324 which makes contact with the outer surface of tailgate 3302, is comprised of a closely-spaced, network of fine, plastic or elastomeric ribs which are generally perpendicular to the video display surface to which it mates and are molded-in as an integral structure of said panel. Panel 3324 can be selected from previously discussed various types of display panels 3308, 3314, 3316, or any other types of panels. In some embodiments, the material for panel 3324 may be of color compatible with most vehicle exteriors (e.g., a dark charcoal-colored polycarbonate or similar engineering plastic) suitable for use in the exterior/trim panels of vehicles.

A wide variety of plastic or composite materials can be used for such a structure and it is conceivable that an extrusion process may be employed in plastics or metals to produce constant horizontal sections or rib lengths as one might find across the span of a tailgate's contact rear surface area. Importantly, with respect to the various configurations described in this specification, the network of ribs formed into panel 3324 and in panels having similar ribs, all have multiple purposes and functions such as: (1) structures—providing internal stiffening to resist bending, (2) stand-offs—spacing a display surface away from the vehicle surface, (3) channeling air—the creation of air passages by closing off ribs and case against a vehicle body, (4) channeling water—above but directing water or condensation passage out case bottom, (5) securing components—forming precise voids to hold or protect internal components, (6) sealing the panel 3324 to irregular surfaces—use of linear bonding strips around product perimeter, and (7) clearing inherent objects—going over or around vehicle body surface features. Various sizes and functionality of these ribbed elements are shown in FIGS. 36 and 37.

An alternate design where a basic stamped metal pickup truck tailgate 3326 is modified by removing a portion of its exterior surface 3328 to form an opening to receive a digital display assembly is illustrated. Such modifications can be accomplished through cutting, or by manufacturing the product to include opening 3328. If desired, portions the original exterior sheet metal can be formed to create mounting flanges 3330 along the perimeter of the opening. Such flanges 3330 accept a fiber-reinforced plastic (FRP) or elastomeric surrounding bezel 3332 which may include means to receive, support and seal said digital display assembly 3334.

A similar tailgate cross-section 3338 which contains pre-existing holes or penetrations 3336 through its exterior surface designed to accept such items as branding or logos, locks, latches, camera modules, et cetera is illustrated. Such penetrations can be modified or used to install or accept various components which may become necessary to support the functionality of a large scale digital display. An optional electric fan 3340 may be added to an opening 3336 to move volumes of warm or cool air into or out of the interior volume of a tailgate structure passing air across the connecting rear surfaces of a digital display or through the air channels created between the ribs of panel 3324 and the rear-facing surface of tailgate 3338. Internal components such as a DVR 3341, backup batteries for security systems 3342, GPS modules 3344 and the driving electronics for (not shown) video display can be housed within the available volume of said tailgate structure, and in that location be cooled or warmed by the passage of air from fans 3340, or by compressed air coolers 3322. Antennas 3346 may be internally installed for receipt of content queuing codes, external targeting, proximity data or for the uploading of display transactional data to or from local V2V or V2I networks. Importantly, the critical use of the interior volume of said tailgate structures allows for the very close mounting of digital display elements and assemblies as closely as possible to an original vehicle body surface to achieve the thinnest possible appearance and conformance to the original surface of a target vehicle.

In another embodiment, a substrate layer 3314, a matrix layer 3318, and a flat, flat-wrapped or compound curved panel protective glass 3320 may include electrically heated linear deposits for heating and defrosting said display. Importantly, matrix layer and protective glass layers 3318 and 3320 may be optically bonded to each other, eliminating the air gap between them to prevent reflections off the rear surface of glazing 3320 and the front surface of matrix 3318 greatly improving the quality of the finished display. If desired panels 3318 and 3320 can be simultaneously bonded with substrate panel 3314 to ensure the necessary stiffness, sealing and protection for installation, this entire completed assembly may be substituted for assemblies having only the matrix and cover 3314 and substrate layer 3308.

A tailgate cross-section 3350 designed from scratch to receive a TFT digital matrix assembly is illustrated. Such a ground-up display structure for a critical-mass truck tailgate application may first consider the nature of the state of the art TFT display assembly with respect to its thickness, stiffness, inherent flexibility or resistance to structural torque loadings on the tailgate and the imparting of these loads to the display element. A variety of display mountings are feasible and anticipated to accommodate display designs and innovations through the years. For example, the outer vertical surface 3352 of manufactured tailgate 3350 may simply be eliminated to create an opening of a design size to accept a separately manufactured display. Such an independently fabricated and finished display 3321 and may be comprised of any or all of the basic panels shown in this FIG. 33. For display assemblies having adequate inherent resistance to torsional loads, vibrations, thermal dynamics, physical impacts, environmental extremes and the many other conditions that are imposed on it through its use on moving objects under all design conditions, such a display might be secured via a specially-designed/attached perimeter seal allowing it to "float" insulated from physical conditions (such as vibrations) as might be received by the tailgate structure itself. Alternate mountings might be similar to the methods used to install glazing in vehicles where a pliable mastic applied to an appropriate measure of surface area around a perimeter may produce the precise balance of structural adhesion vs. float to deal with vibrations at the same time accommodates for the area coefficient of expansion or contraction due to environmental extremes and dissimilar materials. Conversely, if the coefficient of expansion/contraction of a manufactured TFT OLED display matches the coefficient of expansion/contraction of a substrate structure such as tailgate 3350, then surface 3352 might remain as a supporting/securing element and an independently designed and manufactured flexible LED or OLED/TFT sheet such as those being demonstrated by Samsung and LG of Korea might be appropriately secured to said surface 3352 to produce a lightweight, robust and perhaps even replaceable display element. When building a structure (such as a tailgate, hatch, deck, fender, door, hood or trunk) from scratch it is both feasible and wise to use its available interior volumes and structures to the greatest extent practical. Such uses might include the use of voids 3354 for the flow of air to control temperatures of both the base structure as well as the installed display; the use of front and rear stampings or moldings to create web sections 3356 or form structures and compartments, bosses, mounts or standoffs for the attachment or positioning of internal hardware or electronics such as fan 3358 to push air over the display or to extract hot air from compartments 3354 as it pulls in cool air from strategically located openings 3360 around a perimeter. Base structures may also be used to attach, heat or cool electronics or modules such as proximity sensors, optical sensors or targeting/security cameras 3362 which in some cases can look through portions of a locally-transparent display without being readily detected from the exterior of such a display. An original structure also permits inclusion of removable or open-able covers or doors 3364 for access to customer-serviceable parts such as replaceable batteries, electronic modules or air filters 3366.

A typical tailgate structure 3368 (or hatch, trunk, deck, door or fender) surface of a moving object may have an independently-manufactured, self-contained, weather resistant or weather-proofed digital display product 3370— similar to the displays manufactured by such companies as Samsung or LG of Korea for interior use, or such companies as Christy for outdoor use. These displays are packaged in a thin, sealed structural component which can be attached or recessed into a suitable surface of said moving objects. In a common production, OEM or aftermarket installation such a product might be attached to the outer surface of a moving object at a single, essentially central location for such a display in which a hole or opening is created (by making a new hole or by removing a component and using an existing hole) to receive a mounting ring, plate, collar or flange mechanism 3372. The mechanism is an integral part of the backside casework of display 3370, and is used to secure display firmly against structure 3368 without distorting the display's outer (front) face as it is secured with said mounting mechanism 3372 and locked in place through a suitable retainer or locking ring or plate 3374. Electronic leads for power and video 3376 pass through the original wall of structure 3368. The mounting mechanism 3372 and 3374 can be further linked to an on-board security system and further coupled with an individual vehicle's security service or diagnostic communications or navigations systems to assure the proper installation and authorized removal procedures for such systems. Display 3370 is further supported, cushioned and secured via mounting pads at multiple points 3378 placed strategically around the perimeter of display 3370, in locations to absorb and resist general vibrations, face impacts or torque loads on panel 3370 and may optionally be molded into the rear surface of 3370, if not as distributed spots, but as a linear standoff around the perimeter of display 3370, sealing it against weather, yet in certain configurations (HQ) faced with a non-skid or surface gripping material sensitive to pressure applied by said panel, or by removable adhesives enabled during initial installations.

Yet another method for applying or securing a flexible OLED TFT digital video array directly to the surface of an object 3386 is illustrated. This method anticipates development of TFT digital films 3388 which are not only flexible (and are currently entering production) but also formable. Such image-producing TFT arrays may be initially fabricated in a process akin to printing in which the light emitting matrix is deposited onto a flexible substrate, or combination of substrates which allows the TFT matrix to remain in a fluid-like state in a way that allows it to be formed in flat-wrap or in mild compound curvatureed panels. Once formed, it is then cured into a durable solid sheet film using combinations of light, pressure, heat and radiation converting it into a final exterior finished surface. Such applications may be so thin yet self-contained that repairs or replacements are made by overlaying second or third such TFT layers 3390 over the originals. Electronic connections 3394 integrated during the "printing" process convey digital signals to the TFT matrix. Such films once attached and cured become an inherent part of the finished component. As such they can expand or contract with a substrate panel structure, or such composites may remain flexible and elastic after curing allowing them to function at differing coefficients of expansion. Such applications may permit the internal mounting of cooling fans or vortex compressed air coolers with manifolds 3392 to direct cooled air against the internal substrate thereby allowing the combined structure to meet the operational temperature demands more extreme mobile environments.

One of a potential wide array of latch design add-ons in which a new mechanical latch assembly is created as an integral part of panel 3324 to make a mechanical link-up with the existing latch or mechanism of the original tailgate or door. This may allow a very large display panel to completely cover a pre-existing latch system but its actuating portions so it can still be used by a human operator much the same as the original. Digital keypad 3382 may optionally replace or augment the new mechanical actuator (not shown), providing the electromechanical interface is It may also be possible to introduce touch-sensitive technology to local or designated portions of a larger display surface so that an appropriate graphics user interface (GUI) may be displayed to interact with capacitive, Infrared or other touch technologies to interact with the larger display. 3384 merely references use of smartphones, wearables or other kinds of personal devices to enable remote wireless or keyless operations.

Note that outer glass/plastic covers and others may include a linear polarizer layer and/or quarter wave retarder film for the circular polarizing to eliminate or minimize the reflection of light off surfaces which are internal to the HDS display's OLED/TFT display disclosed herein.

Figure 34:
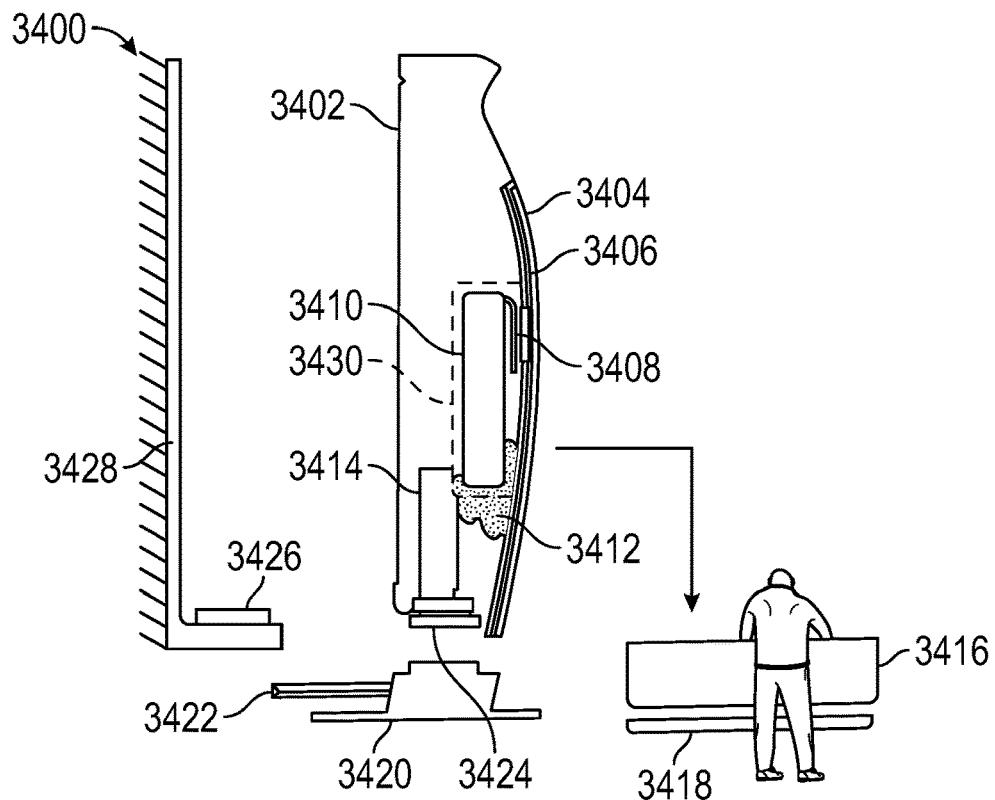
FIG. 34 illustrates an example embodiment of a detachable and separately functional tailgate HDS display.

FIG. 34 illustrates an embodiment of the detachable and separately functional tailgate HDS display. The HDS display unit 3402 includes cooling means, electronics storage, and accessories for detachment from the vehicle allowing for remote, independent viewing. This embodiment has a base coupling mount 3424 that allows the embodiment to be coupled to stand 3420 or an alternate mount 3426 which is part of wall mount 2428 that may be placed or mounted any basically vertical surface 3400. The embodiment may include an outer mold (and/or other coating or layer) around its outer structure. A flexible OLED/TFT diaphragm 3406 which is protected by a glass or plastic cover 3404 exists on the aft surface of the embodiment, which may protect the display panel from natural elements. The display panel 3406 is connected to electronics package 3410 with flex connectors 3408. In some embodiments, the electronics package 3410 may easily be removed from the entire assembly for cleaning and service. The assembly may contain a compressed air cooler 3414 which provides cooled air to internal components of the system to reduce operating temperature, as needed. The entire unit provides for detachment from a vehicle or from a wall mount coupling 3426 to be used as a standalone display unit 3416. The alternate base stand 3420 may have internal power supply or provide for a cable connection 3422 to a power source. In some embodiments, there may be an external speaker sound-bar 3418 which may be used with the display when the display is attached to the vehicle (placed on tailgate upper rail) or when the display is in standalone mode.

Figure 35:
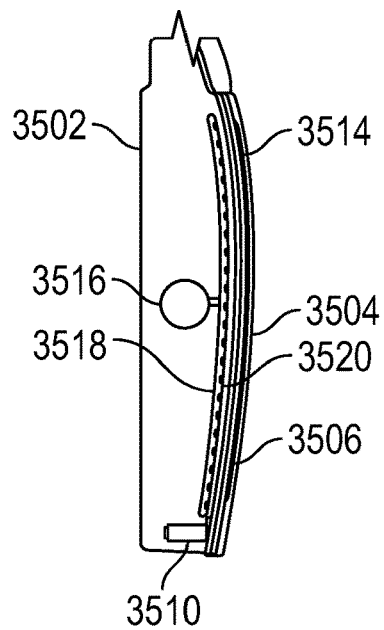
FIG. 35 illustrates an example embodiment of a vertical section through alternate tailgate HDS display system showing internal panel cooling, glass defrosting and thru-the-display cameras and sensors.

FIG. 35 illustrates a vertical sectional view of an alternate tailgate HDS display assembly with an internal panel cooling, glass defrosting, and thru-the-display camera and sensor viewing. This embodiment also has an outer mold 3504 which is flush with the original design lines of the vehicle and fits the existing outer structure 3502. A flexible OLED/TFT diaphragm 3514 is covered by a face layer 3504 made of glass or plastic. The cover layer 3504 may include a linear polarizer layer and/or quarter wave retarder films. The cover layer 3504 may have embedded wires or metal deposition 3506 for resistive heating of the layer. In some embodiments, the cover layer 3504 may be transparent or semi-transparent such that included cameras or sensors 3510 may detect thru-the-display. The assembly may also include compressed air cooler 3516, air-distribution manifold 3518 with holes 3520 for cold air distribution.

FIG. 36 illustrates a thin display matrix for tailgate assembly. The assembly 3600 has a ribbed standoff 3602 made of polycarbonate engineering plastic or ultra-thin elastomeric seal providing for shock mitigation, or combinations thereof. The ribbed standoff 3602 may be injection-molded from the tooling from the process in FIG. 9-12. In some embodiments, going aft-ward (relative to the vehicle), a layer of thermally-conductive substrate material 3604 (black or clear composite), followed by a flexible OLED/TFT display 3606, followed by a cover 3608 will be layered with adhesive means. The cover 3608 may be made of glass or plastic material and comprise linear polarizing layer and/or quarter wave retarder films. The layers may utilize left and right bumpers or cap-strips 3610 and 3612 to complete the assembly where the cap-strips may have mechanisms for holding replaceable air filter cartridges. Also, the assembly provides for locking/security collar provisions (detailed with FIG. 33, 3372 and 3374).

FIG. 37 illustrates the display matrix of FIG. 36 with various added functional elements. The assembly 3700 has a ribbed standoff 3702 made of polycarbonate engineering frame plastic with attachment hard-points and web/air-guide panel reinforcements bonded to elastomeric, silicon-like rib sections 3716 or use flexible silicon-like coatings to cause positive contact with the vehicle body surface. The elastomeric rib sections 3716 provide for directionally controlled shock/impact mitigation and vibration dampening through their design shape and location. The rib frequency, depth, and thickness may be customized based upon weight and other physical parameters of the display 3720. Also, the ribs are arrayed for airflow control and to counter lateral and compressive loads from display surface movements. The ribbed standoff 3702 may be injection-molded from the tooling from the process in FIG. 9-12. A layer of flexible OLED/TFT display composite 3720 with hard exterior and polarized film cover may be attached to the ribbed standoff 3702 with adhesive or mechanical means, or combinations thereof. The assembly may provide for installment space for electrical flex connectors (e.g., similar to 3408), electronics package (e.g., similar to 3410), camera/sensor mounts, and compressed air cooler (e.g., similar to 3014).

In some embodiments, multiple display panels may be incorporated into the design. Because of uneconomical cost of display or the failing of current technology to reliably manufacture display panels having the desired specifications (such as weight, thickness, transparency, et cetera) or desired mechanical and electrical characteristics, HDS displays may take transitory approach of combining multiple feasible display panels to span the display space. Furthermore, because HDS display products are envisioned to suit various types of vehicles spanning from small vehicles to semi-trucks or even larger surfaces, a prudent design decision may prefer to use multiple displays even if technology is available and cost is not unwieldy. A design using multiple displays may be beneficial for other reasons as well, such as providing for modular cleaning, service, and replacement should a display need troubleshooting.

In this respect, a prudent design choice of an HDS display involves multi-variable analysis involving cost and benefits involved. Such analysis includes, in addition to the number of display elements, specific type of display panel used. Some embodiments may incorporate, in addition to OLED displays, LED displays, LCD displays, AMOLED displays, or any other type of display panels. Some types of displays may be flat (having no curvature) and some types of displays may have curvatures in one direction, two directions, or more. In some scenarios, it may be prudent to use one type of display panel for one portion of an HDS display and use another type of display panel for other portions of an HDS display. It follows that when the current state of technology develops and improvements in display panel technology becomes available, or new type of mounting material or mechanism becomes available for the displays, embodiments utilizing those improvements are foreseen within this disclosure.

Figure 38A:
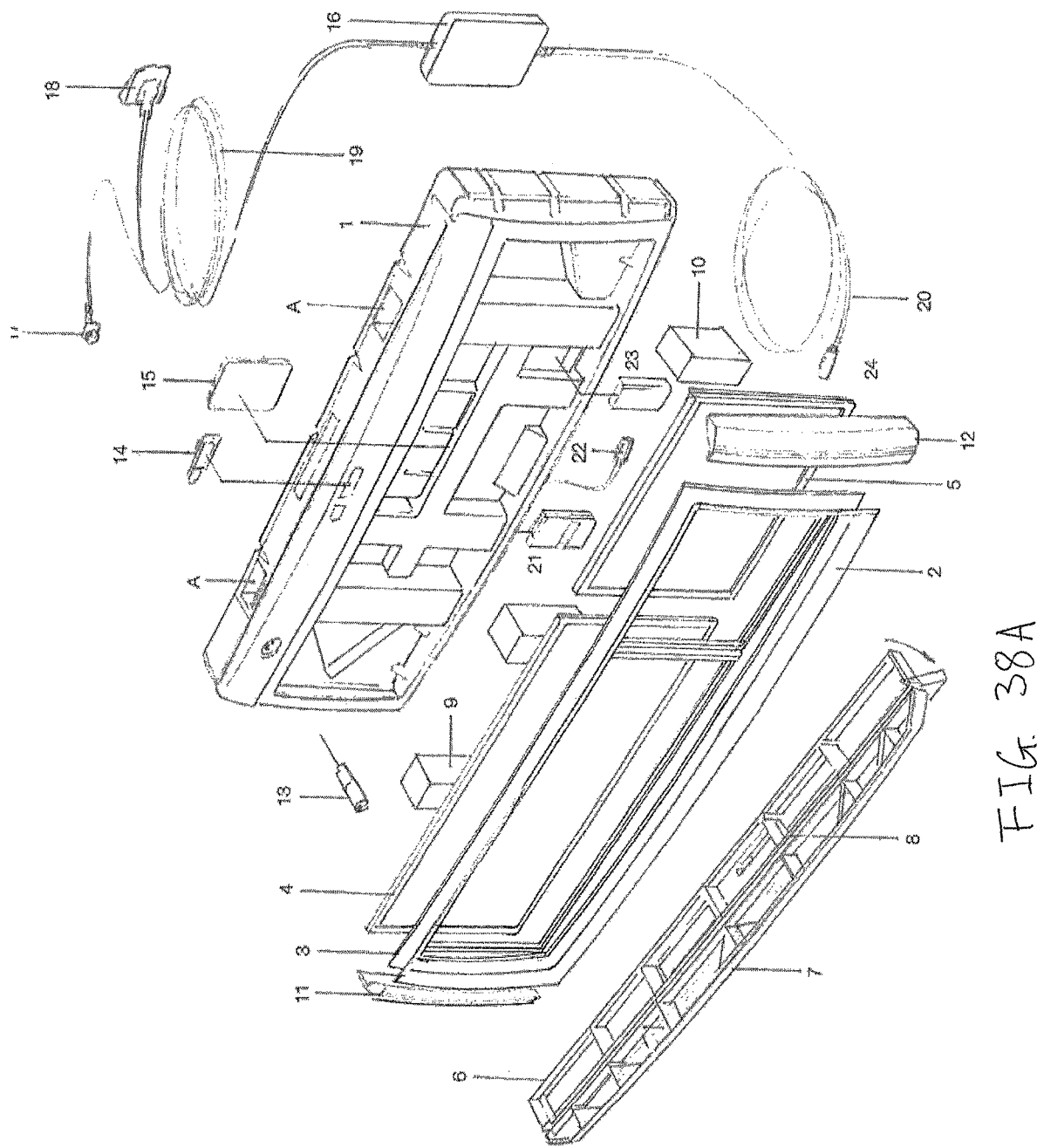
FIG. 38A-B illustrate example embodiments of HDS display systems using multiple display panels or a single display panel.

Depending on the embodiment, an HDS display may comprise a 1-piece, 2-piece, 3-piece, or multi-piece, LED/TFT display array which can be butted together or overlapped in a way that minimizes or disguises any break in display continuity when the dark displays themselves, their bezels and mountings configured to be invisible (or barely visible) when placed behind a formed, tinted (to various levels depending on the implementation) polycarbonate or tempered glass curved cover. For example, FIG. 38A illustrates an embodiment of a HDS display incorporating two display panels. In an alternative embodiment, the display and bezel may be used as an underlay for a 3 (or more)-piece version. A 3-piece flat-screen display may use the center section for private/tandem content and the left and right sections for wide-field signaling, lighting, licensing, warnings and/or alerts, for example. In other embodiments, these three pieces may be butted (or even partially overlap) so that imagery could play across all three pieces that appears consistent, even while the pieces may use different filtering.

Depending on the particular design and/or implementation, a multi-piece HDS may include any portion of the components:
1. carbon fiber structure
2. cover glazing—(light tint simulating typical backlite)
3. elastomer gasket/bezel/soft-shock mount for edge-mounted displays
4. LED display (left/driver's side) flat screen
5. LED display (right side) flat screen
6. lower close-out access door (for serviceable components)
7. tailgate lower bumper (hard elastomer)
8. living hinge/molded into (7)
9. impact/expansion blocks (2-4 for left display)
10. impact/expansion blocks (2-4 for right display)
11. left side glazing seal/bumper
12. right side glazing seal/bumper
13. vehicle recognition/targeting camera
14. targeting, backup, security & measurement camera w/IR receiver
15. theft beacon w/backup battery for security system (secure mount)
16. Content Receiver & DVR/crash recorder (cab installed)
17. vehicle recognition/targeting/payload monitor camera (mounted inside cab rear glazing)
18. forward-looking camera (rear-view mirror attach)
19. cab ceiling video cable/harness
20. aft/bed wire harness
21. DSRC receiver, proximity/motion sensor package
22. quick-release electrical connector (tailgate)
23. unspecified serviceable component (TBD)
24. quick-release electrical connector 25. v!e (or partner) logo—jewelry (not shown) chrome attached to glazing In the embodiment of FIG. 38A, a tailgate structure 1 preferably made of carbon fiber is integrated onto a vehicle surface. On the structure, various sensors 14 such as targeting, backup, security, measuring camera with an infrared receiver may be installed. Some security system, such as a theft beacon 15 which may send out alerts and locations may be securely mounted within the structure with its backup battery. A targeting camera 13 or some other form of detection mechanism that may determine whether another vehicle/pedestrian is paired or not may be installed in the structure (in this example, at the top left cylindrical opening in the structure 1). Furthermore, DSRC transceiver, proximity/motion sensor package 21 or any number of some serviceable component 23 may be installed in the structure 1. Before integrating left 4 and right 5 display panels, a number of impact reduction blocks 9 and 10 may be inserted between the tailgate structure 1 and the display panels 4 and 5. The impact reduction blocks 9 and 10 may also be used to provide the display panels 4 and 5 some extensions from the tailgate structure 1. The space created between the back side of the display panels and the tailgate structure by the extension blocks may be used for cooling and healing purposes.

In some embodiments, a bezel 3, preferably comprising elastomer-like material, may be layered to provide soft-shock mount for edge-mounted displays on top of the display panels 4 and 5. The bezel 3 may provide for separation between a cover glazing 2 and the display panels 4 and 5 such that an impact on the central portions of the cover glazing 2 would not transfer into the displays directly. The cover glazing 2 may have a light tint that simulates typical backlites. The covered display assembly is capped on each sides with left 11 and right 12 glazing seal/bumpers. The capped display assembly is further sealed on the top and bottom with a tailgate structure 1 or a close-out 6. The close-out 6, preferably comprising hard elastomer-like material, may have molded-in living hinge 8 allows portion of the close-out 6 to rotate and open the seal to provide access to any serviceable components.

In some embodiments, various other components may be incorporated into the overall HDS display system to provide public safety and traffic management information. A content receiver 16 with DVR or crash recorder installed along with an HDS display (or inside an HDS display system) that is connected with a rearward looking camera 17 or sensor capable of vehicle recognition or payload monitoring may capture rearward vehicle's information including any crash-related information and record it. Similarly, a forward-looking camera 18 attached to a rear-view mirror may provide similar information to be recorded by the content receiver 16 through a cable connection 19. Input, output, and power cable 20 can be connected from the content receiver 16 to the HDS display through an aft wire cable 20. The connecting cables 19 and 20 may be discreetly placed or concealed from view by laying them along floor or ceiling. In some embodiments, the DSRC receiver 21 may receive warnings from other vehicles or institutions and instruct the HDS display to present: blind spot warnings, forward collision warnings, sudden braking ahead warnings, do not pass warnings, rollover warning, et cetera. Additionally, it may display safety inspection status, commercial vehicle clearance, toll payment, et cetera. The HDS display and external components preferably will use quick-release electrical connectors 22 and 24.

Figure 38B:
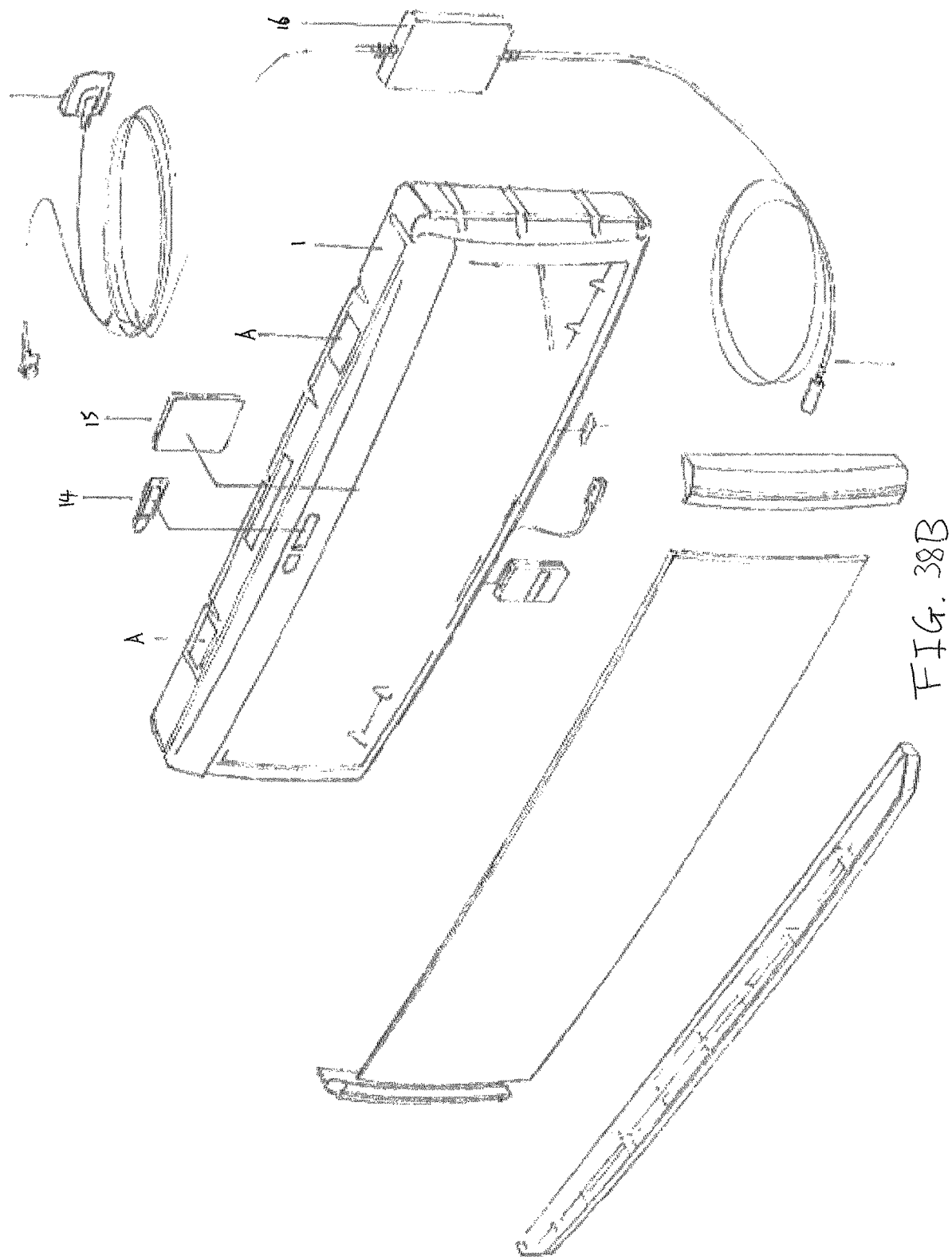

FIG. 38B illustrates another embodiment of a HDS assembly with a single display panel (instead of multiple display panels). Reference numbers in FIG. 38B are associated with the particular components discussed above with reference to the commonly numbered components in the embodiment of FIG. 38A.

OLED/TFT Display Assembly

FIG. 30A-G illustrates various components that may be included in an HDS display panel. An HDS display may suspend its TFT matrix in a variety of ways between its curvature face and the backup to its substrate (described elsewhere in this document).

FIG. 30A illustrates a formed, tempered glass or coated plastic cover layer 3002 with integral or surface applied linear polarizer 3002A, quarter wave retarder film 3002B, and integral tints for color and value control. This combination is used to block or minimize unpolarized light passing through the face layer 3002 to be reflected off subsequent layer surfaces.

FIG. 30B illustrates an OLED/TFT 3004 laminated between formed cover 3002 and substrate 3006.

FIG. 30C illustrates an OLED/TFT 3008 flexible display optically bonded between sheets of substrate 3002 having similar coefficients of expansion.

FIG. 30D illustrates an OLED/TFT display 3024 bonded and sealed around compound perimeter with primary display area, unstressed/unformed; uses linear polarizer with quarter wave retarder to block light reflections off internal surfaces. There is a separately suspended flexible OLED/TFT display matrix 3026 which provides for a space between the protective cover plate and image producing TFT flex layer 3028. Also, this concept provides for a natural reverse (concave) curvature in opposite direction 3030 caused by flat-wrapping flex sheet.

FIG. 30E illustrates a unique encapsulation concept using display face 3002 and substrate 3010 made of plastic or glass having common coefficient of expansion but having a high thermal conductivity. The display face 3002 and substrate 3010 can be heated like glazing defrosting systems and can suspend the OLED/TFT 3012 in liquid suspension 3014; the inert clear liquid (a) suspends OLED clear flexible TFT to allow free expansion/contraction of OLED due to heating or cooling, (b) enhances thermal heat dispersal and dissipation through internal/external pressure changes and/or flexing of containment surfaces 3002 and 3010, causing liquid to flow across heat-producing OLED elements and across heat-absorbing elements such as thermal sheet substrates, and (c) liquid eliminates air-surface interface which causes excessive internal reflections off multiple internal reflective surfaces. A permanent bond interface 3032 is formed at the perimeter of cover layer 3002 and substrate 3010.

FIG. 30F illustrates a typical vertical cross-section through HDS display of installation of liquid suspension composite version E showing clear area 3015 for viewing license plate through opaque substrates. One or more embedded camera(s) 3026 with wide field optics for image capture of physical license plate 3025 for replication may be optionally installed for real-time, on-demand display of the plate image on OLED/TFT. Other sensors 3016, such as proximity sensor utilizing visible or IR detection, on-demand signals, targeting cameras, security cameras, graphic rendering cameras, et cetera may be positioned in HDS display structures or trims 3018 for multiple uses. These sensors 3016 may be viewed through designated portions of the completed display assembly. Further, trim designs can enable flush insets of display surfaces and spoiler configurations 3020 which can include specialized air intake provisions 3022.

FIG. 30G illustrates a centerline cross-section through display locking interface 3032 which securely attaches to vehicle license plate recess, then receives and locks removable display for portable use, removal, service, repair or upgrades. The unit has an illumination with circuitry 3034 for license plate which may be turned on when OLED/TFT is turned off at night or at any time by external signal on-demand. The HDS display is linked to a security system which alerts owner, monitoring networks or law enforcement to operational irregularities. Internal fan 3036 with heater, blower pulls air through OLED substrate channels, moves air through plate recess area, then extracts the air into trunk, interior volume, or outside environment at 3038.

Use of License Plate Recess as Mechanical and/or Electrical Connection Medium

These sectional drawings reveal centerline sections in which an HDS display housing is formed to fit inside of, and against major portions of the license plate recess in a vehicle's aft surfaces. It is the use of this special-purpose, dedicated area which allows an HDS display system to be quickly and easily aligned and connected to power on virtually any motor vehicle. Most would not anticipate mounting any other object in this space because it would obscure the traditional location and mounting provisions for the rear license plate. Note the mating portion of this recess, where the license plate is normally attached, permits the addition of new holes and openings to accommodate unique attachment rings or locking collars (to secure the HDS display component) as well as provide natural leads and locations for power, cameras, sensors, video drivers and power supplies for the display, security systems, GPS, data links for the on-board database/DVR, HVAC and other equipment. All electronic and display functional components can be housed between the back of the OLED/TFT display substrate itself and the vehicle's aft surfaces, in particular within the volume formerly allocated to the license plate and its illumination, which allows HDS display to be positioned as closely as possible to the original target vehicle's surfaces.

Every new vehicle for which an HDS display is adopted is first digitally XYZ scanned to produce an exacting computer representation of that vehicle's rear surfaces including its hatch, deck, trunk lid, doors or similar parts, whether fixed or moving, body structure or hang-on. The contact surface of the HDS display interface module is then molded, stamped or otherwise formed to perfectly contact portions of the scanned surfaces with clearance for any logos, jewelry or brightwork. No alteration in a host vehicle's original bodywork detailing may be required and the vehicle can be restored to its original condition if the HDS display is ever removed. The one exception is the vehicle body surface to which the original license plate is mounted.

License plate recesses are present in most vehicles. These recesses provide deviation from the smooth rear surface on which the HDS display will lie. One of the goals of the HDS display systems is to provide an unobtrusive design, including hiding of extra electronics and mounting mechanisms from plain view. The license plate recesses provide convenient sites for mounting mechanisms. Additionally, license plate recesses provide for electrical connections for general illuminations for the plates, which may be redirected and connected with an HDS display system's sensors and HVAC electronics. In some embodiments, essential driving electronics may be housed in the license plate recess and the electrical connections to the electronics may be completed within or through the license plate recess.

Figure 23:
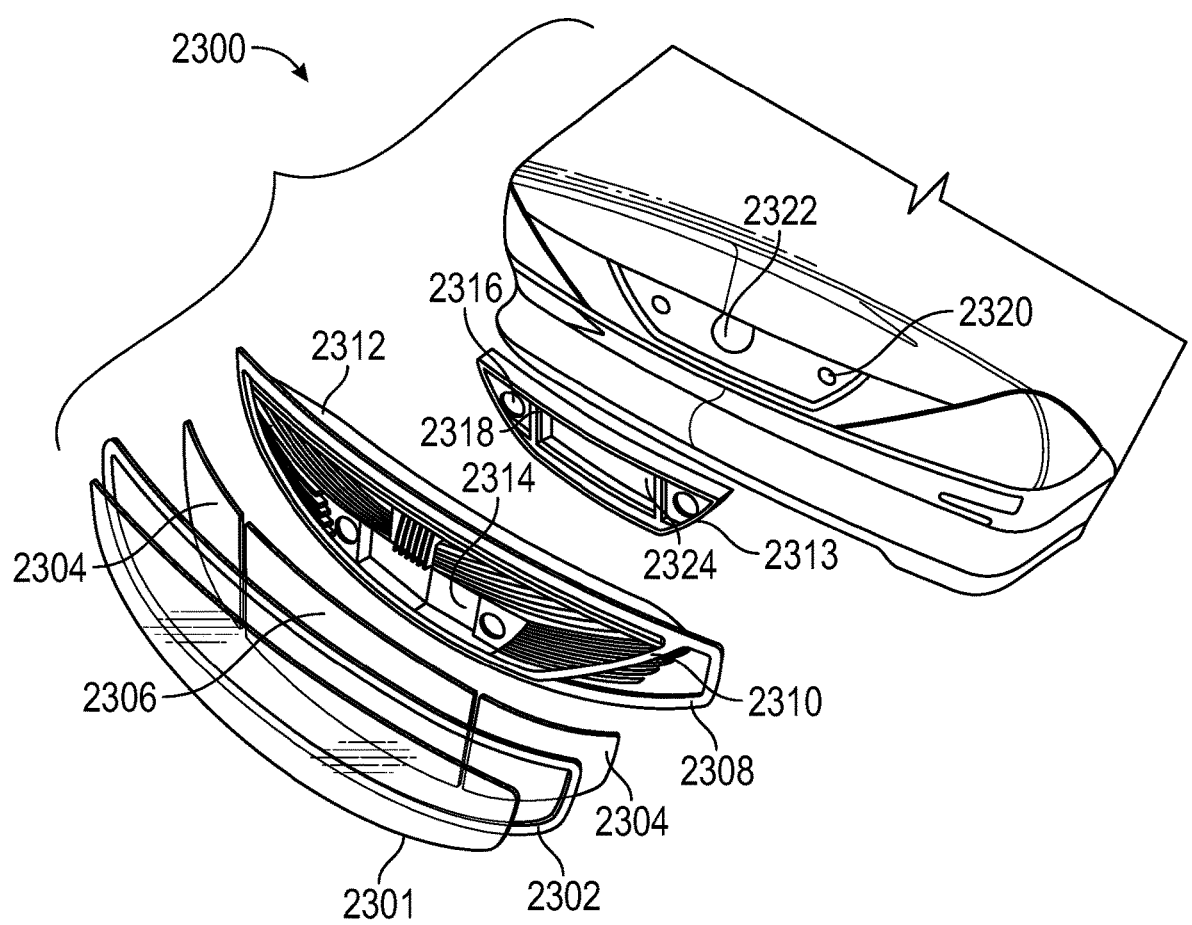
FIG. 23 illustrates an example exploded view of another embodiment of the HDS display system.

FIG. 23 shows an exploded view of a similar HDS display system to the sections shown in FIG. 21A-B. This unit incorporates a bezel 2302 supporting here a 3-piece OLED array comprising a cover plate made of glass or plastic 2301, a pair of mirror image shaped outboard sections 2304, and a central section 2306. The primary HDS display structure 2308 includes perimeter mount channel 2310 and shows the open ribs for directing air flow across the OLED substrates for heating and/or cooling. The upper lip 2312 of unit 2308 is shaped to conform to and look like the original vehicle's spoiler. A window 2314 shows the opening for license plate viewing through the locking unit 2312. Mating unit 2313 incorporates molded-in openings 2316 for air movement fans (not shown) and slots 2318 to receive locking tabs which are part of the removable display housing. The locking unit 2312 bolts into a vehicle's license plate recess and uses that rear surface to penetrate holes for electrical connections on the vehicle 2320 and/or for a main connection securing ring 2322 in some models. Note that the 3-piece OLED arrays, the outboard sections 2304s and the center section 2306, anticipate use of clear flexible OLEDs in this design so that the original license plate can be viewed through matrix 2306, when it is not illuminated in that area, thus the display may change from a true view of an actual painted license plate, to a digital representation of that plate rendered on the surface of OLED/TFT diaphragm 2306.

The entire assembly is well-structured (likely from an engineering plastic such as polycarbonate which is well-suited for external applications in vehicles) and thus very lightweight since it uses the vehicle's original surface to close out much of the back of the HDS display unit, and its network of ribs for directing air flow to stiffen the HDS display case. The locking unit 2312 and corresponding mating unit 2313 (which may be referring to generally as "locking unit") fits and mounts to exact license plate recess of a vehicle. It may include lock and security release system for repairs or easy detachment. The locking unit may further includes an integral license plate mount 2324 providing for mounting and illuminating the original plate.

In some embodiments, the license plate is removed along with connecting brackets. Then, depending on the type of host vehicle and the HDS display design, one or multiple holes 2320 or fittings may be added to this large essentially flat surface. If use of the HDS display is ever terminated and the product is removed, these openings can be plugged with supplied grommets which can then be further concealed by replacement the license plate and frame. Attachment involves a coupling collar 2316 which is inserted and clamped to this surface in one or more places, and this collar mates with companion fittings on the backside of the HDS display. This collar 2316 attaches to a similar mating ring on the HDS display case and when tightened, draws the display snugly into the perfectly fitting license plate recess for a permanent mounting. An adhesive similar to that used to retain windshields in vehicles can optionally be used around the perimeter in selected locations to further anchor the display into the recess and similar strategically located adhesive strips or pads can be designed into the outboard perimeter of the HDS display case back to assure a solid bond for the HDS display across the width of the body part to which the HDS display is secured.

Figure 24:
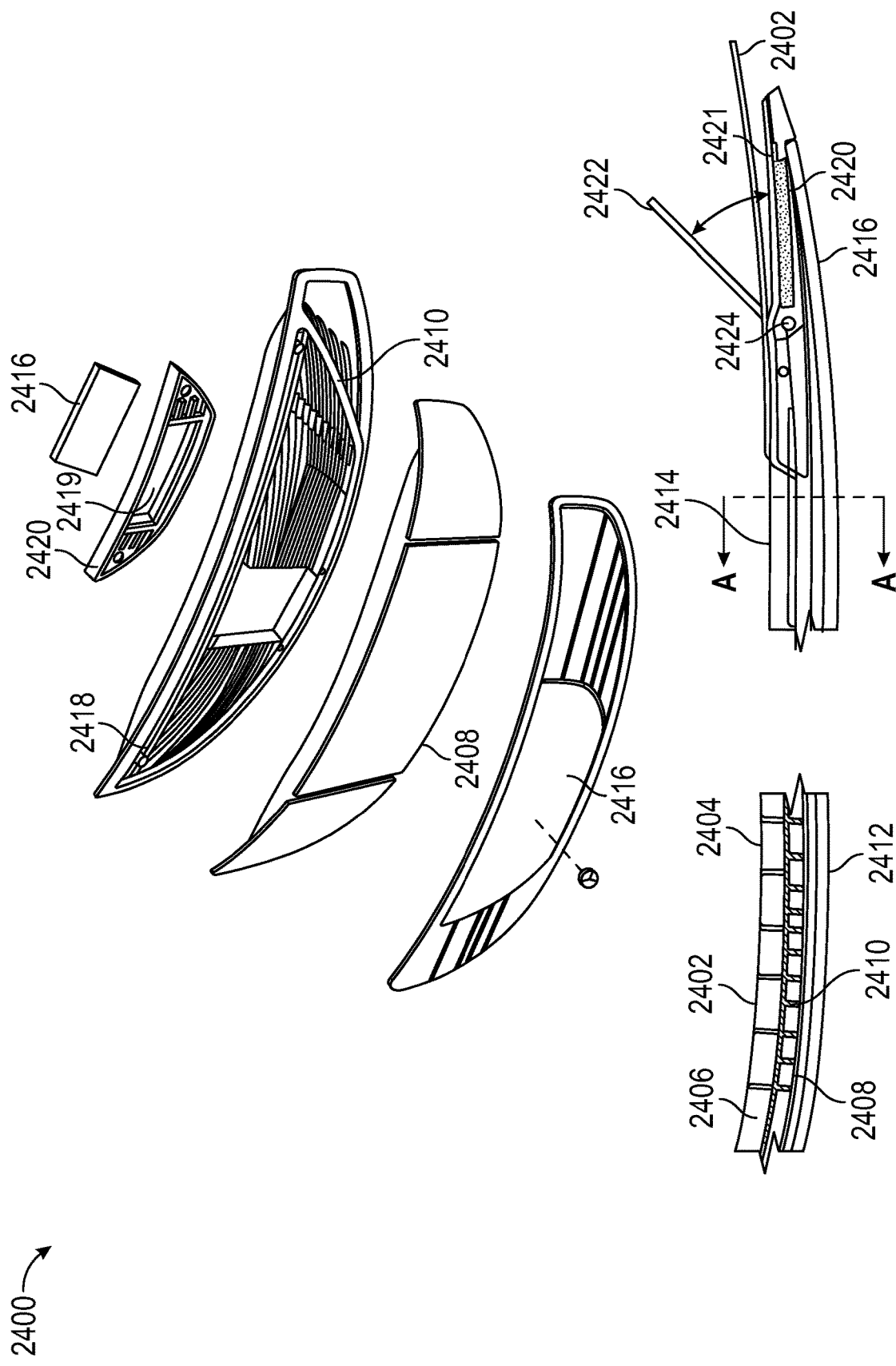
FIG. 24 illustrates another example exploded view of an HDS display system.

FIG. 24 illustrates an exploded view very similar to the design in FIG. 23, but reveals more detail in two sections: one a horizontal section through the right hand outboard HDS display extension and a vertical Section A-A, showing a variation of internal ribs molded into the HDS display structural backing. Here, the curvature (outer mold line) of the vehicle rear surface 2402 is shown with one edge of the longitudinal rib 2404 making point contact with that vehicle surface 2402 throughout the surface. These contacts leave air space 2406 between the surface of the vehicle and the core structure of the HDS display, governed by the rib depth. OLED/TFT flexible layer 2408 is shaped and held by edge point contacts 2410, against the display side of the core structure, while 2412 is the glass or plastic cover plus any polarizers, filters, et cetera. FIG. 24 also shows how core structure 2414 can place internal ribs so they serve a decorative function by being arrayed in attractive patterns which can pick up light and create shadow patterns which can play a decorative role when an HDS display system is Off so that a subtle texture can be seen through the clear OLED beyond. A black velvet (3M™) coated ultra-black finish may be utilized such that only the rib edges pick up light creating a very fine line pattern over an area, allowing an observer to see this pattern and the original license plate 2416 in its new recess. The recess may be illuminated around its perimeter by LED lighting 2419 within component 2420.

The stored onboard imagery renders the rear end of the original vehicle onto OLED displays 2408, and as this grows in intensity it overpowers the rib texture of the structural background. As the image fades to full intensity the original vehicle surface may transition into other colors, shapes or surfaces to suit the owner's preferences. With the use of integrated targeting and security cameras and special algorithms, the rendered image of this vehicle rear end and may reflect colors and distinct shapes from its real-time surroundings, making it appear genuinely real. Movements or animations may be displayed. Further, the real plate can be seen in its recess in combination with digital surfaces around it or can morph into a larger more easily read image which may grow, expand or lock into place on the vehicle's surface (possibly in response to a blanket signal from law enforcement or for other reasons) on-demand. The plate may shift in size and emphasis to convey other types of messages, for example a handicapped placard, or a special parking permit, or unique permit. Indeed the HDS display can post nearly anything.

The display's outboard sections in certain designs can remain clear so that an original vehicle's tail lights can be viewed through it—it can then replicate that view shifting it, duplicating it, moving portions of it in simulated 3D depths and then growing laterally inward to produce unique effects, enhanced lighting patterns or a means to gather attention, send a message, emphasize a function or merely to create a desired impact or effect. The downloadable design industry for OEM manufacturers, aftermarket providers and App developers will provide various forms of personalization. Section A-A shows a horizontal section through the outer tip of a typical HDS display product having a soft bumper-style trim edge. The display surface 2416 references its outer surface including any polarizers, et cetera. The core backing and rib panel 2418 may be provided when cooling, heating or structures is used, but some versions having direct attachment to a vehicle surface may not have the panel 2418. One of numerous ways slots or openings 2421 may admit air through the HDS display edge. In some embodiments, formed or molded-in access door 2422 may rotate around hinge 2424 to provide access to replace snap-in air filter cartridges 2420. The flexible OLED HDS display products produce a visually refined, ultra lightweight, robust, solid state automotive component, yet may be effortlessly maintained with the balance of the vehicle, easily replaced, removed, remoted, or repaired. These displays can perform the entire job of multiple mandated lighting systems, licensing and registration systems.

Figure 25:
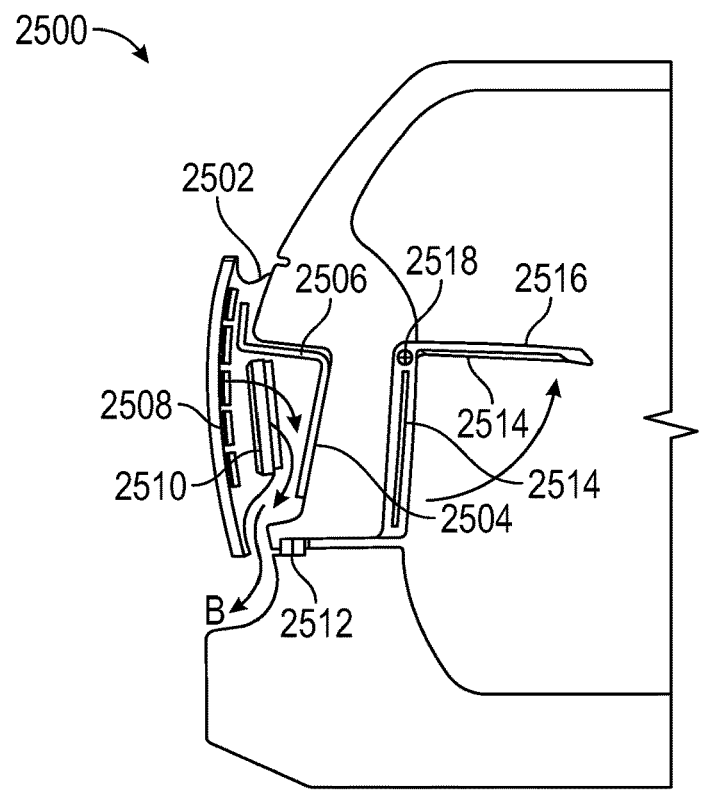
FIG. 25 illustrates one embodiment of a mounting concept.

FIG. 25 illustrates an HDS display housing concept. The embodiment shows a housing concept having a fully enclosed back surface 2502, formed using scanned surface data from the vehicle to precisely fit that vehicle's license plate recess 2504. The unit further has an internal metal stiffener 2506. It takes cooling air into the unit via holes 2508 in the edge, with that air pulled across the OLED heat-generating TFT elements by electrical fan element 2510 where it further uses the license plate recess to duct air downward and exhausts it thru slots in the unit's base at B, above the bumper, then exhausts it at the base of the plate recess, at B, external to hatch weather-seal strip 2512. Note this fully-enclosed HDS display design is self-contained and completely occupies the former license plate recess location although it need not occupy the entire volume. In some embodiments, a design may only occupy partial volumes as required by the design and supporting systems such as HVAC, electrical, attachment or security.

A license plate 2514 has been removed and inserted into a special holder 2516 which when closed is designed to match the vehicle's interior panel, but which hinges open at 2518 to allow this original plate to be displayed (for example, to a law enforcement officer in the event the digital facsimile displayed on the HDS display is in question) which is easily done with a swing down movement of the holder when the vehicle's hatch is in the raised position. Until plate regulations or carry requirements are evolved to new digital standards for the State, such a carry receptacle can be easily supplied with the HDS display product. Upon installation, the HDS display unit is sealed from the weather fully around its mating perimeter and the transverse groove at the top of the back surface 2502 allows for rain runoff, rear window washer/wiper seating and/or can be designed to accommodate a relocated mechanical hatch latch mechanisms.

Figure 26:
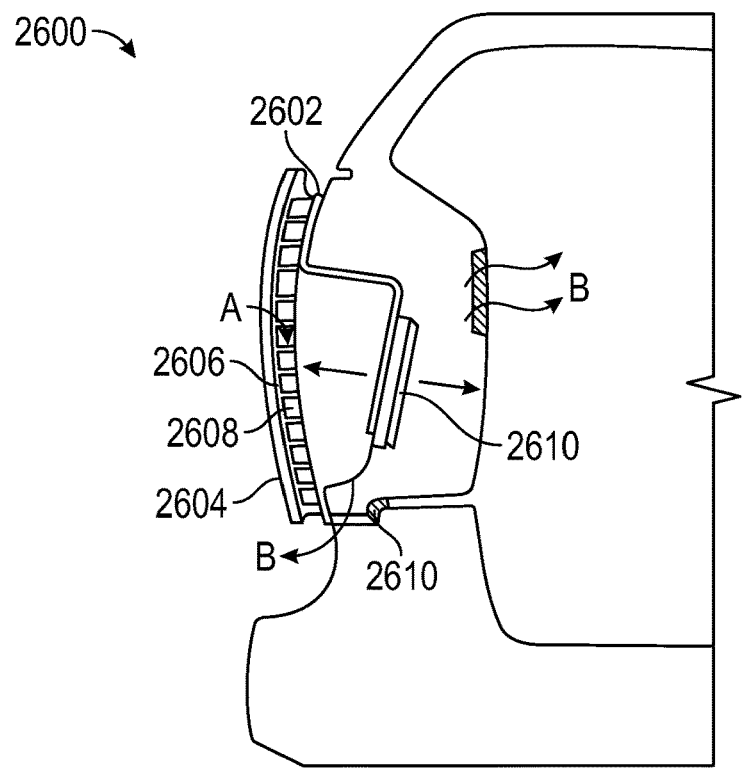
FIG. 26 illustrates one embodiment of another mounting concept.

FIG. 26 illustrates another HDS display housing concept. The embodiment shows a self-contained display mount unit with a housing 2602 and a cover 2604. A molded plastic substrate support comprised of a tight series of horizontal plastic ribs 2606 makes contact with the vehicle's surface. The series of ribs 2606 makes a snug contact with the vehicle's scanned surface and does so by controlling the length (or depth) of the ribs to create air-flow passageways 2608 to draw warming or cooling air across the display substrate, as well as creating a reinforcing stiffening structure to resist bending for the overall display. Note the length of the horizontal ribs (e.g., the depth of the passageways 2608) may be kept to a minimum to allow the display surface to be positioned as closely as possible to the original vehicle's surface. Such ribs can be as small as 0.10" or up to several inches depending on the distances to be filled between the display and the vehicle's surface. This concept utilizes a form of ribbed or egg crate-like thin wall internal structuring that provides dramatic stiffening while using the vehicle's original surface to complete the structure and to close-out the air-flow passageways without adding excessive weight. An attachment ring 2610 may incorporate an internal fan and electric heating/cooling elements to move warmed air across the display from the vehicle's interior or recycled air from the license plate recess. As with the design in FIG. 25, air can enter from the outside edges as shown in A and be exhausted at B, or vice versa. In one case external air remains in an enclosed system and is exhausted again at area B at bottom center however it passes through a closed passage within the double wall hatch panel and is exhausted external to weather seal 2611. It is not recommended that external air be allowed to enter the vehicle through the HDS display system, however it is reasonable to expect that air may be extracted from an otherwise enclosed vehicle trunk where warmed air might help in very cold temperatures.

Figure 27A:
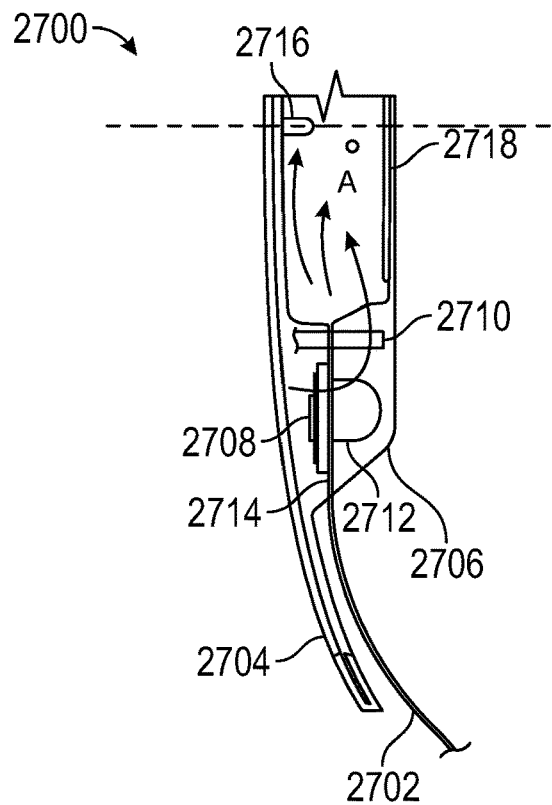
FIG. 27A-B illustrates another example mounting concept.
Figure 27B:
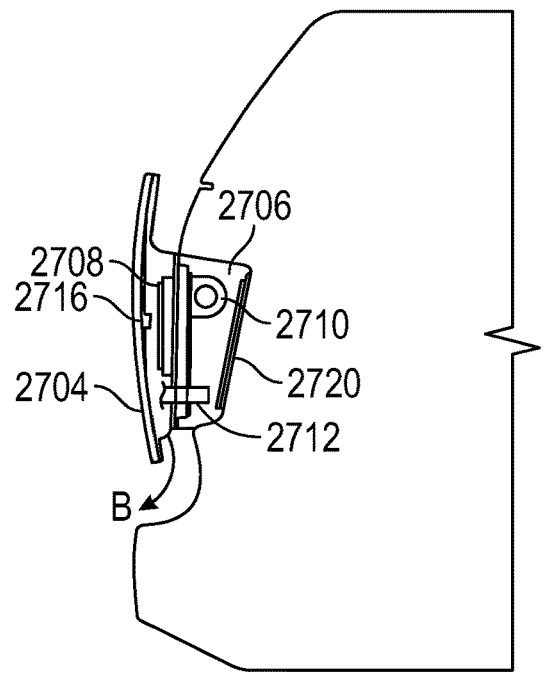

FIG. 27A-B illustrates another HDS display housing concept. The figure shows a horizontal section through the vehicle from the centerline outward towards the vehicle corner curvature at 2702. This design is of a two-piece structure, the display 2704 and a locking interface 2706 in which scan data is used to produce an attachment component which is bolted into the vehicle's license plate recess after the license plate is removed. Once interface 2706 is installed, the license plate itself can be reinstalled in the space provided in the interface. Interface 2706 contains illumination for the license plate, left and right fans 2708 (only right side fan shown), slots to receive horizontal and vertical locking tabs 2710 and 2712 which are part of the removable display housing which separates at location 2714. Fans 2708 pull cooling air over the backside surface of the display substrate using the rib network for air distribution and pull this air into volume A for exhausting out the bottom B shown in FIG. 27B (or optionally the top or sides depending on the design, vehicle and aerodynamic factors).

The license plate 2720 (in FIG. 27B) is visible through the clear OLED display and illumination is controlled via license plate illumination in component 2706 and any plate content presented on display 2704. Such a facsimile/digital plate can be accomplished through stored imagery of the plate, or if necessary via a live image from camera 2716 of plate 2720. The camera 2716 may have wide angle and corrective optics, with which it may capture real-time plate image and present the image in any desired size, and on-demand as part of the displayed content.

Figure 28A:
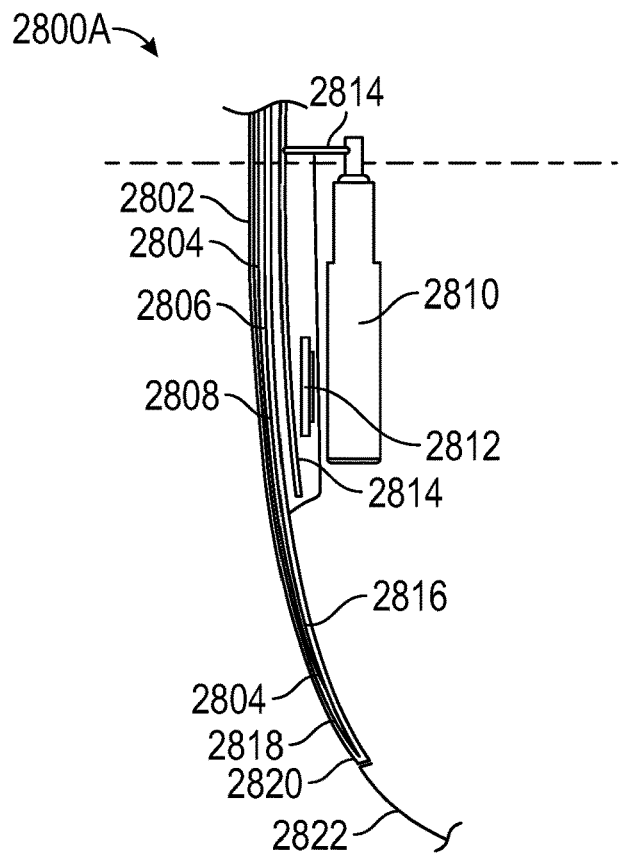
FIG. 28A-B illustrates another example mounting concept.
Figure 28B:
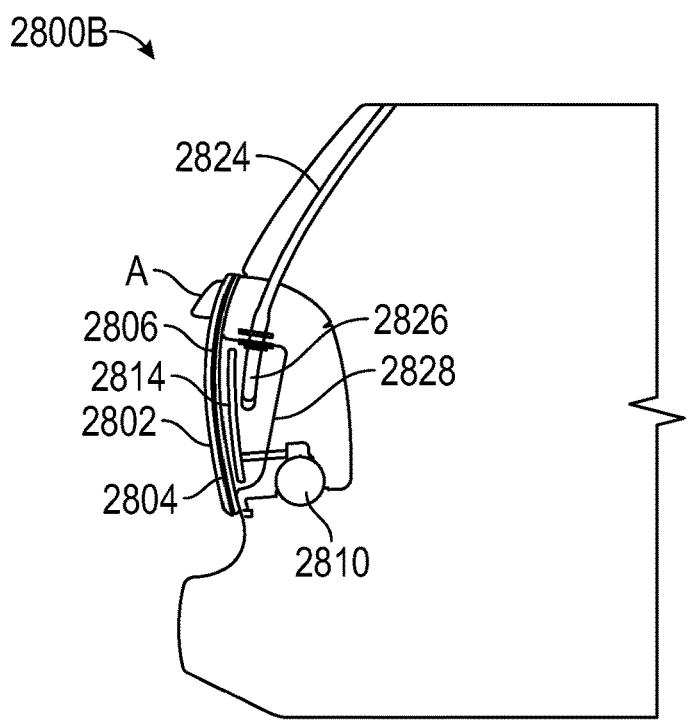

FIG. 28A-B shows a horizontal section through the vehicle from the centerline outward towards the vehicle corner curvature. This design consists of a sealed glass or plastic, flush-mounted (between an edge seal 2820 and the vehicle outer mold line 2822), encapsulated flexible, clear OLED/TFT matrix 2804 suspended in an inert liquid 2806, sealed between a formed outer cover 2802 and a thermally-conductive substrate material 2808 (likely a black formed plastic/composite). The OLED is sealed and bonded under vacuum 2818. An optional vortex compressed air cooler 2810 with a cooling distribution manifold 2814 typical of instrument panel cooling systems is shown. Such a system can also use the vehicle's inherent HVAC air-conditioning system should additional or alternative cooling be necessary. Internal fan 2812 can also be used to distribute air over the display surface/substrate area. Note that in a flush or near-flush mounting of the HDS display (see tailgate example FIG. 30, F), air can be drawn into the unit in much the same fashion, but through openings in the HDS display's edge, typically from outside the rear hatch weather-seal.

FIG. 28B shows a vertical centerline section of FIG. 28A with HVAC inputs from the vehicle air-conditioning system through the vehicle's hatch perimeter (or "D" posts). Again this system reflects an optimized formed OLED TFT matrix sealed between cover 2802 and substrate 2816, and suspended in liquid 2806, to match the compound curved surfaces of a target vehicle to achieve multiple objectives: (a) eliminate secondary reflections/refraction by allowing the ultra-thin liquid volume to eliminate the air gap between which would otherwise exist thereby creating a pair of additional reflective surfaces; (b) allow the OLED TFT flexible matrix to float suspended in such a way as to accommodate differing co-efficient of expansion in very hot or cold environments; (c) create novel cooling means wherein liquid can be moved via air-pressure changes to move cooling liquids across the heat-producing elements of the OLED display matrix; (d) to protect the OLED from freezing temperatures which might otherwise damage the TFT matrix, and (e) create the outward appearance of a fully compound curvatureed TFT matrix but where the flexible layer is not actually compound curved—more a flat wrap on one direction—in order to avoid breaking transistors in a forming process. A heat/cool lead in 2824 from the vehicle's HVAC system may be connected with an air distribution interface 2826 in plate recess volume 2828. "A" in FIG. 28B represents a vehicle's original trim which is excessively large. In such cases it is appropriate to remove such a piece to allow the HDS display product to be mounted as closely as possible to the base vehicle surface.

Casework, Using Base Vehicle Surface for Key Support

Another possible feature is use of systems and structures inherent to the vehicle (or other moving object) itself to keep weight down and component strength and stiffness up. This approach avoids unnecessary duplication of parts, holds costs down and keeps performance high. The backside of the rear-mounted HDS display is first modeled and tooled for production using the digitized XYZ scans from the original vehicle. It is molded in a unique way from such materials as polycarbonate, for example, which offers the appropriate lifestyle, weather resistance and structural characteristics necessary for use as an external automotive component. All structures are referenced to the digitized body scans. These are used to develop body surface contact points which exactly correspond the original target vehicle body in critical places but not in others. Some of these body contact points may be in the form of strips a few centimeters wide which run completely around the perimeter of any vehicle body panel the HDS display product may be mounted on. Some of these may contain recesses for "O" ring seals, weather-stripping, adhesive strips or sealants which are intended to make 100% contact to totally seal the backside of the HDS display housing and all interior components against weather as it ensures precise positioning, stability and adherence of the HDS display product to the moving object.

License plate recesses, where the vehicle has one, provides an excellent five (5) sided, elongated box of recess where an HDS display unit may derive structural support from. Also, a wide area perimeter strip placed as far outboard as possible (for example near the edge of a vehicle hatch just inboard of the hatch cut line) produces excellent outer edge support for the overall display should any loads be applied there. Additionally, because the internal ribs provide stiffness, it is possible in most cases to secure the display in place with one central coupling point (or one on either side of the license plate recess) obviating the need to use mechanical fasteners around the outside perimeter. Often, the kind of adhesive used to retain windshields and backlites are enough. For various embodiments getting support from the base vehicle surface and license plate recess, see discussion of FIG. 25-28 in Mounting with Licensed Plate Recess section above).

Housing Essential Electronics in License Plate Recess

Most of the HDS display electronics (with the likely exception of the onboard DVR and security system wireless backup which will be contained in a vehicle's trunk or passenger compartment) may be housed within the volume of the license plate recess to allow the thin display itself to be mounted as closely as possible to the rear surfaces of the vehicle itself. A most natural place to electronically connect to power for the display and its related functions is provided in the license plate recess itself, as it already exists for license plate illumination, backup lamps, tail lights and turn signals. Some embodiments may use, in addition to the license plate recess, adjacent body cavities for manufacture, installation, and use of fully-built-in or externally-integrated mobile, automotive video displays for housing connectors and electrical cabling (For various embodiments housing electronics in license plate recess, see discussion of FIG. 25-28 in Uses Host Vehicle License Plate Recess as Mechanical and Electrical Connection Medium section above).

Front-Side HDS Display

In some embodiments, a "companion" product or technology provides a digital extension of a revenue-producing rear (plate) in the form of a front display. For example, in some embodiments design and use of similar manufacturing processes as discussed herein with reference to a rear display may be used in a license plate-sized OLED/AMOLED video display matrix on the front (or side) of the vehicles. Such front HDS displays may also include electrical/electronic connections permitting the attachment into a designated front plate recess location which conforms to the functional and regulatory requirements of all applicable Federal and DMV entities allowing, in some instances, replacement of the original front license plate with a front HDS display. The front HDS display units may feature the ability to adhesively mount such a "plate" to a compound curvatureed surface at or near the nose or bumper of new motor vehicles. In some embodiments, a direct wired or wireless communications with the rear HDS display license plate system may be established, allowing for synchronized displays. In some embodiments, the front HDS display may be a standalone, separate from rear license plate. The front HDS display may separately have the ability to communicate with Federal and DMV entities. In some embodiments, the displays may be a stick-on, mountable, and/or built-in. Such a front display may include any combination of features or components (e.g., access of electronics through a port configured for mounting of a physical license plate, etc.) that are discussed herein.

Heating and Cooling

Previously disclosed use of license plate cavities offers great advantages for housing heating/cooling electronics and a means to interface with vehicle HVAC devices. The generally existing electrical connections for plate illuminations may be redirected and connected with an HDS display system's sensors and HVAC electronics to enable display cooling in hot weather, or for distributing warm air across the display substrate surface in cold extremes.

Integral Cooling

A cooling fan (FIG. 26, 2610) can be placed optionally within the HDS display housing, within a special fixture to which the HDS display unit is attached or removed, or attached as an integral part of a special HDS display mounting collar created for the purpose of attaching the HDS display product to a vehicle's license plate recess. Cold ram air is then captured at openings around the perimeter of the HDS display housing (see FIG. 26, air passageways and 2608 airflow "A") and is then channeled by the standoff ribbing where it can be guided, ducted using turning vanes molded-into the case itself (or as a separate part) which is then closed-out by the moving object's own surface, where it is directed as cold or heated air across the display's substrate or associated thermal dissipating sheets or devices, then against, through or around the components which need it. At times where there is little ram air or when temperatures are unusually hot or cold the fan can be activated by traditional thermostat means. For example, on a hot day it can pull cold ram air from the display's perimeter intakes, across the heat-generating surfaces of the display where it is then exhausted through the bottom (or sides) of the display or the license plate recess to the outside air. In some cases, heated or cooled air can be exhausted into closed (double walled) body panels and then exhausted, but precautions may be taken to avoid contaminants from the vehicle itself or the outside environment from being drawn through the externally-mounted HDS display unit and into the vehicle itself. In some embodiments, the fans may have adjustable speed setting based on the speed in which the vehicle is moving or may utilize natural cooling resulting from the air flow from driving. As seen in the FIG. 22A-B, HDS display provides for the user or dealer servicing or change-out of air filters or filter cartridges to prevent dust or moisture ingestion.

Integral Heating

Conversely, in cold or freezing climates, HDS display provides means for the integral warming and directional flow of air over critical display surfaces to extend life and enable performance for OLED outdoor displays. Such warming can come from at least three common sources for automotive systems: (1) heat/air distribution generated by the vehicle's own HVAC system; (2) heat generated by resistive means as is common with electric rear window defrosters, or; (3) separate warming elements as found embedded in heated seats, steering wheels and various independent systems combining heating elements and blower systems. By far the cleanest and most effective freeze protection for advanced OLED/TFT displays will be adoption of the same systems used defrost automotive backlite glazing. Here, fine patterns of printed metallic deposition on an inner, outer or laminated surface of glass produces an electrical current which can be applied to generate sufficient heat to defrost such a display or keep certain components from freezing. In still further embodiments single or double disk-shaped mounting and centering collars may be used to position the HDS display. An electric fan within the mounting collar can extract warm air from inside the trunk or vehicle interior and again, using the molded-in ribs, blow air through unique internal passages over heating elements or a heated matrix incorporated into the case or on the surface of the display component in a manner similar to the rear window defrosters of vehicles. The electrical components driving the fan, thermostats, switches, HDS display defrosters, linked security systems, as well as power for the display, its drivers, database, security and targeting cameras, DVRs, processors, sensors, antennae and from other components inside the moving object or within the HDS display housing are, or may be connected via an electrical quick-release connector at or near the attachment collar. Access to the release portion of the attachment collar is from the interior of the normally locked trunk or hatch.

One example in a preferred embodiment which involves air-flow for warming or cooling an OLED display is where a portion of the casework of said display is contributed by the host vehicle's body surface itself. Internally structured horizontal ribs provide a stand-off of the display matrix from the vehicle's surface, but also adds structure and stiffness to the display case and directs warming or cooling air over the TFT matrix and substrate as shown FIGS. 26 and 27. In this application the host vehicle's body through perfect contact with the display provides the closeout for the display back panel, completing the air-channel conduits thus avoiding the manufacture of additional case materials, together with higher cost and weight—while at the same time the metal surface of the vehicle body functions as a heat sink. In a further example, cooled or heated air from the host vehicle's HVAC system can be further induced into the flow allow display operation in high or low temperature extreme environments.

Air flow through the perimeter strip and through the closed channels formed through contact with either a vehicle mount surface, or a separate backing panel as part of the HDS display product, is generally controlled by the molded-in rib patterns designed for channeling air (e.g., as discussed with reference to FIG. 33). In some embodiments these air channels are created and closed by the display's outer/rear housing. In other embodiments these channels are closed by the surface of the target vehicle itself that during cooling functions can also act as a heat sink. The rib structure together with not molding a full outer back closeout panel in one of the embodiments (e.g. letting the vehicle body close off the air channels) saves significant weight and materials for the HDS display product. Depending on the vehicle type, display size, and other factors, cooling air can be moved from outside the vehicle, safely through air filters within the case, then between the air-flow channels, across cooling fins and surfaces and vehicle body heat sink areas—then across the display backing and substrate to pull heat away from these inherently heat-generating OLED surfaces. This air can be pulled via quiet fans housed within the license plate recess area, FIG. 2, 206. electronics package (to the extent they require cooling at points in time) and may then be ejected in a variety of ways: out the bottom of the license plate recess (now an electronics recess formerly or additionally occupied by the vehicle's shifted-location license plate) or if necessary out the top or sides of the HDS display. In some cases, air can be exhausted into such compartments as tailgates or double-wall (inner & outer metal or plastic door or hatch panels, through vehicle body structures where air can be ejected through the sides of the hang-on part outboard of the hatch weather-strip. However, efforts may be made to avoid pulling undesirable fumes, exhaust gasses or contaminants into a vehicle's passenger compartment. Single or multiple air fans can be placed within and behind the HDS display substrate, within the former license plate housing, or on some vehicles be attached to the vehicle itself at the license mounting surface optionally exhausting that air as appropriate inside or outside a body structure. When these fans are reversible (or when they incorporate heating elements) the airflow temperature can be altered and moved through the display housing in a variety of ways. Flows can also be directed or changed by internal ducting, gates, turning vanes or simple baffles, thus the channels and the inherent structural ribs can distribute warmed air in very cold climates, or cooling air for warm environments.

The ribbed standoff panel may be represented by a unique network of molded-in ribs which provide multiple functions to: (1) provide a strong but lightweight means to standoff the HDS display product a precise distance from the moving object's surface; (2) to provide no-contact points between the HDS display case and certain hardware or features on the moving object's surface; (3) to produce a network of rib stiffeners to convey structural loads from one part of the HDS display housing to another, imparting those loads to the moving object's structure and to produce a stiff, yet very light display panel housing, and; (4) to provide a unique set of internal passages for the flow of air to heat or cool the externally-mounted video display or any internally housed electronics in accordance with environmental performance criteria. Such ribs can be designed to provide both air passages for the cooling or heating of internal surfaces, for channeling water around or through the HDS display housing and/or mounting surface.

Digital Windows

In some embodiments, an HDS display may optionally use "digital windows" see-thru technology to enhance any stored or generated images in real time by enabling one or a multiplicity of video cameras on the vehicle to capture certain portions of the vehicle including its environment immediately beyond and then blend these with stored computer graphics, special effects or animation to Apps and algorithms. All may be timed, controlled, tempered or governed by the changing surrounding environment thanks to programs which can capture, store, and replicate vehicle digital surfaces together with their reflections in real time from the immediate environment: sunshine flashing between the leaves of trees above, yellow lane markers flashing past on the roadway below. Onboard cameras, in other words, capture these real-world surrounding images so algorithms can bend them or map them across metallic or painted body surfaces which themselves may be digital and simultaneously changing to create a visual reality one might need to touch to confirm whether or not it is really bending sheet metal, or digital effects.

In certain embodiments the outboard left and right portions of an HDS display may use a clear OLED/TFT film (formed or flexible) and be contained or suspended within an equally clear see-thru housing—and this housing may in fact wrap partially around the outboard corners of a motor vehicle and be superimposed on or over that vehicle's pre-existing tail light, turn signal, or side marker array. Cameras with very wide-angle optics may be positioned within an HDS display housing to further capture a real-time image of the actual vehicle's surface beneath the HDS display mounted housing—including all or portions of the above described tail light/turn signal/and side marker array, plus any real-time day or nighttime illuminations or reflections thereon. Optical sensors or direct wired connections can send electrical signals to an onboard processor whenever the original vehicle's lighting array is activated. What this permits is a dramatic dynamic display in which a vehicle's corner lighting array may be seen via direct sightline by an observer, may also and at the same time be seen as a literal video view on a clear TFT display superimposed over said view of said lighting array then blended with a digital representation of said lighting array generated in real time by an algorithm and database for constructing said view. In this way conventional plastic/LED taillight hardware can be operated as viewed normally by direct sightline as well as simultaneously through the HDS display transparent display but which can morph from there into extended shapes and brilliance which can continue to animate or grow across, or anywhere conceivably on a vehicle's surface to the extent it is digital—and such a system will be able to do this at the same time the surfaces of the target vehicles themselves can change or grow. HDS display allows unlimited animations in which physical hardware, body panels and illumination common in today's motor vehicles can dramatically morph, expand or blend with other digital shapes, images, graphics and media (including personal messaging, signage or advertising) to deliver remarkably compelling, never-before-seen visual effects, impressions and combinations of mobile digital art. By editing available effects selected from menus, by enabling features and upgrades downloaded from automakers, or by purchasing aesthetic designs from Apps, or aftermarket suppliers, marketers or other mounted vehicle owners, agencies or services, consumers and their families, for the first time will be able to create, customize and evolve their own vehicles, unique designs and personal expressions.

In some embodiments, HDS display is able to link with a vehicle's nose-mounted, forward-looking video cameras so that following motorists can activate such a digital window as an aid in passing by allowing them to virtually see-thorough, from the rear to the front of the vehicle and beyond for a clear, real-time/no latency exclusive view of the road ahead as seen from the front of the vehicle they wish to pass. Typically this system will be activated manually by a driver wishing to pass by activating his turn signal. This signal may be read optically by an aft-looking camera or sensor on the HDS display device which in turn and perhaps optionally: (a) advises the driver of the vehicle being passed of the impending action with a visible or audible alert (in case he is not otherwise aware through traditional means); (b) engage the forward-looking camera and pass that image to the aft-facing HDS display, and; (c) activate a perimeter warning or special passing flasher so that the see-thru view does not produce a visual hazard to drivers approaching from the rear through excessive "invisibility" or by inadvertently rendering oncoming headlamps at night to be confused by vehicles oncoming head-on in the same lane, and; (d) properly turn off digital windows, see-thru technology and perimeter flashers as the passing driver completes his action.

For certain designs this allows an observer to view the shapes, surfaces and details of the moving object through or beyond the actual display surface. By combining this visual transparency with CGI digital imagery (previously stored or processed in real time) and by then inserting live imagery generated with on-board cameras, astounding visual effects can be created in which the surfaces of a motor vehicle can appear to morph, change or vanish in remarkable and unlimited ways beyond or within the display's frame. Such displays can be mounted to appear as though they are floating just off the vehicle's surface creating a clear, sculpted, glass blade-like presence.

Sensors

In some embodiments, on board cameras, proximity sensors and motion sensors can be used to determine the position, with changes in that position of viewing vehicles or nearby pedestrians and use that data to cause the images on multiple TFT layers to move relative to one another to enhance the illusion of depth or to induce apparent perspective where there is really none or very little. In this way external sensors may, for example, determine the rate at which a viewing vehicle or a nearby pedestrian was approaching. Those signals may be used to alter the displayed image on the vehicle's rear end mounted to create the impression of a visual change due to great depth—and to accomplish this even from a single layer OLED/TFT. In this way design-rich very deep, layered tail lights may be maintained, however they may no longer need to be made of multiple LEDs, molded plastic sections or even tiny layered OLED chips arrayed deeply in true, space-consuming depths of a tail lamp assembly (which are normal, but quite expensive in today's vehicles). Instead, such effects and images can be reproduced by using even a single, flexible, transparent OLED/TFT display.

Security considerations are built-in throughout the HDS display product. The rear-looking targeting, vehicle recognition, backup, environmental detection and forward-looking see-thru cameras are built into the HDS display product. Any or each of these can find dual-use as security cameras in the event a vehicle mounting an HDS display is unoccupied or locked and attempts are made to touch, disable, disconnect, hack, remove, abuse or tamper with the device or its cameras. The HDS display has the ability to record the last ten minutes of sensory operations with camera imagery and transmit that content a remote location or device on behalf of the owner. It also has the capacity to communicate with other mounted vehicles, law enforcement, to report its periodic location by networking with other HDS display devices if it is ever improperly removed, disabled, lost, damaged or stolen. Each device is associated with a specific vehicle VIN Number, registered owner and Driver's License. A users smartphone is optionally to an HDS display unit to provide activation, programming, remote controls, removal, passwords, upgrades and physical removal from a vehicle. Each HDS display product has a built-in emergency battery to protect the device, gather visual data and report its changing location (to the owner or to law enforcement) in the event it loses power or it is detached from its base vehicle in an unauthorized manner.

Real-Time Effects

An HDS display is capable of reproducing virtually any digital imagery, including the surfaces of the original vehicle beneath and beyond it. As described before, the digitized XYZ scan data may also be used to render digital versions of the original surfaces of the vehicle in factory colors, finishes and trims. The rendered version is then uploaded to that vehicle's onboard database where it may later be projected on HDS display mimicking the original surface.

Algorithms can filter existing light, by darkening or altering ambient colors and brilliance and can also distort the simulated body image, adding light and shadow in critical areas to simulate the base vehicle as though it is being viewed beneath a sculpted glass lens, or under a finely tailored dark crystal sheet. It can add and float automotive jewelry (chrome logos, etc.) on the outermost layers of TFT or on the glass/plastic cover itself to simulate an icon in suspension; or it can secure such branding to a glass exterior surface, complete with appropriate reflections, internal refraction and random highlights—in other words HDS display can reproduce an elegant, finely tuned appearance like that of tuned crystal or glassware or it can be made to nearly or totally disappear. It does this essentially by matching the digitized original body scans under a variety of current ambient light to motion conditions by using the onboard camera imagery, the system's lighting and white balance, and sensors to render the changing reflected environment, tempered by the original vehicle's surface appearance in real time as it moves.

In some embodiments, the on-board cameras, proximity sensors and motion sensors can be used to determine the position from changes in that position of viewing vehicles or nearby pedestrians and use that data to cause the images on multiple TFT layers to move relative to one another to enhance the illusion of depth or to induce apparent perspective where there is really none or very little. In this way external sensors may, for example, determine the rate at which a viewing vehicle or a nearby pedestrian was approaching. Those signals may be used to alter the displayed image on the vehicle's rear end mounted to create the impression of a visual change due to great depth—and to accomplish this even from a single layer OLED/TFT. The display may be faking 3D-like views. The HDS display may look to have truly disappeared from the pedestrian's view.

The accurate replication of the original surface is important for multiple reasons. First, often the original design is the most aesthetically pleasing design. When an installation of HDS display ends up changing the look of the vehicle too much, even when a display is mostly transparent, it may be easily noticeable. Second, because an HDS display may need to balance brightness, contrast, and cope with natural elements, it may be coated or tinted. While an internal OLED/TFT panel may be transparent, few filters may be opaque. An ability to publish an image of original surface (enhanced by movement tracking) gets the look closer to the original surface. Lastly, the original surface is the best canvas on which to publish content. The HDS display assembly is designed to complement the vehicle. Any type of images may be blended into the original surface without concerns for the empty space where some content is not published because the empty space is identical to the original surface.

Any photography, computer-generated visual effects, live imagery, or any blends of them may be published. These blended images can be displayed on transparent, flexible OLED/TFT displays which can be further layered to produce depth effects (even distortion effects with selective light, shade and color patterns derived from the vehicle's immediate surroundings) to generate quite literally an endless array of unique, real time animated images for stunning results.

User/owners of HDS displays can introduce a means for vehicle owners, manufacturers, dealers, users or fleet operators to add or enhance existing or standard designs by introducing a widely variable menu of 2D graphic design content which can appear be 3D in nature and apply to such components as lighting, branding, graphics, reflections and apparent physical surfaces which can be replicated and manipulated in real-time to simulate colors, texture, reflections, transparency, morphing or physical surface changes using onboard computers with algorithms combined with the real-time input from on-board cameras, optics and sensors to replicate and present a wide variety of environmental conditions or downloadable designs, themes or personalization options to suit nearly any need from hyper-targeted marketing, to the legal, licensing or operational requirements of vehicle manufacturers, governmental agencies or the spontaneous whims of vehicle owners.

Example Computing Systems

Any process descriptions, elements, or blocks in the flow diagrams described herein and/or depicted in the attached figures should be understood as potentially representing modules, segments, or portions of code which include one or more executable instructions (as described below) for implementing specific logical functions or steps in the process. Alternate implementations are included within the scope of the embodiments described herein in which elements or functions may be deleted, executed out of order from that shown or discussed, including substantially concurrently (for example, through multi-threaded processing, interrupt processing, or multiple processors or processor cores or on other parallel architectures) or in reverse order, depending on the functionality involved.

Any of the methods and processes described above may be partially or fully embodied in, and partially or fully automated via, logic instructions, software code instructions, and/or software code modules executed by one or more general purpose processors and/or application-specific processors (also referred to as "computer devices," "computing devices," "hardware computing devices," "hardware processors," and the like). For example, the methods described herein may be performed as software instructions are executed by, and/or in response to software instruction being executed by, one or more hardware processors (e.g., one or more processors of the computing system) that are included in a Smart Display, are in communication with a Smart Display, and/or any other suitable computing devices. For example, a display manufacturer may include a computer processor in an OEM or custom-manufactured display, which may allow software modules to execute any or all of the operations discussed herein with reference to the Smart Displays (or HDD displays, displays, HDD systems, and the like), such as by installing an application on a storage device of the display. In some embodiments, the Smart Display provider includes a separate computing environment (e.g., hardware processor, memory, graphics processor, etc.) that provides the features discussed herein and communicates to the display (e.g., an OEM or custom shaped or configured display surface) to provide graphical display information to be displayed. In some embodiments, multiple computer processors, memories, graphics processors, etc. may be used in a Smart Display.

The software instructions and/or other executable code may be read from a tangible computer-readable medium. A tangible computer-readable medium is a data storage device that can store data that is readable by a computer system and/or computing devices. Examples of computer-readable mediums include read-only memory (ROM), random-access memory (RAM), other volatile or non-volatile memory devices, DVD-ROMs, CD-ROMs, magnetic tape, flash drives, and/or optical data storage devices. Accordingly, a software module may reside in RAM memory, flash memory, ROM memory, EPROM memory, EEPROM memory, registers, hard disk, solid state drive, a removable disk, a CD-ROM, a DVD-ROM, and/or any other form of a tangible computer-readable storage medium.

Additionally, any of the methods and processes described above may be partially or fully embodied in, and partially or fully automated via, electronic hardware (for example, logic circuits, hardware processors, and/or the like). For example, the various illustrative logical blocks, methods, routines, and the like described in connection with the embodiments disclosed herein may be implemented as electronic hardware, computer software, or combinations of both. To illustrate this, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Additional Embodiments

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of implementing a custom electronic display on a target surface, the method comprising:
   providing a custom electronic display comprising a display mounting surface and an opposing display surface configured for selective activation;
   forming a standoff structure comprising a mount receiving surface and an opposing standoff mounting surface, wherein the mount receiving surface is configured to replicate the contour of the display mounting surface of the custom electronic display such that the mount receiving surface and the display mounting surface fittingly engage each other when physically pressed together, and wherein the standoff mounting surface is configured to replicate the contour of the target surface such that the standoff mounting surface and the target surface fittingly engage each other when physically pressed together;
   positioning the custom electronic display, standoff structure, and target surface such that the display mounting surface is pressed against the mount receiving surface, and such that the standoff mounting surface is pressed against the target surface; and
   mounting the custom electronic display to the target surface with the standoff structure as an intermediary layer between the custom electronic display and the target surface.

2. The method of claim 1, wherein the target surface is a surface of a vehicle, the method further comprising one or more of:
   aligning said custom electronic display using a license plate recess;
   accessing electrical power via the license plate recess;
   cooling said custom electronic display via the license plate recess;
   heating said custom electronic display via the license plate recess;
   stiffening said custom electronic display;
   stabilizing said custom electronic display;
   securing said custom electronic display using the license plate recess; or
   detaching said custom electronic display from the license plate recess.

3. The method of claim 1, wherein the custom electronic display is aligned and centered by use of a contemporary license plate recess of a vehicle.

4. The method of claim 1, wherein the target surface is a license plate recess of the vehicle.

5. The method of claim 1, wherein the target surface is a rear end of the vehicle.

6. The method of claim 5, wherein the target surface is also a license plate recess of the vehicle.

7. A method of implementing a custom electronic display on a vehicle, the method comprising:
   providing an electronic display system comprising a display mounting surface and an opposing display surface;
   coupling a mounting interface to a surface of a vehicle; and
   coupling the display system to the mounting interface with a standoff structure therebetween, wherein the standoff structure:
     is configured based at least in part on an actual or expected gap between portions of the display mounting surface and the mounting interface,
     comprises a mount receiving surface and an opposing standoff mounting surface, wherein the mount receiving surface is configured to replicate the contour of the display mounting surface of the custom electronic display such that the mount receiving surface and the display mounting surface fittingly engage each other when physically pressed together, and wherein the standoff mounting surface is configured to replicate the contour of the mounting interface such that the standoff mounting surface and the mounting interface fittingly engage each other when physically pressed together, and stabilizes coupling of the custom electronic display to the vehicle surface.

8. The method of claim 7, wherein electrical power is accessed via a license plate recess of the vehicle and the mounting interface is coupled to the license place recess.

9. The method of claim 7, further comprising:
digitally scanning the vehicle surface; and
generating a three dimensional representation of the vehicle surface based on the digitally scanning;
wherein one or more characteristics of the standoff structure are determined based on the three dimensional representation.

10. The method of claim 7, wherein the standoff structure comprises a plurality of elastomeric ribs configured for attachment between the display apparatus and the vehicle surface.

11. The method of claim 7, further comprising:
determining one or more dimensions of the display apparatus to avoid interference with one or more pre-existing hardware components of the vehicle.

12. The method of claim 7, further comprising:
accessing image data associated with a physical license plate of the vehicle, the image data usable to display a reproduction of the physical license plate on at least a portion of the display apparatus.

13. The method of claim 7, wherein the display apparatus is configured for operation in a transparency mode wherein at least a portion of the display apparatus is transparent or appears transparent by displaying objects behind the display apparatus.

14. The method of claim 7, further comprising:
accessing an air-conditioning system of the vehicle to provide one or more of heated or cooled air from the air-conditioning system of the vehicle onto at least a portion of the display apparatus.

15. The method of claim 7, wherein the display apparatus comprises:
one or more computer processors;
one or more tangible computer readable storage devices storing software code including an operating system and display apparatus software code determining display elements to reproduce on the display surface, the display elements comprising digital representations of one or more of:
brake lights;
vehicle manufacturer logo;
content from an advertiser; and
a physical license plate.

16. The method of claim 15, wherein the display apparatus is configured to transmit signals to a front display panel that replaces a front license plate on a vehicle to synchronize the front display panel with the custom electronic display on a rear of the vehicle.

17. The method of claim 15, wherein the display apparatus further comprises:
a plurality of cameras configured to obtain images around the vehicle;
wherein the display apparatus is configured to update the display elements based on the obtained images from the cameras, wherein the updated display elements include real-time representations of aspects of an environment surrounding the vehicle.

18. A custom electronic display apparatus comprising:
a custom electronic display comprising a display mounting surface and an opposing display surface configured for selective activation;
a standoff structure comprising a mount receiving surface and an opposing standoff mounting surface, wherein the mount receiving surface is configured to replicate the contour of the display mounting surface of the custom electronic display such that the mount receiving surface and the display mounting surface fittingly engage each other when physically pressed together, and wherein the standoff mounting surface is configured to replicate the contour of the target surface such that the standoff mounting surface and the target surface fittingly engage each other when physically pressed together; and
wherein the custom electronic display is configured to be mounted to the target surface with the standoff structure as an intermediary layer between the custom electronic display and the target surface.

19. The custom electronic display apparatus of claim 18, wherein the target surface is a license plate recess of the vehicle, a rear end of the vehicle, or both.

20. The custom electronic display apparatus of claim 19, wherein the electrical power is accessed via the license plate recess of the vehicle and a mounting interface is coupled to the license place recess.

* * * * *